(12) United States Patent
Agee

(10) Patent No.: US 10,775,510 B2
(45) Date of Patent: Sep. 15, 2020

(54) BLIND DESPREADING OF CIVIL GNSS SIGNALS FOR RESILIENT PNT APPLICATIONS

(71) Applicant: Brian G. Agee, San Jose, CA (US)

(72) Inventor: Brian G. Agee, San Jose, CA (US)

(*) Notice: Subject to any disclaimer, the term of this patent is extended or adjusted under 35 U.S.C. 154(b) by 350 days.

(21) Appl. No.: 15/731,417

(22) Filed: Jun. 5, 2017

(65) Prior Publication Data
US 2017/0350985 A1   Dec. 7, 2017

Related U.S. Application Data

(60) Provisional application No. 62/392,623, filed on Jun. 6, 2016, provisional application No. 62/429,029, filed on Dec. 1, 2016.

(51) Int. Cl.
*G01S 19/21* (2010.01)

(52) U.S. Cl.
CPC .................. *G01S 19/215* (2013.01)

(58) Field of Classification Search
CPC ...................................... G01S 19/215
USPC ..................................... 342/357.59
See application file for complete search history.

(56) References Cited

U.S. PATENT DOCUMENTS

| | | | |
|---|---|---|---|
| 5,663,734 A | 9/1997 | Krasner | |
| 5,781,156 A | 7/1998 | Krasner | |
| 5,812,087 A | 9/1998 | Krasner | |
| 5,831,574 A | 11/1998 | Krasner | |
| 5,841,396 A | 11/1998 | Krasner | |
| 5,945,944 A | 8/1999 | Krasner | |
| 7,250,903 B1 | 7/2007 | McDowell | |
| 7,453,413 B2 | 11/2008 | Larry et al. | |
| 7,577,464 B2 | 8/2009 | Ezal et al. | |

(Continued)

FOREIGN PATENT DOCUMENTS

EP   2908454   8/2015

OTHER PUBLICATIONS

J. D. Bruce, K. D. Snow, "Final Technical Report, Teal Wing Program," Probe Systems Technical Report No. PSI-ER-327, Oct. 1974.

(Continued)

*Primary Examiner* — Bo Fan
(74) *Attorney, Agent, or Firm* — Steven J Shattil

(57) ABSTRACT

A method, system and apparatus are claimed for receiving, blindly despreading, and determining geo-observables, of true civil Global Navigation Satellite Systems (GNSS) navigation signals generated by any of the set of satellite vehicles and ground beacons, amongst false echoes and malicious GNSS signals from spoofers and repeaters; for identifying malicious GNSS signals, and preventing those signals from corrupting or capturing Positioning, Navigation, and Timing tracking operations; and for geolocating malicious GNSS signals. The invention also provides time-to-first-fix over much smaller time intervals than existing GNSS methods and can operate both in the presence of signals with much wider disparity in received power than existing techniques, and in the presence of arbitrary multipath. Further embodiments employing spatial/polarization diverse receivers that remove non-GNSS jammers received by the system, as well as targeted GNSS spoofers that can otherwise emulate GNSS signals received at victim receivers, are also claimed.

13 Claims, 21 Drawing Sheets

(56) References Cited

U.S. PATENT DOCUMENTS

| | | |
|---|---|---|
| 7,616,682 B2 | 11/2009 | Small |
| 7,848,397 B2 | 12/2010 | Small |
| 7,936,305 B2 | 5/2011 | Small |
| 8,009,098 B2 | 8/2011 | Lamance |
| 8,130,141 B2 | 3/2012 | Pattabiraman et al. |
| 8,305,265 B2 | 11/2012 | Ezal et al. |
| 8,629,803 B2 | 1/2014 | Pattabiraman et al. |
| 8,704,728 B2 | 4/2014 | Mujahed et al. |
| 8,804,808 B1 | 8/2014 | Dybdal et al. |
| 8,917,209 B2 | 12/2014 | Krasner et al. |
| 8,934,844 B2 | 1/2015 | Small |
| 8,977,843 B2 | 3/2015 | Gutt et al. |
| 9,035,829 B2 | 5/2015 | Raghupathy et al. |
| 9,059,784 B2 | 6/2015 | Enge et al. |
| 9,097,798 B2 | 8/2015 | Martens et al. |
| 9,119,165 B2 | 8/2015 | Krasner et al. |
| 9,176,217 B2 | 11/2015 | Krasner et al. |
| 9,176,231 B2 | 11/2015 | Whelan et al. |
| 9,178,894 B2 | 11/2015 | O'Connor et al. |
| 9,523,763 B2 | 12/2016 | Lawrence et al. |
| 9,645,249 B2 | 5/2017 | Krasner et al. |
| 9,654,158 B2 | 5/2017 | Dafesh et al. |
| 9,739,872 B2 | 8/2017 | Krasner et al. |
| 9,784,815 B2 | 10/2017 | Sendonaris |
| 9,801,153 B2 | 10/2017 | Raghupathy et al. |
| 9,874,624 B2 | 1/2018 | Mahmood et al. |
| 9,913,273 B2 | 3/2018 | Seibert |
| 10,162,060 B2 | 12/2018 | Jaeckle |
| 10,175,945 B2 | 1/2019 | Kalkunte et al. |
| 10,194,269 B2 | 1/2019 | Venkataraman et al. |
| 10,203,397 B2 | 2/2019 | Sendonaris et al. |
| 10,444,369 B2 | 10/2019 | Raghupathy et al. |
| 10,470,184 B2 | 11/2019 | Seibert |
| 2015/0195670 A1* | 7/2015 | Agee ............... H04B 1/7156 375/133 |
| 2019/0101652 A1 | 4/2019 | Jaeckle |

OTHER PUBLICATIONS

J. Rissanen, "Modeling by Shortest Data Description," Automatica, Mar. 1978.

W. Gardner, Statistical Spectral Analysis: A Nonprobabilistic Theory, Prentice-Hall, Englewood Cliffs, NJ, 1987.

B. G. Agee, "The Baseband Modulus Restoral Approach to Blind Adaptive Signal Demodulation," in Proc. Digital Signal Processing Workshop, 1988.

B. G. Agee, "The Copy/DF Approach to Signal-Specific Emitter Location," in Proc. Twenty-Fifth Asilomar Conference on Signals, Systems and Computers, Nov. 1991.

B. G. Agee, "Solving the Near-Far Problem: Exploitation of Spectral and Spatial Coherence in Wireless Personal Communication Networks," in Proc. Virginia Tech Third Symposium.

U. Madhow, M. Honig, "MMSE Interference Suppression for Direct-Sequence Spread-Spectrum CDMA," IEEE Trans. Commun., vol. 42, No. 12, pp. 3178-3188, Dec. 1994.

G. Golub, C. Van Loan, Matrix Computations, 3rd Edition, The John Hopkins University Press, London: 1996.

U. Madhow, "Blind Adaptive Interference Suppression for Direct-Sequence CDMA," Proc. IEEE, pp. 2049-2069, Oct. 1998.

U. Madhow, M. Honig, "On the Average Near-Far Resistance for MMSE Detection of Direct-Sequence CDMA Signals with Random Spreading," IEEE Trans. Info. Theory, Sep. 1999.

M. Amin, W. Sun, A Novel Interference Suppression Scheme for Global Navigation Satellite Systems Using Antenna Array, IEEE Journal on Selected Areas in Communications, vol. 2.

W. Sun, M. Amin, "A Self-Coherence Anti-Jamming GPS Receiver," IEEE Transactions on Signal Processing, vol. 53, No. 10, pp. 3910-3915, Oct. 2005.

Interface Specification IS-GPS-200H, Navstar GPS Space Segment/Navigation User Interfaces, Sep. 2013.

A. Kerns, D. Shepard, J. Bhatti, T. Humphreys, "Unmanned Aircraft Capture and Control via GPS Spoofing," Journal of Field Robotics, vol. 31, No. 4, pp. 617-636, Apr. 2014.

D. McCarthy, L. Scott, A. Tkatch, "Tips and Tricks to Finding GNSS Jammers—A Field Story," in Proc. 2014 ION GNSS Conference, Sep. 2014.

Cheong, et. al., Characterizing the Signal Structure of Locata's Pseudolite-based Positioning System, in Proc. International Global Navigation Satellite Systems Society IGNSS Symposium 2009, Dec. 1-3, 2009, Paradise, Qld, Australia.

Lamance, et. al., Locata Correlator-Based Beam Forming Antenna Technology for Precise Indoor Positioning and Attitude, in Proc. International Technical Meeting of the Satellite Division of the Institute of Navigation, Sep. 13-23, 2011, Portland, OR, pp. 2436-2445.

Amt, et. al., Flight Testing of a Pseudolite Navigation System on a UAV, in Proc. ION Conference, Jan. 2007.

Rizos, et. al., Locata: A new high accuracy indoor positioning system, in Proc. 2010 International Conference on Indoor Positioning and Indoor Navigation (IPIN), Sep. 15-17, 2010, Zurich, Switzerland.

Rizos, et al., Locata: A Positioning System for Indoor and Outdoor Applications Where GNSS Does Not Work, in Proc. 18th Association of Public Authority Surveyors Conference (APAS2013), Mar. 12-14, 2013, Cnberra, Australian Capital Territory, Australia, pp. 73-83.

Global Satellite Navigation Sattelite System GLONASS Interface Control Document, Navigational Radiosignal in Bands L1, L2, Edition 5.1, 2008, Russian Institute of Space Device Engineering, Moscow.

European Gnss (Galileo) Open Service Signal in Space Interface Control Document, European Union, Nov. 2015.

BeiDou Navigation Satellite System Signal in Space Interface Control Document, Open Service Segmenr (version 2.0) China Satellite Navigation Office, Dec. 2013.

Quasi-Zenith Satellite System Navigation Service, Interface Specification, Satellite Positioning, Navigation, and Timing (IS-QZSS-PNT-003), The Cabinet Office, Government of Japan (CAO) and Quazi-Zenith Satellite System Services, Inc., Aug. 30, 2016.

Indian Regional Navigation Satellite System, Signal in Space for Standard Positioning Service, Version 1.0 (ISRO-RNSS-ICD-SPS-1.0), Satellite Navigation Programme, ISRO Satellite Centre, Indian Space Research Organization, Bangalore, India, Jun. 2014.

Dunn (authenticated by), Global Positioning Systems Directorate, Systems Engineering & Integration, Interface Specification IS-GPS-705, Naystar GPS Segment/User Segment L5 Interface, Mar. 21, 2014.

Dunn (authenticated by), Global Positioning Systems Directorate, Systems Engineering & Integration, Interface Specification IS-GPS-200, Navstar GPS Space Segment/Navigation User Interfaces, Mar. 21, 2014.

K. D. Snow, et al, "Teal Wing Program: Principals of Spread Spectrum Intercept," Probe Systems Report PSI-ER-5419-05, Probe Systems, Inc., Sunnyvale California, Unclassified, Feb. 1978.

S. Meiyappan, et al.; "MBS Indoor Timing Receiver Concept, Implementation, and Test Results"; WSTS 2017, Apr. 2017.

Nextnav, "Metropolitan Beacon System (MBS) ICD"; Version G1.0; 2014.

A.K. Brown, P. Olson; "Urban/Indoor Navigation using Network Assisted GPS"; Proceedings of ION 61st Annual Meeting, Cambridge, MA, Jun. 2006.

J.W.Cheong, et al.; "Characterising the Signal Structure of Locata's Pseudolite-based Positioning System"; International Global Navigation Satellite Systems Society IGNSS Symposium 2009, Dec. 1-3, 2009.

J. Lamance, D. Small; "Locata Correlator-Based Beam Forming Antenna Technology for Precise Indoor Positioning and Attitude"; 24th international technical meeting of the Satellite Division of the Institute of Navigation, Sep. 20-23, 2011.

C. Rizos, et al.; "A hybrid system for navigation in GPS challenged environments: case study"; Proceedings of the 21st International Technical Meeting of the Satellite Division of the Institute of Navigation (ION GNSS 2008), Sep. 16-19, 2008.

(56) References Cited

OTHER PUBLICATIONS

C. Yang, et al.; "Opportunistic Use of Metropolitan RF Beacon Signals for Urban and Indoor Positioning"; Proceedings of the 29th International Technical Meeting of the Satellite Division of the Institute of Navigation (ION GNSS+ 2016), Sep. 12-16, 2016.

\* cited by examiner

Figure 3

Exemplary MOS-DSSS Civil GNSS Signals

| Format (Orbit) | Ranging Code Modulation | Code Period | Exploitable symbol properties |
|---|---|---|---|
| GPS C/A (MEO) | › 50 Hz BPSK, I rail (50 sps base symbol stream)<br>› No modulation, Q rail | 1 ms<br>(1,023 chips) | › 1:20 repeated symbol sequence<br>› BPSK symbol stream<br>› Constant-modulus symbol stream |
| GPS L5 (MEO), QZSS (GSO) | › 100 Hz BPSK, modulated by 10-bit Neuman-Hofman code, I rail (1 ksps symbol stream)<br>› Repeated 20-bit Neuman-Hofman code, Q rail | 1 ms<br>(10,230 chips) | › 20 ms repeated Q rail<br>› Constant-modulus symbol stream |
| GLONASS C/A (MEO) | › 50 Hz BPSK, modulated by 2-bit meander code, I rail (100 sps base symbol stream)<br>› No modulation, Q rail | 1 ms<br>(511 chips) | › 1:10 (effective) symbol sequence<br>› Constant-modulus symbol stream |
| Galileo E5A (MEO) | › 50 Hz BPSK, modulated by 20-chip secondary code, I rail (1 ksps symbol stream)<br>› Repeated 100-chip secondary code, Q rail | 1 ms<br>(10,230 chips) | › 100 ms repeated Q rail<br>› Constant-modulus symbol stream |
| Galileo E5B (MEO) | › 250 Hz BPSK, modulated by 4-chip secondary code, I rail (1 ksps symbol stream)<br>› Repeated 100-chip secondary code, Q rail | 1 ms<br>(10,230 chips) | › 100 ms repeated Q rail<br>› Constant-modulus symbol stream |
| Galileo E6B (MEO) | › 1,000 Hz BPSK, I rail (1 ksps symbol stream)<br>› Repeated 100-chip secondary code, Q rail | 1 ms<br>(5,115 chips) | › 100 ms repeated Q rail<br>› Constant-modulus symbol stream |
| Galileo E6C (MEO) | › 1,000 Hz BPSK, I rail (1 ksps symbol stream)<br>› Repeated 100-chip secondary code, Q rail | 1 ms<br>(5,115 chips) | › 100 ms repeated Q rail<br>› Constant-modulus symbol stream |
| Beidou 1B (MEO) | › 50 Hz QPSK, modulated by 20-chip secondary code (1 ksps symbol stream) | 1 ms<br>(2,046 chips) | › Constant-modulus symbol stream |
| NAVIC SPS-L5, SPS-S (all GSO) | › 50 Hz BPSK w/ rate ½ coding, I rail (100 ksps base symbol stream)<br>› No modulation, Q rail | 1 ms<br>(1,023 chips) | › 1:10 (effective) symbol sequence<br>› BPSK symbol sequence<br>› Constant modulus symbol sequence |

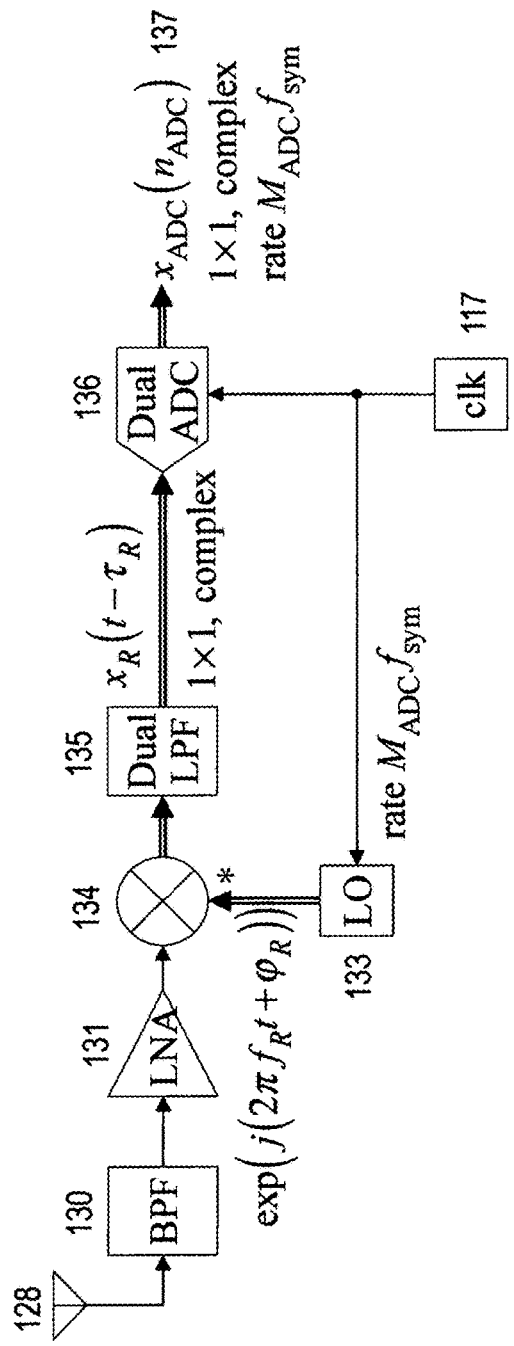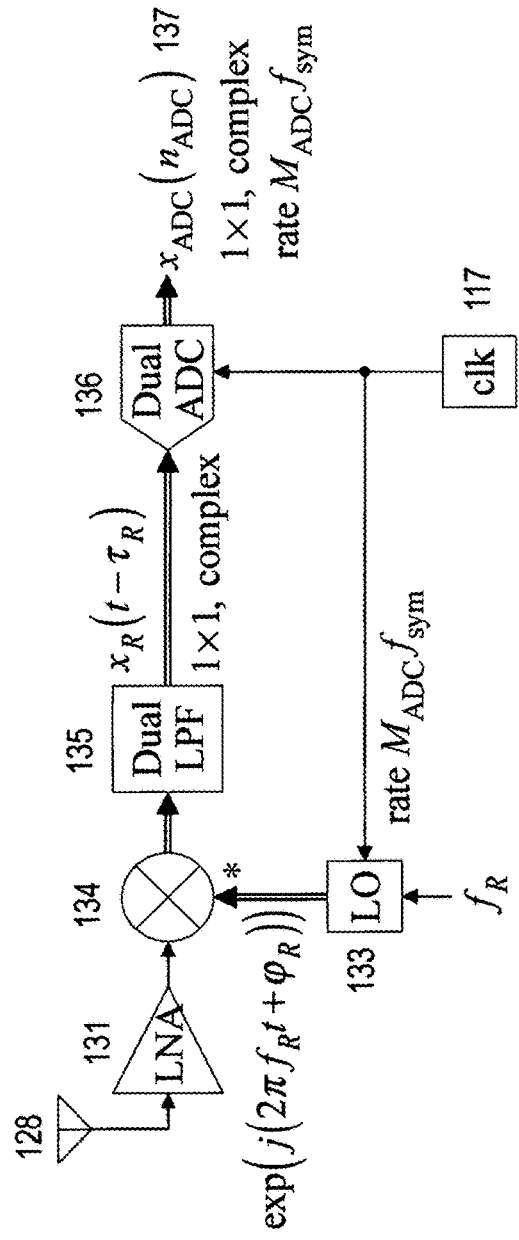
Figure 4 (Prior Art)

Figure 10

Summary Signal TOA Parameters, Exemplary Mixed GNSS SV, Airborne Beacon Reception Scenario

| Parameter | GNSS SV's | Airborne Beacons |
|---|---|---|
| Minimum TOA | 68.1 ms | 0.22 ms |
| Median TOA | 77.5 ms | 0.69 ms |
| Maximum TOA | 85.8 ms | 1.07 ms |
| Minimum TOA separation | 64.9 µs | 34.1 µs |
| Minimum DTOA | -2.18 µs/s (-21.8 µs over 10 s) | -0.27 µs/s (-2.7 µs over 10 s) |
| Median absolute DTOA | 1.31 µs/s (13.1 µs over 10 s) | 0.16 µs/s (1.6 µs over 10 s) |
| Maximum DTOA | 2.28 µs/s (22.8 µs over 10 s) | 0.17 µs/s (1.7 µs over 10 s) |
| Minimum $2^{nd}$-order DTOA | -1.48 ns/s$^2$ (-74 ns over 10 s) | -1.34 ns/s$^2$ (-67 ns over 10 s) |
| Median absolute $2^{nd}$-order DTOA | 0.745 ns/s$^2$ (37 ns over 10 s) | 1.09 ns/s$^2$ (54 ns over 10 s) |
| Maximum $2^{nd}$-order DTOA | 1.68 ns/s$^2$ (84 ns over 10 s) | 1.96 ns/s$^2$ (98 ns over 10 s) |

10A

Summary Signal FOA Parameters, Exemplary Mixed GNSS SV, Airborne Beacon Reception Scenario

| Parameter | GNSS SV's | Airborne Beacons |
|---|---|---|
| Minimum FOA | -3.44 kHz | -0.42 kHz |
| Median FOA | -0.84 kHz | -0.18 kHz |
| Maximum FOA | 3.59 kHz | 0.27 kHz |
| Minimum FOA separation | 39.3 Hz | 17.5 Hz |
| Minimum DFOA | -2.35 Hz/s (-23.5 Hz over 10 s) | -2.13 Hz/s (-21.3 Hz over 10 s) |
| Median absolute DFOA | 1.18 Hz/s (11.8 Hz over 10 s) | 1.69 Hz/s (16.9 Hz over 10 s) |
| Maximum DFOA | 2.66 Hz/s (26.6 Hz over 10 s) | 3.07 Hz/s (30.7 Hz over 10 s) |
| Minimum $2^{nd}$-order DFOA | -14.3 mHz/s$^2$ (-0.713 Hz over 10 s) | -16.9 mHz/s$^2$ (-0.84 Hz over 10 s) |
| Median absolute $2^{nd}$-order DFOA | 4.46 mHz/s$^2$ (0.22 Hz over 10 s) | 8.26 mHz/s$^2$ (0.41 Hz over 10 s) |
| Maximum $2^{nd}$-order DFOA | 13.3 mHz/s$^2$ (0.66 Hz over 10 s) | 12.3 mHz/s$^2$ (0.62 Hz over 10 s) |

10B

Summary Signal RIP Parameters, Exemplary Mixed GNSS SV, Airborne Beacon Reception Scenario

| Parameter | GNSS SV's (15 dBW EIRP) | Airborne Beacons (0 dBW EIRP) |
|---|---|---|
| Minimum RIP | -140 dBm | -117 dBm |
| Median RIP | -139 dBm | -113 dBm |
| Maximum RIP | -138 dBm | -103 dBm |
| Minimum RIP separation | 0.0066 dB | 0.48 dB |
| Minimum DRIP | -0.0023 dB/s (-0.023 dB over 10 s) | -0.0027 dB/s (-0.027 dB over 10 s) |
| Median absolute DRIP | 0.0016 dB/s (0.016 dB over 10 s) | 0.0022 dB/s (0.022 dB over 10 s) |
| Maximum DRIP | 0.0024 dB/s (0.024 dB over 10 s) | 0.0055 dB/s (0.055 dB over 10 s) |

Summary Azimuthal Signal LOB Parameters, Exemplary Mixed GNSS SV, Airborne Beacon Reception Scenario

| Parameter | GNSS SV's | Airborne Beacons |
|---|---|---|
| Minimum azimuthal LOB | -123° | -170° |
| Median azimuthal LOB | 103° | 62.9° |
| Maximum azimuthal LOB | 158° | 178° |
| Minimum azimuthal LOB separation | 0.283° | 6.17° |
| Minimum azimuthal DLOB | -0.022°/s (-0.22° over 10 s) | -0.027°/s (-0.27° over 10 s) |
| Median absolute azimuthal DLOB | 0.048°/s (0.48° over 10 s) | 0.022°/s (0.22° over 10 s) |
| Maximum azimuthal DLOB | 0.010°/s (0.10° over 10 s) | 0.097°/s (0.97° over 10 s) |
| Minimum $2^{nd}$-order azimuthal DLOB | -0.000014°/s$^2$ (-0.00071° over 10 s) | -0.00019°/s$^2$ (-0.0093° over 10 s) |
| Med. abs. $2^{nd}$-order azimuthal DLOB | 0.000004°/s$^2$ (0.00018° over 10 s) | 0.00076°/s$^2$ (0.0038° over 10 s) |
| Maximum $2^{nd}$-order azimuthal DLOB | 0.000005°/s$^2$ (0.00026° over 10 s) | 0.00019°/s$^2$ (0.0093° over 10 s) |

11B

Summary Elevation Signal LOB Parameters, Exemplary Mixed GNSS SV, Beacon Reception Scenario

| Parameter | GNSS SV's | Airborne Beacons |
|---|---|---|
| Minimum elevation LOB | -0.467° | -6.76° |
| Median elevation LOB | 25.3° | -3.00° |
| Maximum elevation LOB | 71.7° | -2.76° |
| Minimum elevation LOB separation | 0.177° | 0.00336° |
| Minimum elevation DLOB | -0.0062°/s (-0.062° over 10 s) | -0.0037°/s (-0.037° over 10 s) |
| Median elevation DLOB | 0.0054°/s (0.054° over 10 s) | 0.0002°/s (0.001° over 10 s) |
| Maximum elevation DLOB | 0.0075°/s (0.075° over 10 s) | 0.0011°/s (0.011° over 10 s) |
| Minimum $2^{nd}$-order elevation DLOB | -0.000006°/s$^2$ (-0.00028° over 10 s) | -0.000024°/s$^2$ (-0.0012° over 10 s) |
| Med. abs. $2^{nd}$-order elevation DLOB | 0.000006°/s$^2$ (0.00018° over 10 s) | 0.000002°/s$^2$ (0.00009° over 10 s) |
| Maximum $2^{nd}$-order elevation DLOB | 0.000006°/s$^2$ (0.00029° over 10 s) | 0.000002°/s$^2$ (0.00012° over 10 s) |

Figure 12

Summary Local Azimuthal Signal DOA Parameters, Exemplary Mixed GNSS SV, Airborne Beacon Reception Scenario

| Parameter | GNSS SV's | Airborne Beacons |
|---|---|---|
| Minimum azimuthal DOA | -176° | -172° |
| Median azimuthal DOA | -106° | 35.2° |
| Maximum azimuthal DOA | 133° | 158° |
| Minimum azimuthal DOA separation | 0.357° | 0.727° |
| Minimum azimuthal DDOA | 0.268°/s (2.68° over 10 s) | 0.286°/s (2.86° over 10 s) |
| Median azimuthal DDOA | 0.313°/s (3.13° over 10 s) | 0.330°/s (3.30° over 10 s) |
| Maximum azimuthal DDOA | 0.331°/s (3.31° over 10 s) | 0.411°/s (4.11° over 10 s) |
| Minimum 2$^{nd}$-order azimuthal DDOA | -0.00003°/s² (-0.0013° over 10 s) | -0.00019°/s² (-0.0093° over 10 s) |
| Med. abs. 2$^{nd}$-order azimuthal DDOA | 0.00029°/s² (0.0014° over 10 s) | 0.00008°/s² (0.0040° over 10 s) |
| Maximum 2$^{nd}$-order azimuthal DDOA | 0.00025°/s² (0.0127° over 10 s) | 0.00019°/s² (0.0093° over 10 s) |

12A

Summary Local Elevation Signal DOA Parameters, Exemplary Mixed GNSS SV, Airborne Beacon Reception Scenario

| Parameter | GNSS SV's | Airborne Beacons |
|---|---|---|
| Minimum elevation DOA | -0.669° | -6.36° |
| Median elevation DOA | 24.5° | -4.23° |
| Maximum elevation DOA | 72.8° | -0.73° |
| Minimum elevation DOA separation | 0.165° | 0.0534° |
| Minimum elevation DDOA | -0.021°/s (-0.21° over 10 s) | -0.012°/s (-0.12° over 10 s) |
| Median elevation DDOA | 0.016°/s (0.16° over 10 s) | 0.012°/s (0.12° over 10 s) |
| Maximum elevation DDOA | 0.023°/s (0.23° over 10 s) | 0.017°/s (0.17° over 10 s) |
| Minimum 2$^{nd}$-order elevation DDOA | -0.000079°/s² (-0.0039° over 10 s) | -0.00010°/s² (-0.0052° over 10 s) |
| Med. abs. 2$^{nd}$-order elevation DDOA | 0.000035°/s² (0.0018° over 10 s) | 0.00005°/s² (0.0026° over 10 s) |
| Maximum 2$^{nd}$-order elevation DDOA | 0.000081°/s² (0.0041° over 10 s) | 0.00008°/s² (0.0038° over 10 s) |

Exemplary GPS C/A Blind Despreading Complexity

| Parameter | | Scenario 1 | Scenario 2 | Scenario 3 | Scenario 4 | Scenario 5 |
|---|---|---|---|---|---|---|
| Number of receive feeds | $M_{feed}$ | 4 | 4 | 4 | 4 | 4 |
| Dual-ADC rate | $M_{ADC}$ | 30 ksps | 60 ksps | 120 ksps | 240 ksps | 480 ksps |
| Channelizer FFT size | $M_{FFT}$ | 32 | 64 | 128 | 256 | 512 |
| FFT bins used each feed | $M_{chn}$ | 16 (15 kHz) | 32 (30 kHz) | 64 (60 kHz) | 128 (120 kHz) | 256 (240 kHz) |
| Adaptation DoF's | $M_{DoF}$ | 64 | 128 | 256 | 512 | 1,024 |
| Data symbols/block | $N_{sym}$ | 500 (0.5 s) | 1,000 (1 s) | 2,000 (2 s) | 4,000 (4 s) | 8,000 (8 s) |
| Data channelization operations | | 0.93 MMAC/s | 2.35 MMAC/s | 5.71 MMAC/s | 12.1 MMAC/s | 27.2 MMAC/s |
| Data whitening operations | | 16.7 MMAC/s | 66.8 MMAC/s | 267 MMAC/s | 1.07 GMAC/s | 4.28 GMAC/s |
| Phase-SCORE operations | | 27.0 MMAC/s | 89.2 MMAC/s | 326 MMAC/s | 1.20 GMAC/s | 4.64 GMAC/s |
| Operations through detection: | | 45 MMAC/s | 158 MMAC/s | 599 MMAC/s | 2.29 GMAC/s | 8.95 GMAC/s |
| Conj-SCORE, demod ops/port | | 9.83 MMAC/s | 36.3 MMAC/s | 138 MMAC/s | 542 MMAC/s | 2.13 GMAC/s |
| Total conj-SCORE, demod ops* | | 236 MMAC/s | 871 MMAC/s | 3.33 GMAC/s | 13.0 GMAC/s | 51.2 GMAC/s |
| Operations through demod: | | 281 MMAC/s | 1.03 GMAC/s | 3.93 GMAC/s | 15.3 GMAC/s | 60.2 GMAC/s |

*Assumes 24 detected transmitters (e.g., capture of signals from 12 SV's, and from 12 beacons or spoofers)

BLIND DESPREADING OF CIVIL GNSS SIGNALS FOR RESILIENT PNT APPLICATIONS

CROSS-REFERENCES

This application for patent claims the benefit of U.S. Provisional Application Ser. No. 62/392,623 filed Jun. 6, 2016 by the same inventor, and U.S. Provisional Application Ser. No. 62/429,029 filed Dec. 1, 2016 by the same inventor; and this application and Specification expressly references each respective specification and drawings for each of the above-identified original provisional applications and incorporates all of their respective specification and drawings herein by reference.

GOVERNMENT RIGHTS

None

BACKGROUND OF THE INVENTION

1.A. Field of the Invention

The present invention relates generally to the field of digital signal processing (DSP), and specifically to DSP for purposes of obtaining Positioning, Navigation, and Timing (PNT) information from civil Global Navigation Satellite Systems (GNSS), including Coarse Acquisition (C/A) signals generated by Global Positioning System (GPS) satellite vehicles (SVs) and non-SV beacons including ground, low-orbit, and atmospheric beacons (pseudolites). This invention particularly focuses on effecting resilient signal processing in an environment populated with many sources, including malicious sources intending to disrupt or subvert information provided by legitimate sources, said malicious sources including but not being limited to non-GNSS jammers, spoofers that emulate GNSS signals, and repeaters that can record and replay GNSS signals. The invention also focuses on effective and resilient signal processing of sources that can benefit from implementation of PNT functions, but which may be difficult to exploit using existing means for processing data from those sources, for example, due to wide dynamic range between emissions received from SV and terrestrial sources; due to multipath that may hinder conventional PNT methods; or even due to the need to manageably handle the large number of GNSS sources expected in future applications.

The invention exploits the massive spectral redundancy induced by the civil GNSS modulation format, and the temporal and code diversity of those signals, to detect and demodulate all of the civil GNSS signals in the received environment, including signals received from and/or in presence of terrestrial sources that may be significantly stronger than civil GNSS signals received from SV's; identify detected malicious sources ahead of or during PNT acquisition and tracking operations; prevent those malicious sources from corrupting or subverting the PNT operation; and optionally, alert the receiver to presence of those sources, and/or geolocates the signal origin(s) of those malicious sources. In embodiments employing multifeed receivers, the invention exploits the additional spatial and/or polarization diversity of GNSS and non-GNSS (e.g., jamming) signals to further remove non-GNSS signals from the received GNSS signals, and to remove targeted GNSS spoofing signals that have otherwise emulated temporal and code diversity of GNSS signals that the spoofer is intending to displace at a victim receiver. The invention further provides faster time-to-first-fix (TTFF) than conventional GNSS receivers, and additional robustness to multipath encountered by the receiver. The invention also provides enhanced compatibility with software-defined radio (SDR) implementation architectures, further improving cost and flexibility of the invention.

1.B. Description of the Related Art

The GPS L1 coarse acquisition signal (commonly referred to as the 'L1 C/A signal'), is near-universally used for navigation and carrier/timing synchronization in commercial PNT systems, due to all of the GPS network's worldwide visibility, the publically disclosed and well-known structure of the L1 C/A signal-in-space (SiS), and the ready availability of mature, low-cost hardware for receiving the L1 C/A signal. For similar reasons, and due to restrictions on availability of the encrypted P(Y) code, the L1 C/A signal is also typically relied upon for PNT functions in military systems.

Other civil GNSS signals, e.g. GLONASS, Galileo, GPS L5, Beidou, and NAVIC signals are also considered, as the baseline approach can work for all of these signals types with equivalency substitutions (i.e. minimal, predictable, readily known to the art) determined by the relative methods and/or receiver architectures. Moreover, the approach can work (and in fact provides exceptionally strong benefits) for GNSS-like commercial beacons on the market, such as the LocataLite signal, which emulates the GPS C/A signal with a×10 spreading rate in the 2.4-2.485 GHz ISM band.

Since its inception, matched-filter correlation has been the only method used to acquire and demodulate direct-sequence spread spectrum (DSSS) signals transmitted by global navigation satellite systems (GNSS). However, matched filter correlation possesses inherent limitations that can degrade its performance in many reception environments. Known limitations include the following:

- Slow cold-start time-to-first-fix (TTFF), even in the most benign environments. In a cold start scenario, the despreader does not know the specific ranging codes used by any of the GNSS satellite vehicles, nor does it know the timing phase or frequency offset of those codes, hence it must search over code, timing, and frequency to synchronize with a single satellite. Cold-start TIFF can be on the order of minutes, and in addition can be quite power consumptive.
- High sensitivity to channel multipath, which can distort the ranging codes and degrade or destroy correlation peaks. This problem is especially acute in urban and indoor navigation and localization scenarios.
- Perceived need to collect over wide bandwidths, typically an integer multiple of the ranging code chip-rate (e.g., 1.023 MHz for the GPS C/A code, 10.23 MHz for the L5 short code), in order to fully exploit the processing gain of the code, overcome aforementioned channel multipath effects, and (in military GPS receivers) exploit moderate and long codes overlaid on top of the short civil code.
- High susceptibility to jamming. For the GPS C/A signal, despreading gain is limited to the 30-43 dB "matched filter" gain of the correlative detector. Most of this gain is needed to raise the GNSS signal above the background noise, hence the signal is easily jammed by interference of many, many types.
- High susceptibility to noncovert, covert, or "aligned" spoofers that can use knowledge of the ranging code from the satellite and rough location of the receiver platform to duplicate and attempt to supplant signals from those satellites.

Reliance on ancillary anti-spoofing (AS) codes, e.g., the GPS P(Y) code, to overcome jamming and spoofing events. This reliance increases the cost of the receiver, limits AS capability to a subset of military receivers (again, with inherently higher cost), and introduces a host of physical security measures and restrictions to prevent compromise of AS-capable receivers.

Need to maintain a library of all of the GNSS ranging codes, or seeds used to initiate the codes, in order to implement the despreader. This can complicate the receiver architecture, especially for "multi-GNSS receivers" that are designed to exploit civil signals generated by multiple families of satellites.

An approach that can use commonly, or almost universally, globally effected background signals (e.g. those generated in the GLONASS, Galileo, and Beidou/COMPASS global navigation satellite systems, by governmental navigational, and the equivalent commercial emitters), and does not require either more power or more expensive receiving hardware, that provides an economic as well a technical superiority which can go a long way towards successfully serving the needs of commercial and ground-based users, as well as potentially defeating not only present, but also future and potential interferers and hostile spoofers, is described below.

Partly because of its enduring value and global ubiquity, there are concerns that these background signals—including the L1 C/A signal—are becoming increasingly vulnerable to malicious electronic attack (EA) measures, such malicious measures including:

Jammers, which block GPS signals using non-GPS waveforms, e.g., chirp, CW (Continuous Wave), and noise waveforms;

Spoofers, which generate L1 C/A signals with navigation (NAV) data designed to corrupt, subvert, or capture PNT systems on-board target receivers.

Repeaters, which receive and reradiate L1 C/A signals (and, with sufficient resources, L1 and L2 P(Y) signals) with timing and frequency shifts that can also corrupt, subvert, or capture PNT systems on-board target receivers.

In many scenarios, a combination of methods is used to promote a specific attack. For example, a jammer can first cause a victim receiver to break lock on one or more GPS signals, after which a spoofer is "proffered" as a replacement for the legitimate signal. In other cases, referred to here as targeted spoofing scenarios, a victim receiver is first located with sufficient accuracy to allow the spoofer or a set of spoofers to emulate and displace the GPS signals in the field-of-view of a victim receiver, without the need for such jamming, as shown in FIG. 2.

Examples of electronic attack (EA) measures encountered in practice include the 2011 takeover and capture of an RQ-170 surveillance drone, most likely using a GPS jammer/spoofer or repeater, e.g., as demonstrated by the UT/Austin RadioNavigation Laboratory in 2012; and the North Korean deployment of a massive GPS jamming network in 2012-2013. However, EA is no longer the province of adversarial state actors: GNSS jammers, commonly referred to as "personal privacy devices (PPD's)," can be bought on-line for as little as US$50 or equivalent Bitcoins; and a PPD deployed to defeat a user's own GPS logger created serious interference around Newark airport in 2013. Recent years have seen both increased use of PPD's capable of jamming GNSS transmissions, and increased use scenarios for such PPD's, including smuggling of merchandise into and out of the country, automobile theft (in which PPD's are used to disable anti-theft devices such as LoJack™), and hazardous waste disposal at non-approved locations.

Moreover, the advent of low-cost software-defined radio (SDR) hardware, and software to emulate GNSS transmissions and receivers, e.g., through the Open Source GNSS SDR initiative, has brought spoofers and repeaters into the commercial realm. This was dramatically shown in the August 2015 Qihoo 360 Unicorn Team GP Spoofing Demonstration at DEF CON 23, which captured a smartphone using a record-and-replay strategy, i.e., a low-cost repeater, using less than US$1,300 in SDR parts, e.g., a 8210 Universal Software Radio Peripheral transceiver (US$1,100), Mini-Circuit ZX60-V82-S+ low-noise amplifier (US$70), ZX85-12G-S+ Bias-tee isolation circuit (US$100), and active GPS antenna (<US$20), and then further generated a synthetic GPS signal that spoofed location and timing of that smartphone. More recently, spoofing of UAS's has been detected at our nations borders, most likely by drug cartels attempting to smuggle contraband into the country. Prices of the necessary hardware, firmware, and software will continue to fall, and availability continue to rise, for the foreseeable future. Moreover, in many of the scenarios where PPD's are already being used, there is ready incentive to spoof, for example, by convincing a GPS logger that it is in another location entirely, rather than simply experiencing an outage.

The disruption caused by PPD's now is likely to become an even more serious problem with the advent of connected and autonomous vehicles, as well as with the advent of commercial drone services. In particular, drones will experience line-of-sight pathloss over wide geographic areas even at low altitude, making them especially vulnerable to deliberate or inadvertent jamming, and delivery drones will be an inviting target for malicious spoofing. PPD's can also have an outsize effect on certain services being considered for connected cars, e.g., "platooning" where cars are networked together and traveling in close proximity to each other.

These EA measures are inherently effective against all of the civil Global Navigation Satellite System (GNSS) waveforms fielded or anticipated for PNT, including the next-generation GPS L5/QZSS signals and the GLONASS, Galileo, and Beidou/COMPASS, and NAVIC signals, due to the open architecture of the commercial waveforms, and due to the commonality of features between these waveforms. Moreover, the exponential experience curves in development of low-cost SDR hardware and open source software that can be hosted on that hardware, and economic pressure to maintain availability of the civil waveforms, and vulnerability to EA measures, into the future.

In addition, there is a growing need for nonmalicious synthetic GPS signals, e.g., pseudolites (a neologism for pseudo-satellites) generated by beacons, as shown in FIG. 6, for a number of burgeoning commercial applications where (and when) ultraprecise PNT is of strong importance. These applications include autonomous ground and air vehicles (i.e., self-driving vehicles and drones), where precise position and navigation is important to provide safe transit of vehicles, and 4G and 5G cellular communication networks and the Smart Grid, where precise timing and frequency synchronization is of strong importance to maximize capacity and/or reliably manage those networks. GNSS pseudolites can fill coverage holes where inherently weak GNSS waveforms are not available for reliable PNT, and even provide a means for warning drones and vehicles away from protected locations, e.g., by including messages and/or physical attributes that specifically indicate that specific locations are excluded air/ground spaces.

In the context of this problem, there is a strong need for systems and methods for detecting and mitigating jamming and spoofing measures. An approach that can use commonly, or almost universally, globally effected background signals (e.g. those generated in the GLONASS, Galileo, and Beidou/COMPASS global navigation satellite systems, by governmental navigational, and the equivalent commercial emitters), and lower-powered and thus far less expensive receiving hardware, to defeat more expensive spoofers, provides an economic as well a technical superiority that can go a long way towards successfully defeating not only present, but also future and potential interferers and hostile spoofers.

SUMMARY OF THE INVENTION

A low-cost single-feed reception system is presented that can blindly detect, differentiate and separate all of the civil GNSS signals generated by SV's, pseudolites, and nontargeted spoofers, without prior knowledge of or search over the GNSS ranging code for those signals, even if those signals are received at widely separated power levels, are using the same ranging code, or are subject to multipath that is substantively corrupting that ranging code. This system is extended to spatial/polarization diverse multifeed reception systems, which can further blindly detect and separate signals generated by repeaters, targeted spoofers, and jammers, based only on differences in channel signatures between those signals and the correct, or 'true', civil GNSS signal. The system takes advantage of the fact that any received signal, while yet unintelligible (not having been processed), is not meaningless; and effects intelligent discrimination through physically corroborative (or negating) evidential observation of properties necessarily associated that signal (metadata) which are unrelated to its information content (message). These properties are used to discriminate between 'wrong' (erroneous or falsified; accidentally sent to, or otherwise not meant for, that receiver) and 'candidate' (not proven wrong) signals—and limits further processing for content to the latter subset of all signals received, thus reducing the computational load.

The invention comprises a system having identifying means comprising at least one antenna and at least one receiver receptive to energy in the GPS L1 band, such identifying means receiving, amplifying, frequency-shifting, and filtering at least one signal-in-space containing coarse acquisition (C/A) code from GPS satellites, pseudolites, and spoofers; a frequency converter that shifts at least one signal-in-space to an intermediate or complex baseband frequency; at least one analog-to-digital (ADC) convertor that converts that frequency converted signal to at least one real or complex data stream; and digital signal processing (DSP) hardware (FPGA, DSP, GPU, or the like, with associated storage capability), and software or firmware installed on that DSP hardware that performs blind adaptive processing operations on that at least one real or complex data stream.

The receiver receives signal energy (a 'signal') that is a common to any of a set of globally-available and public signals in the GPS L1 band, that contains coarse acquisition (C/A) signal (for example, generated by GPS satellites, pseudolites, and spoofers), and that purports to be from any set of a satellite vehicle (SV) and pseudolite within that system's field of view (FoV). The system next downconverts through at least one analog-to-digital converter that signal such that both the signal's physical properties and logical aspects can be analyzed, evaluated, and/or used. Next, the system performs an adaptive despreading implementation to blindly detect, demodulate, and determine geo-observables of the GPS C/A code. In one embodiment, the combined Doppler shift of and receive frequency uncertainty on the signal, is determined from the Binary Phase-Shift Keying (BPSK) modulated signal using a conjugate-self-coherence-restoral (conjugate-SCORE) implementation. In another embodiment, the invention exploits the modulation-on-symbol property of C/A code.

That signal's navigation (NAV) signal is demodulated and that result is compared to the standard which may be any of stored, known from current ongoing processing, or obtained from internet sources, to determine the current, and site-specific, SINR norm for the signal, and to more finely determine the distortions in the frequency of acquisition (FOA), thus providing a 'deduced' Signal-to-Interference-and-Noise-Ratio (SINR) for the signal. This deduced SINR is compared against the value for the context- and time-specific SINR experienced by the unit and discrepancies are noted and used to refine the analysis.

The received signal is then examined and any detected preamble is used to resolve the BPSK sign and subframe timing.

Because this invention does not depend on the signal's spreading code (so it is 'blind' to that part of the message's context and form), it is inherently robust when differentiating multipath variations of any received signal. Also, the signal's FOA alone is sufficient to effect geolocation differentiation when this invention combines it with the SV ephemeres that are transmitted with and distinguishable within the NAV field. The quality and speed of identification, processing, and classification are further assisted with the copy-aided TOA estimation described below, but not dependent upon it.

Candidate SV and beacon signals that survive the initial sorting procedure are then passed to a next step, which computes the fine-TOA, FOA Nyquist zone, and (for multifeed systems) direction-of-arrival (DOA) for the candidate signals, using a copy-aided parameter estimation procedure, i.e., "full" geo-observables for the detected signals. If an initial fix on the receiver location exists, detected signals with full geo-observables that are inconsistent with ephemeris obtained from the NAV data field now can be also assigned to a spoofer database. The system thereby is determining any of whether, when, and how these respective values match and fail to match; and validating each received candidate signal by using that determination.

Along with signal reception, demodulation and geo-observable estimation, the system updates its Positioning, Navigation, and Timing tracker by using common geo-observables and SV data, comparing and updating any elements against and within the spoofer database, thereby correcting for tracker error degraded by new SVs. At this stage of processing, signals that have been tentatively assigned to the spoofer databases, e.g., due to shared PRN's, are resolved, separating these into Candidate (validated) or non-Candidate (invalidated) signals.

The characteristics of a received signal that is not validated, and more particularly any difference(s) with the values for the same respective characteristics in the spoofer database, is then analyzed to effect a geolocation of the spoofers based on the receiver's known PNT data.

Then the system determines any set of its sample rate, sample phase, or local oscillator (LO) offset, to be used to update its evaluative and self-positioning functions.

The system next effects, for any validated received signal, an active despreading of the Candidate signal to process the logical, contained message therein (as distinct from the meta-signal values such as frequency and/or timing offsets, geolocation and/or preamble keying validation cues). Channelization methods of multiple, alternative, or comparative and cross-validating application, are engaged. These channelization methods can include any of S/P (serial-to-parallel)-based ($M_{DoF}=M_{ADC}$; or General $M_{DoF}$); FFT (Fast Fourier Transform)-based; Single-Period based; Frequency-Analyzer based; and General Multiple-Period based.

BRIEF DESCRIPTION OF THE DRAWINGS

FIG. 3 shows a tabular description of GNSS networks employing civil GNSS signals that are exploitable by the invention.

FIG. 4 is also a drawing of the prior art, showing an exemplary of the front-end reception processing for any single-feed receiver receiving GNSS signals; with 3(a) showing a direct-conversion receiver front-end that can be tasked to multiple GNSS bands; and 3(b) showing a front-end for a direct-conversion receiver that is dedicated to a specific GNSS band. Each can be used as a part of, and in, at least one embodiment of the invention, reducing any cost of both developing and deploying the invention.

FIG. 10 is a collection of tabular details of summary signal TOA, FOA, and RIP parameters for the exemplary scenario of FIG. 6 measured in 1 millisecond increments for a 10 second interval.

FIG. 11 is a collection of tabular details of summary Azimuthal Signal and Elevation Signal LOB parameters, for the exemplary scenario of FIG. 6 measured in 1 millisecond increments for a 10 second interval.

FIG. 12 a collection of tabular details of summary Azimuthal Signal and Elevation Signal DOA parameters, for the exemplary scenario of FIG. 6 measured in 1 millisecond increments for a 10 second interval.

FIG. 21 is a tabular summary of complexity of an exemplary instantiation of the blind despreader.

DETAILED DESCRIPTION OF THE INVENTION

Overview

The invention described herein is a blind, adaptive, despreading, anti-spoofing system for radio transmission comprising at least one antenna and at least one receiver, each receptive to energy in the GPS L1 band, connected to identifying means for receiving, amplifying, and filtering at least one signal-in-space containing coarse acquisition (C/A) code from any of the set of GPS satellites, pseudolites, spoofers, and repeaters; said identifying means further comprising a frequency converter that converts the at least one signal-in-space to a frequency converted signal having any of an intermediate and complex baseband frequency, connected to said means for receiving, amplifying, and filtering; with said frequency converter further comprising at least one analog-to-digital convertor that converts that frequency converted signal to any of a real data stream and complex data stream; and said analog-to-digital converter connected with digital signal processing hardware, memory capacity connected to said digital signal processing hardware for storing any of the real data stream and complex data stream and said analog-to-digital convertor; and at least one processor with any of installed software or connected firmware, that performs blind adaptive processing operations on any of that real data stream and complex data stream.

Figure 9:
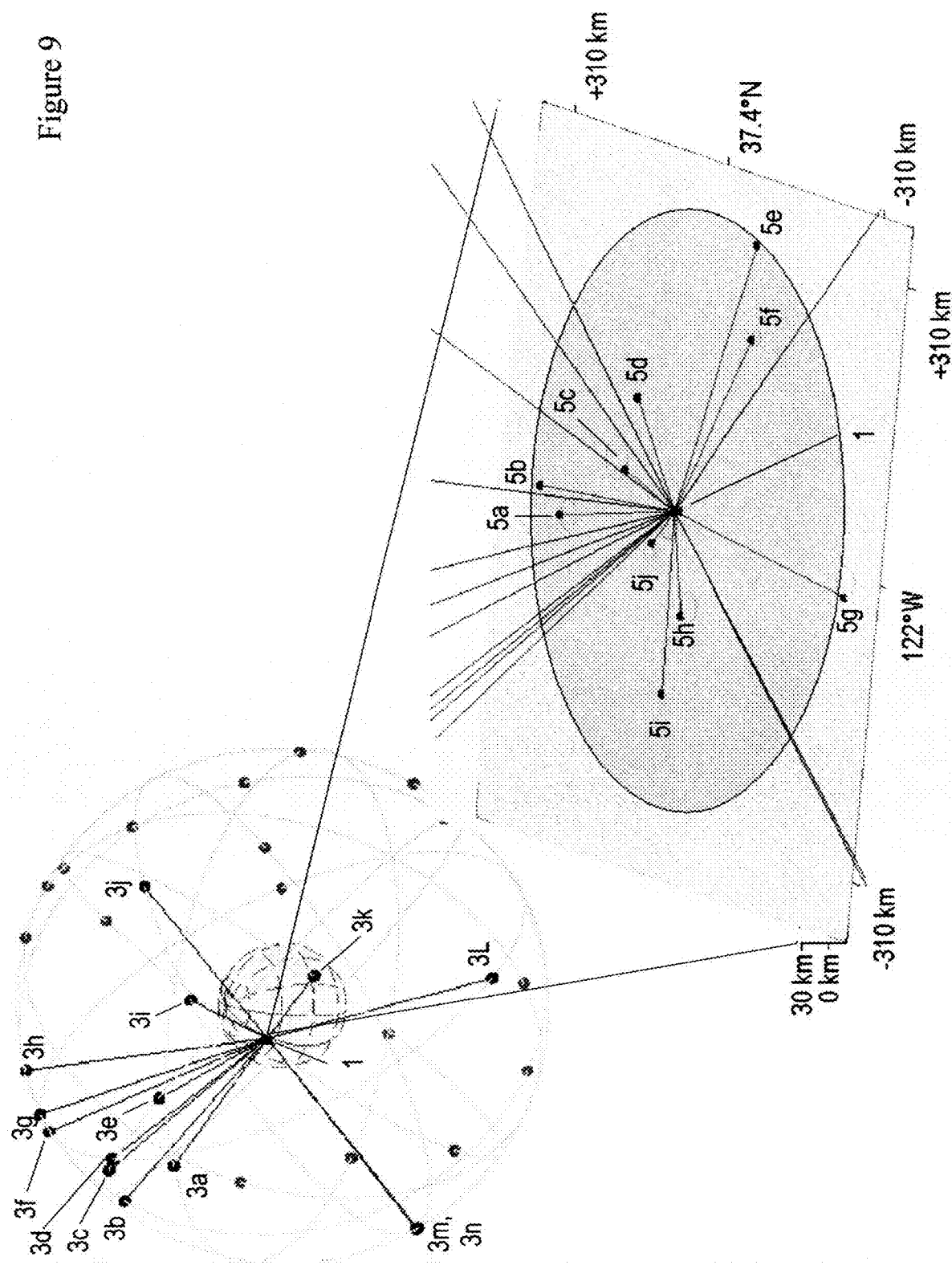
FIG. 9 is a drawing showing on the upper left the global orbital satellite system with the lines-of-transmission from a subset of 14 GNSS SV's (3a-3n) within the effective field of view of a target GNSS receiver at or near the surface of the globe, and on the bottom right depicting geometry local to that intended GNSS receiver (1), showing that the receiver is aboard a moving platform with altitude and velocities/accelerations consistent with a loitering high-altitude airborne unattended aerial system (UAS), and receiving transmissions from both the 14 GNSS SVs (3a-3n) and 10 additional terrestrial beacons (5a-5j), with altitudes and velocities/accelerations consistent with loitering small UAS's (sUAS's).

FIG. 10 through FIG. 12 summarize key TOA, FOA, RIP (FIG. 10), LOB (FIG. 11), and local DOA (FIG. 12) parameters obtained for the reception scenario shown in FIG. 9, measured in 1 millisecond (ms) increments over a 10 second (s) interval. Results are compiled separately for the GNSS SV's and the beacons, in order to contrast differences in statistics between the two transmitter types.

The SV and beacon signal TOA's adhere closely to a first-order drift model over 10 s intervals. However, the SV and beacon TOA's are distributed over distinctly different ranges, e.g., 68-86 ms for the SV's, and 0.21 to 1.01 ms for the sUAS beacons, consistent with 310 km ground horizon for a Reaper Unattended Aerial System (UAS, or high performance drone) flying at its operational altitude. Low-altitude platforms, e.g., small UAS's (sUAS's, e.g., commercial drones) and ground vehicular receivers will see beacon TOA's with even smaller ranges of value. In addition, the TOA drift rate is much lower for the beacons (0.16 µs/second median absolute drift rate) than for the SV's (1.3 µs/second median absolute drift rate), due to the much higher observed speed of the medium earth orbit (MEO) satellites.

The SV and beacon signal FDA's also adhere closely to a first-order drift model over 10 s intervals. However, the second-order difference is large enough to cause FOA shifts on the order of 1 Hz over a 10 s interval. Consequently, higher-order FOA models may be needed under some reception scenarios.

The SV and beacon signal RIP's adhere closely to a zero-order drift model over 10 s intervals, exhibiting a median first-order power drift of 0.00012 dB/s. However, the SV RIP's (−139 dBm median RIP) are much weaker than the beacon RIP's (−113 dBm median RIP), despite the 15 dB lower assumed transmit equivalent isotropic radiated power (EIRP, maximum directional energy) for the beacons.

The SV and beacon signal LOB's adhere to a zero-order azimuthal and elevation drift model over 10 s intervals, exhibiting a median absolute differential azimuth and elevation of 0.0076°/s and 0.0024°/s, respectively. However, the median absolute azimuth and elevation DOA drift rates jump to 0.31°/s and 0.012°/s, respectively. The azimuthal drift rate is nearly identical for all of the received signals, due to motion of the receiver, which completes a 360° circuit every 19 minutes in the scenario assumed here. The TOA and FOA drift will be substantive over reception intervals employed by invention. However, the effect of DOA drift will be minor if antennas that are isotropic in azimuth are employed by the receiver.

Figure 2:
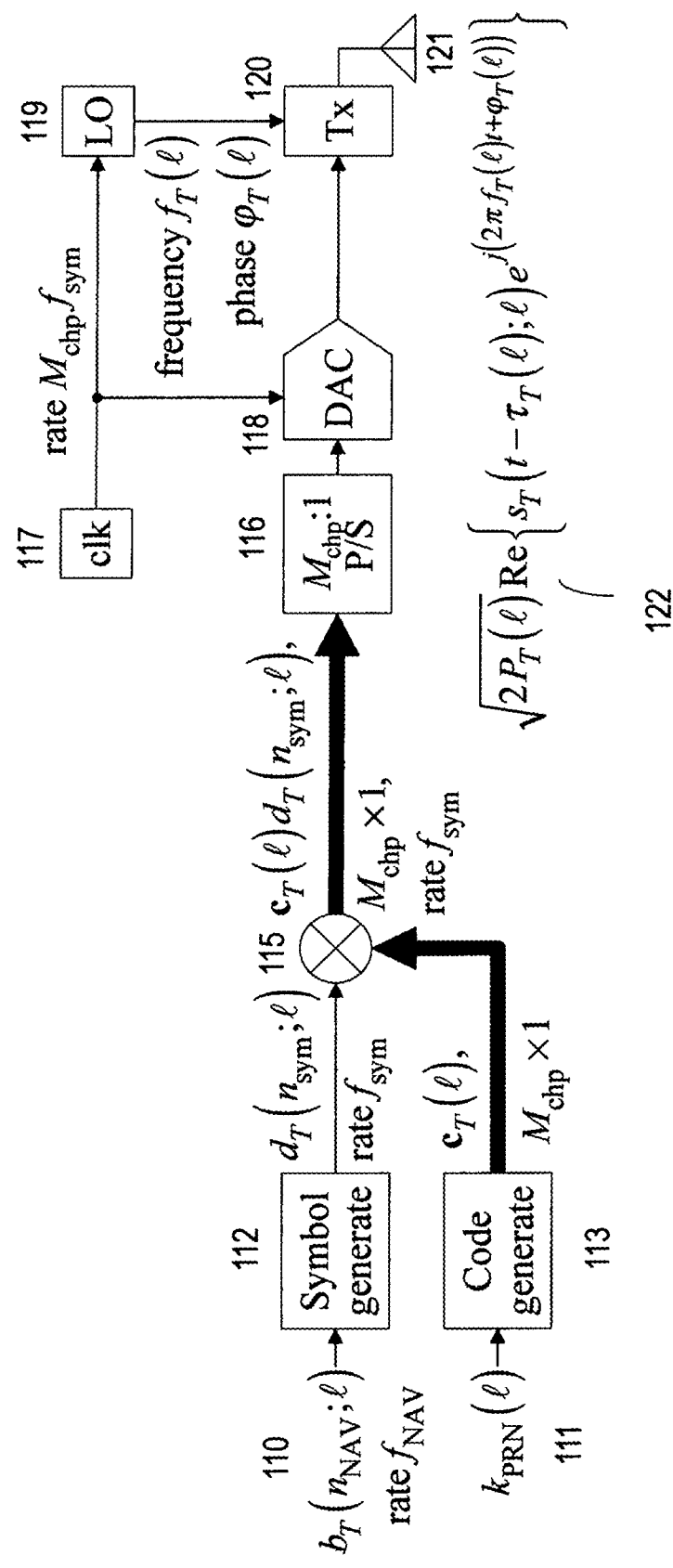
FIG. 2 is also a drawing of the prior art, showing the exemplary civil GNSS short-code signal generation model for Civil GNSS Transmission Operations.

In an initial embodiment a single antenna receives a signal-in-space (SiS) and passes that through the identifying means that the system will use to frequency-convert the signal to complex baseband, and to convert the signal to a complex digital data stream with a complex sampling rate of $M_{ADC}f_{sym}$, where $f_{sym}$ is the symbol rate of the baseband data sequence being spread by the $M_{chp}$-chip ranging code in FIG. 2, e.g., 1 ksps (kilosample per second) for any of the civil GNSS signals shown in FIG. 3, and $M_{ADC}$ is an integer. The integer $M_{ADC}$ is typically on the order of $M_{chp}$, e.g., 1,023 for the GPS L1 C/A signal, in order to achieve the full processing gain of an adaptive despreader. However, it can be an arbitrary integer of convenience to the receiver. The signal is then passed through a $1:M_{ADC}$ serial-to-parallel (S/P) converter, resulting in an $M_{ADC} \times 1$ vector sequence with a data rate of $f_{sym}$.

In alternative embodiments, the signal is received over $M_{feed}$ spatially or polarization diverse feeds (one feed for each antenna), coherently converted to complex baseband, and digitized at an $M_{ADC}f_{sym}$ sampling rate, resulting in $M_{feed}$ data streams, each with an $M_{ADC}f_{sym}$ data rate. In an optional further embodiment a beamforming network (BFN) is implemented between the antennas and the receivers. In this case, the antennas are coupled with $M_{feed}$ receivers through a BFN with an input port connected to each antenna, and with $M_{feed}$ output ports (generally not equal to the number of antennas, and typically less than the number of antennas). Each signal is then passed through a $1:M_{ADC}$ serial-to-parallel (S/P) converter, and "stacked" into an $M_{DoF} \times 1$ vector with a data rate of $f_{sym}$, where $M_{DoF}=M_{feed}M_{ADC}$ is the degrees of freedom (DoF) of the receiver.

In theory, the resultant $M_{DoF} \times 1$ signal sequence can be processed using fully-adaptive blind despreading methods that can achieve the maximum attainable signal-to-interference-and-noise ratio (SINR) of the despreader, allowing detection and demodulation of many more symbol sequences than conventional spread-spectrum receivers that use correlative or "matched filter" despreading methods, and successful demodulation at power differences that are much higher than the conventional jamming ratio of correlative despreaders. Moreover, blind despreading methods can acquire spread spectrum signals without a search over code family or timing offset, which can require acquisition times on the order of tens of minutes in cold-start scenarios.

Despite these advantages, however, the dimensionality of the linear combiner used in the adaptive despreader has generally entailed a computational processing cost that is too high for fully-adaptive blind despreading methods to be feasible or even possible. Gradient-based methods such as normalized least mean squares (NLMS) or normalized constant modulus algorithm (NCMA) with $O(M_{DoF})$ complexity have been subject to extreme slow convergence in presence of strong jamming interference, due to the well-known wide eigenvalue spread condition that occurs in presence of strong interference. And rapidly-converging methods such as Affine Projections, block least-squares (BLS) and block least-square constant modulus algorithm (CMA; conjoined, BLS-CMA) have had prohibitively high $O(M_{DoF}^2)$ complexity, and required adaptation over block sizes typically on the order of integer multiples of $M_{DoF}$ samples, e.g., multiple seconds, to be considered feasible for most uses or existing, non-specialized, commercially feasible hardware and firmware implementation(s).

However, as capabilities of modern digital signal processing equipment have continued to improve, fully adaptive blind despreading methods have become increasingly feasible. Motivated by these developments, the present invention and its implementation have been developed to realize the promise of these methods.

DETAILED DESCRIPTION OF THE DRAWINGS

Figure 1:
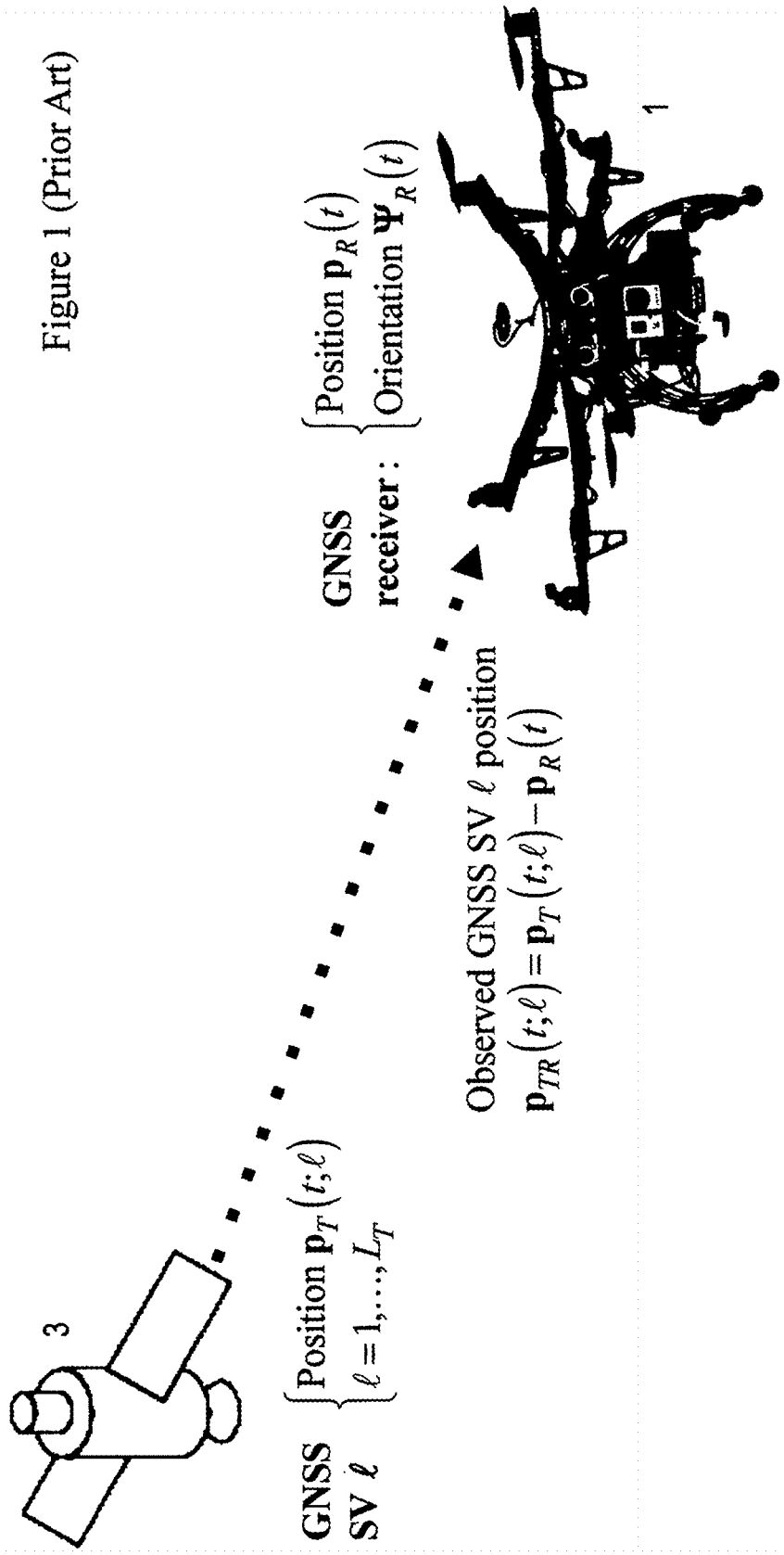
FIG. 1 is a drawing of the prior art, showing a model of the presumed normal condition wherein a receiver (1) is receiving GPS signals from a SV (3).

FIG. 1, a drawing of the prior art, illustrates the presumed normal condition wherein at time T a receiver (1) is receiving GPS signals from a transmitter SV l (3). The receiver (1) has a position at time of transmission t represented by 3×1 vector $p_R$ (t) and an orientation at time of transmission t represented by 3×3 orientation matrix $\Psi_R(t)$; the SV l has a position at time of transmission t represented by 3×1 vector $p_T(t;l)$. From the point of view of the receiver (1), the observed position of SV l at time of transmission t is represented by 3×1 vector $p_{TR}(t;l) = p_T(t;l) - p_R(t)$.

FIG. 2, also a drawing of the prior art, shows a GNSS short-code signal generation model for Civil GNSS Transmission Operations, wherein for transmission (7) at link l, a symbol generator (112) takes an intended stream of navigation symbols $b_T(n_{NAV};l)$ (110) with sequence index $n_{NAV}$ and transmission rate $f_{NAV}$, and generates a stream of transmit data symbols $d_T(n_{sym};t)$ with sequence index $n_{sym}$ and baseband symbol (transmission) rate $f_{sym}$; while a code generator (113) takes a pseudorandom noise (PRN) code index $k_{PRN}(l)$ (111), taken from a known set of PRN codes, for that transmitter, and generates an $M_{chp} \times 1$ PRN code vector $c_T(l) = [c(m_{chp}; k_{PRN}(l))]_{m_{chp}=0}^{M_{chp}-1}$. The stream of symbols $d_T(n_{sym};l)$ is combined with the spreading code at the mixer (multiplier element) (115), resulting in $M_{chp} \times 1$ vector symbol sequence $C_T(l)d_T(n_{sym};l)$, and fed to a $M_{chp}$:1 parallel-to-serial (P/S) converter (116), resulting in a spread digital signal with rate $M_{chp}f_{sym}$. The spread digital signal is then passed to a digital-to-analog converter (DAC) (118), which pulse-amplitude modulates the digital signal at interpolation rate $M_{chp}f_{sym}$ controlled by a transmitter clock, also operating at rate $M_{chp}f_{sym}$ (117) (less adjustments to compensate for relativistic effects due to the SV's altitude and velocity), which controls both the DAC (118), and a local oscillator (LO) (119). The LO (119) generates a sinusoidal mixing signal at frequency $f_T(l)$, which combines with the DAC output signal in a transmitter (120) and transmitted through an antenna (121) to create a signal-in-space (SiS) comprising the complex baseband signal, frequency-shifted to transmit frequency $f_T(l)$ and with phase offset $\varphi_T(l)$ (122).

With the exception of the GLONASS (Russian) GNSS signal, the transmit frequency employed by each SV is identical, such that $f_T(l) \equiv f_T$. In addition, for all of the civil GNSS signals, $f_T(l)$ is an integer multiple of the baseband symbol rate, such that $f_T(l) = M_T(l)f_{sym}$ for some positive integer $M_T(l)$. However, neither assumption need hold, or even be known in some instantiations, for the invention to be implemented.

The interpolation function used in the DAC is also typically a rectangular pulse. However, this assumption need not hold, or even be known in some instantiations, for the invention to be implemented.

It should be noted that the processing steps shown in FIG. 2 is one conceptual means for generating civil GNSS signals, and ignore other SiS's that may be transmitted simultaneously with civil GNSS signals, for example, the GPS P, P(Y), M, and L1C SiS's. In practice, these signals are largely outside the band occupied by the civil GNSS signals, and moreover are received well below the noise floor. Therefore, their effect on the invention described herein is small. An important exception is military GNSS signals that may be generated by terrestrial pseudolites, as the non-civil components of those signals may be above the noise floor within the civil GNSS passband in some use scenarios.

The processing steps shown in FIG. 2 generate a particular class of spread spectrum signal, referred to herein as a modulation-on-symbol direct-sequence spread spectrum (MOS-DSSS) signal, described in more detail below, in which the spreading code used to spread each data symbol $d_T(n_{sym};l)$ is repeated within that data symbol, such that the rate $M_{chp}f_{sym}$ spread data sequence generated by the P/S converter (116) can be expressed as $c_T(n_{chp} \bmod M_{chp};l)d_T(\lfloor n_{chp}/M_{chp}\rfloor;l)$, where (•)mod M and $\lfloor • \rfloor$ denote the modulo-M operation and integer truncation operations, respectively. As shall be described below, this property induces inherent massive spectral redundancy to the civil GNSS format that is exploited by the invention described herein.

FIG. 3 provides a tabular description of GNSS networks employing civil GNSS signals that can be modeled MOS-DSSS signals. As this Figure shows, every GNSS network deployed to date possesses at least one signal type that can be modeled by FIG. 2. Moreover, all of these signals have a 1 millisecond (ms) ranging code period, and therefore a 1 ksps (kilosample per second) MOS-DSSS baseband symbol rate, albeit with widely varying chip rates and SiS bandwidths, allowing their demodulation using a common receiver structure. Lastly, as the last column of FIG. 3 shows, the symbol streams of each of these signals possess properties that can be used to detect and differentiate them from other signals in the environment, including military GNSS signals, jammers, and civil GNSS signals with the same or similar properties. For example, the GPS coarse acquisition (C/A) signal listed in the first row of FIG. 3 is constructed from a 50 bit/second (bps) BPSK (real) navigation sequence $b_T(n_{NAV};l)$, repeated 20 times per MOS-DSSS symbol to generate 1 ksps symbol sequence $d_T(n_{sym};l) = b_T(\lfloor n_{sym}/M_{NAV}\rfloor;l)$ where $M_{NAV}=20$. Moreover, $b_T(n_{NAV};l)$ possesses internal fields that can be further exploited to aid the demodulation process, e.g., the TLM Word Preamble transmitted within every 300-bit Navigation subframe. FIG. 4, also a drawing of the prior art, shows exemplary direct-conversion front-end reception processing for any single-feed receiver receiving GNSS signals; with FIG. 4A showing a direct-conversion receiver front-end that is dedicated to a specific GNSS band, and FIG. 4B showing a direct-conversion receiver front-end that can be flexibly tasked to any GNSS band, consistent with a software defined radio (SDR) architecture. Each can be used as a part of, and in, at least one embodiment of the invention.

Both direct-conversion receivers shown in FIG. 4 comprise the following:

An antenna (128) and low-noise amplifier (LNA) (131), which receives an SiS containing GNSS emissions within the FoV of the receiver.

A local oscillator (LO) (133), which generates a complex sinusoid with frequency $f_R$ and phase $\varphi_R$, comprising an in-phase (I) real sinusoid, and a quadrature (Q) sinusoid shifted by 90° in phase from the in-phase sinusoid;

A complex mixer (134), which multiplies the LNA output signal by the conjugate of the complex sinusoid, thereby creating a complex signal with real and imaginary parts, referred to herein as the in-phase (I) and quadrature (Q) rails of that signal, which has been downconverted by frequency shift $f_R$.

A dual lowpass filter (LPF) (135), which filters each signal rail to remove unwanted signal energy from the complex downconverted signal, yielding analog scalar complex-baseband signal $x_R(t-\tau_R)$, centered at 0 MHz if $f_R=f_T$, where $\tau_R$ is the delay through the receiver electronics.

A dual analog-to-digital converter (ADC) (136), which samples each rail of $x_R(t-\tau_R)$ at rate $f_{ADC}=M_{ADC}f_{sym}$, where $f_{sym}$ is the civil GNSS signal symbol rate shown in FIG. 2 and $M_{ADC}$ is a positive integer, thereby generating complex dual-ADC output signal $x_{ADC}(n_{ADC})$ with time index $n_{ADC}$ (137).

The receiver structure shown in FIG. 4A possesses an additional bandpass filter (BPF) (130), inserted between the antenna and LNA, and dedicated to a specific GNSS band, which removes unwanted adjacent-channel interference (ACI) from the received GNSS SiS, and depicts an LO that is locked to specific, preset value, consistent with a dedicated receiver that is optimized for a specific GNSS band. This structure is more typical of existing GNSS receivers, and provides enhanced signal quality at cost of receiver flexibility.

In contrast, the receiver structure shown in FIG. 4B is consistent with SDR receivers that can be tasked to any GNSS band under user control. This receiver structure can also be used to receive a segment of a GNSS band, e.g., a 1 MHz segment of the GPS L5 band, if $f_R$ is significantly offset from the GNSS band center $f_T$. The ability to blindly detect, demodulate, and estimate geo-observables of any portion of any GNSS band, using the same reception, downconversion, and sampling hardware regardless of the actual bandwidth of the GNSS signals present in that band, is an important feature of the invention.

Figure 5:
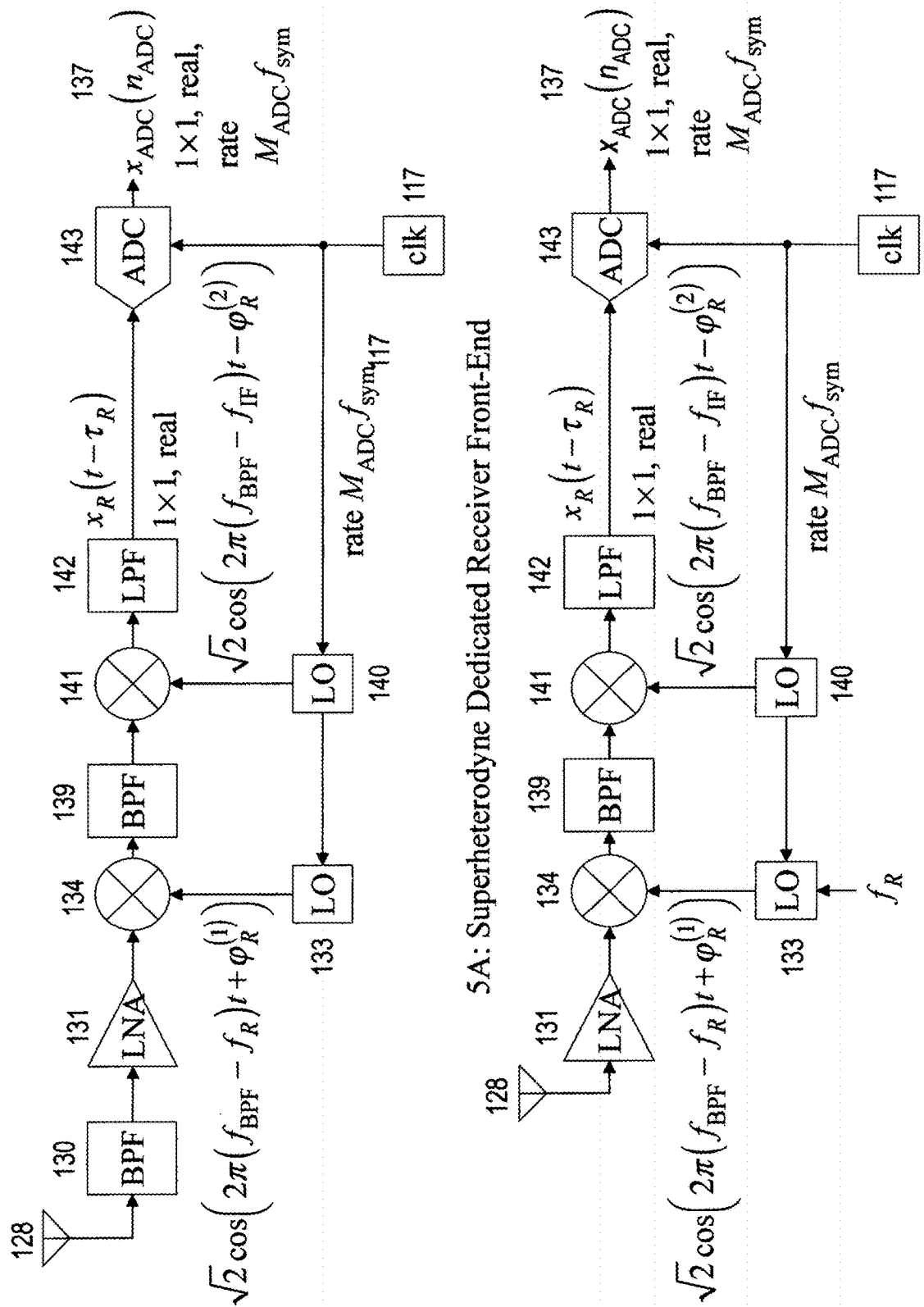
FIG. 5 is also a drawing of the prior art, showing an exemplary of the front-end reception processing for any single-feed superheterodyne receiver receiving GNSS signals; with 4(a) showing a superheterodyne receiver front-end that can be tasked to multiple GNSS bands, and 4(b) showing a superheterodyne dedicated receiver front-end that is dedicated to a specific GNSS band. Each can be used as a part of, and in, at least one embodiment of the invention, reducing any cost of both developing and deploying the invention.

FIG. 5, also a drawing of the prior art, shows an exemplary of the front-end reception processing for any single-feed superheterodyne receiver receiving GNSS signals; with FIG. 5A showing a superheterodyne receiver front-end that is dedicated to a specific GNSS band, and FIG. 5B showing a superheterodyne receiver front-end that can be flexibly tasked to multiple GNSS bands. Each can be used as a part of, and in, at least one embodiment of the invention.

The heterodyne receivers shown in FIG. 5 shift the SiS received by an antenna (128) and amplified in an LNA (130) to IF frequency $f_{IF}$, typically using a two-stage mixer as shown in this Figure, yielding analog scalar real-IF signal $x_R(t-\tau_R)$ centered on IF frequency $f_{IF}$ if $f_R=f_T$, with receive phase-shift $\varphi_R=\varphi_R^{(1)}+\varphi_R^{(2)}$ and delay $\tau_R$ induced through the receiver electronics. The analog signal is then passed to an ADC (143) that samples $x_R(t-\tau_R)$ at rate $M_{ADC}f_{sym}$, where $f_{sym}$ is the civil GNSS signal symbol rate shown in FIG. 5 and $M_{ADC}$ is a positive integer, yielding real ADC output signal $x_{ADC}(n_{ADC})$ with time index $n_{ADC}$ (137). The receiver structure shown in FIG. 5A can be optimized for a specific GNSS band, while the receiver structure shown in FIG. 5B can be flexibly tasked to different GNSS bands, or to segments of GNSS bands, under software control.

As will be discussed below, the ADC output signal provided by either the direct-conversion or the superheterodyne receivers can be used by the invention, without any change to the invention design except control parameters used in channelization operations immediately after that ADC. The invention can also be used with many other receiver front-ends known to the art. In many cases, the invention is itself blind to substantive differences between those receiver front-ends.

Figure 6:
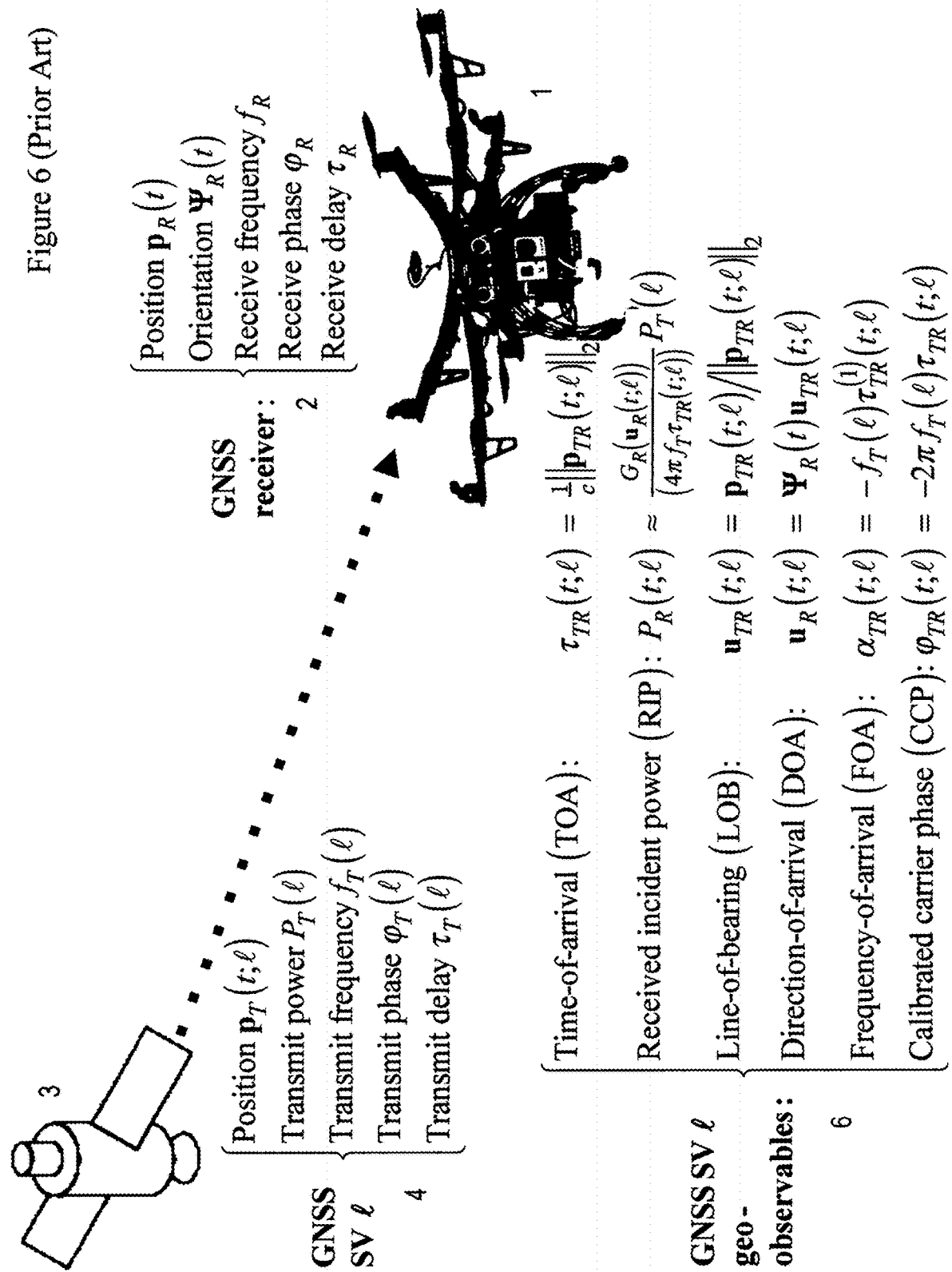
FIG. 6 is also a drawing of the prior art, showing the exemplary GNSS SV geo-observables (the metadata of any signal), including the position and transmit power, frequency, phase, and delay for any GNSS SV (1); the geo-observables for any GNSS receiver (1) including its position, orientation, and receive frequency, phase, and delay; and the signal's geo-observables, including its TOA, RIP (Received Incident Power), LOB (Line of Bearing), DOA, FOA, and CCP (Calibrated Carrier Phase).

FIG. 6 is also a drawing of the prior art, showing the exemplary observable parameters of signals transmitted from a GNSS SV (3) to a GNSS receiver (1) that can be used to geo-locate those signals ("geo-observables") (6), as a function of parameters local to the GNSS SV (4) and the GNSS receiver (2). These geo-observables include the time-of-arrival (TOA) (after removal of delays induced in transmitter and receiver electronics), received incident power (RIP), line-of-bearing (LOB), direction-of-arrival (DOA) relative to the platform orientation, frequency-of-arrival (FOA) (after removal of known frequency offset between the transmitter and receiver center frequencies), and carrier phase (after calibration and removal of transmitter and receiver phase offsets), which are measurable and differentiable at the receiver (1).

Figure 7:
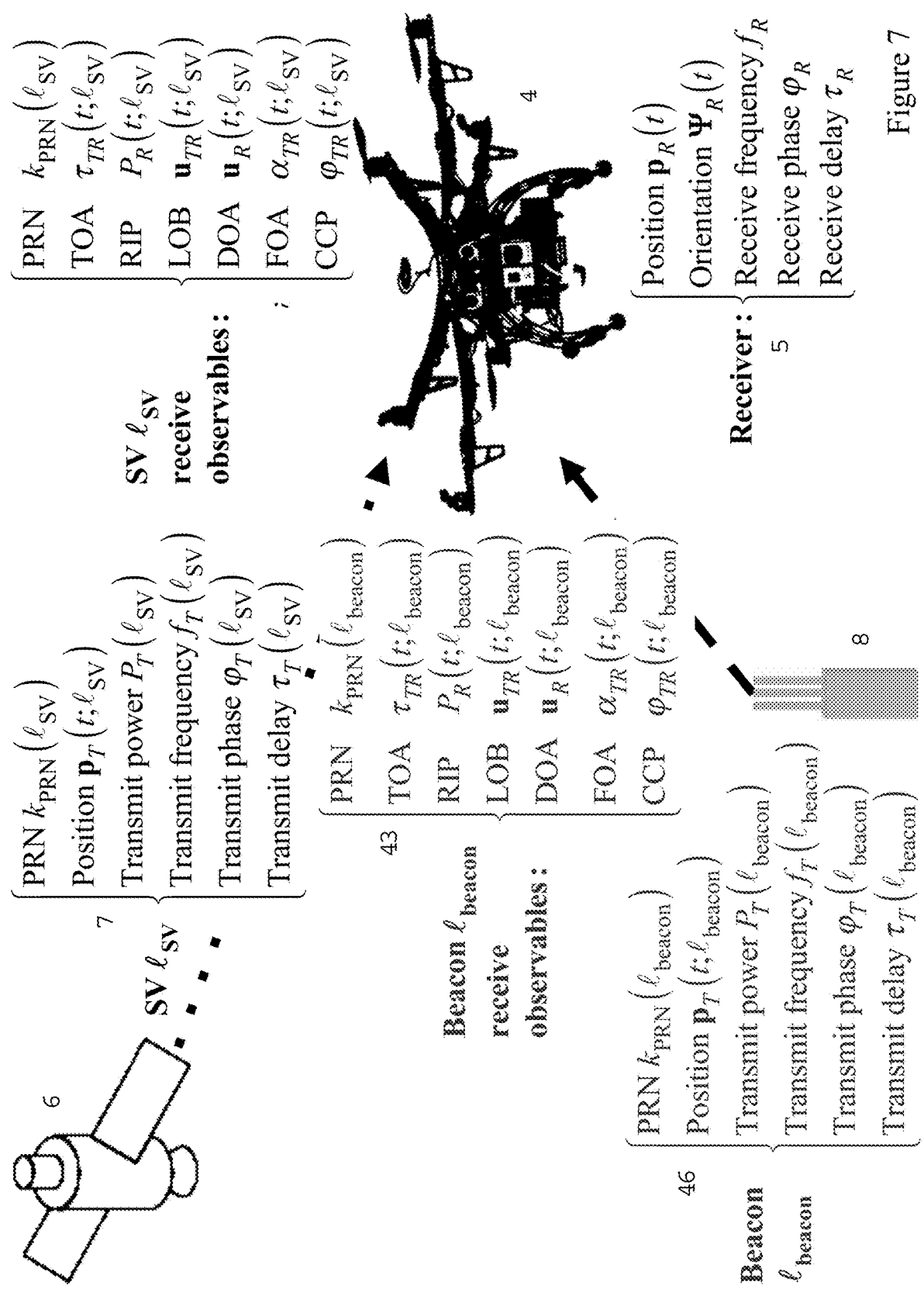
FIG. 7 is a drawing of an exemplary scenario where a receiver (1) is receiving GPS signals from each of a SV (3) and a beacon (5) that is presumably on or near the ground. As before the receiver and SV have their geo-observables, as does the beacon (5) which also include its position and transmit power, frequency, phase, and delay; however, both the SV (3) and beacon (5) have for their respective signals their individual PRN.

FIG. 7 is a drawing of an exemplary scenario in which a receiver (1) is receiving GNSS signals from each of a SV (3) and a beacon (5) that is presumably on or near the ground. As before, the receiver can estimate measurable and differentiable observables for the beacon (13) and the SV (8). In addition, it is assumed that the beacon (5) and SV (8) are each employing spreading codes that are uniquely different, e.g., through use of PRN codes with different indices.

Figure 8:
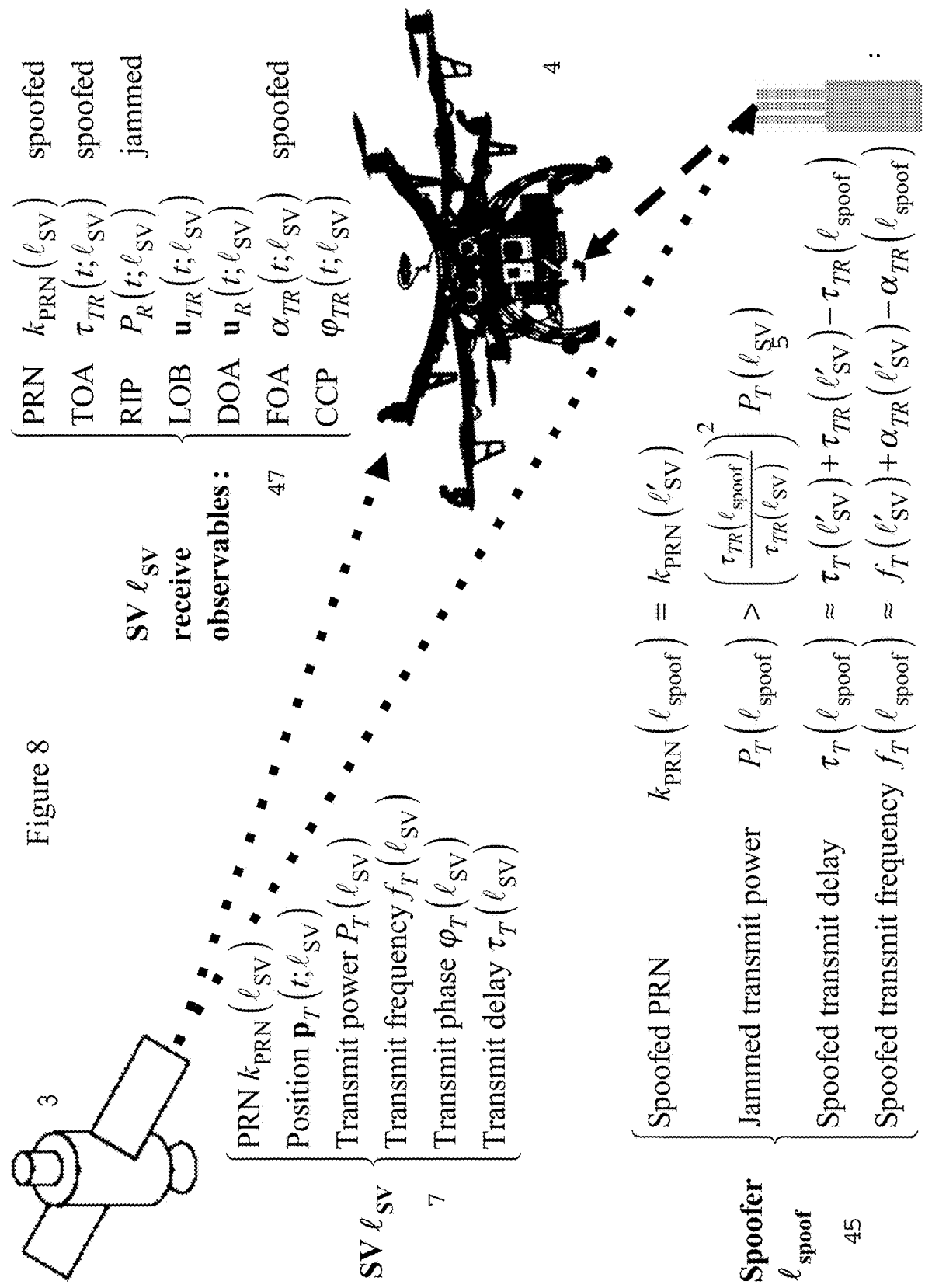
FIG. 8 is a drawing of an exemplary, targeted spoofing scenario, where a receiver (1) receiving a signal from a SV (3) is also receiving a signal from a spoofer (7), that is attempting to deceive the receiver (1). The spoofer (7)

FIG. 8 is a drawing of an exemplary, targeted spoofing scenario, where a receiver (1) is receiving GNSS signals from each of a SV (3) and a spoofer (7), presumably on or near the ground, that has targeted that SV (3) and is attempting to deceive that receiver into replacing the SV's signal with its own signal. In particular, the spoofer is observing the targeted SV (3), and/or using prior knowledge of the targeted SV's position transmission parameters (4), and generating a spoofed signal with the same spreading code as the targeted SV, a transmit power that is strong enough to jam the targeted SV's received signal, and a delay and frequency shift that have been altered to closely match the TOA and FOA of the targeted SV, based on knowledge of the receiver parameters (14) that it has also obtained. Importantly, these parameters are not likely to include the DOA of the receiver (1), which is a function of its LOB and orientation (which it may not have accurate knowledge of) and the receive antennas location on the receiver platform (which it is likely to have no knowledge of). Nor are these parameters likely to include the calibrated carrier phase (CCP), which would require centimeter-level knowledge of the receiver position to spoof.

In some scenarios, the spoofer may be emulating the targeted SV ($l'_{SV}=l_{SV}$), e.g., in order to corrupt the navigation solution for the GNSS receiver, and may be attempting to closely match its spoofed geo-observables to that SV. This is referred to as an "aligned" spoofing scenario. In other scenarios, the spoofer may be emulating a different SV than the targeted SV ($l'_{SV} \neq l_{SV}$), in order to deceive the receiver into thinking that it is in another location entirely. This is referred to as a "nonaligned" spoofing scenario. In the latter case, multiple SV's in the field of view of the receiver must be spoofed. For practical reasons, all of these spoofed signals may be transmitted from the same location.

In some scenarios, the spoofer power level may be closely aligned with (but strong enough to jam) the power level of the targeted SV, in order to prevent the receiver from detecting the spoofing based on simple power-level differences between the SV and spoofer RIP. This is referred to as a "covert" spoofing scenario. In some scenarios, it may suffice to overwhelm the receiver with the spoofed SV signals, for example, if the spoofer is used in a "personal privacy spoofer (PPS)" to deceive a GNSS logger that is co-located with the PPS. Indeed, in such a case, it may not be feasible to closely align the RIP's of the spoofer and targeted SV signals.

FIG. 9 shows an exemplary reception scenario in which a loitering airborne GNSS receiver (1) is operating in the field of view of 14 GNSS SV's (3a-3n) and 10 loitering airborne beacons (5a-5j). The GNSS receiver dynamics are consistent with a Reaper unattended aerial system (UAS) flying at a 7,500 meter altitude, and moving along a 32.5 km diameter, 19 minute counter-clockwise circular track, consistent with a 89 meter/second (200 mps) constant airspeed and 1/20 gravity inward centripetal acceleration. The receive antenna is assumed to have isotropic gain, and is oriented in the direction of travel for the receiver, with a 2.7° inward roll consistent with the UAS acceleration. The GNSS SV's are assumed to be part of a 32-SV medium Earth orbit (MEO) GNSS network, organized into 8 orbital planes with 4 SV's per plane, placing between 7 and 16 SV's (median 12 SV's) within the FoV of the receiver over the course of a single day; 14 SV's are in the FoV of the receiver in this example. The terrestrial beacons' dynamics are consistent with small UAS's (sUAS's), flying at 12-to-120 meter altitudes, ±45 meter/second (±100 mph) airspeeds (negative airspeed for clockwise circular tracks), and 1/200 to 1/100 gravity inward centripetal acceleration. The SV's are each assumed to have a 15 dBW transmit EIRP, consistent with the GPS L1 C/A signals, and the beacons are each assumed to have a 0 dBW transmit power, consistent with commercially available low-power transmitters such as personal privacy devices (PPD's). This scenario provides an illustrative range of TOA's, FOA's, RIP's, LOB's, and DOA's for a reception scenario that is pertinent to the invention.

FIG. 10 provides a tabular summary of the TOA (FIG. 10A), FOA (FIG. 10B), and RIP (FIG. 10C) of the SV and beacon signals received under the reception scenario shown in FIG. 9, using statistics computed every millisecond over a 10 second interval. Results are compiled separately for the GNSS SV's and the beacons, in order to contrast differences in statistics between the two transmitter types and transmission platforms. Results are compiled separately for the GNSS SV's and the beacons, in order to contrast differences in statistics between the two transmitter types and transmission platforms. Parameters tabulated in this Figure include minimum, maximum, and median ranges; and results of linear regression analyses to determine closeness of fit of parameters to a zero-order time-variation model, in which parameters are constant over 10 seconds; a first-order time-variation model, in which parameters evolve linearly over 10 seconds); and a second-order time-variation model, in which parameters evolve at a quadratic rate over 10 seconds. Observations that can be made for this Figure are as follows:

The SV and beacon signal TOA's adhere closely to a first-order TOA drift model over 10 s intervals, inducing a second-order differential TOA (DTOA) of <100 nanoseconds (ns) over 10 seconds. However, the SV and beacon TOA's are distributed over distinctly different ranges, e.g., 68-86 ms for the SV's, and 0.21-1.01 ms for the sUAS beacons, consistent with 310 km ground horizon for a Reaper UAS flying at 7.5 km. sUAS and ground vehicular receivers will see beacon TOA's with even smaller ranges of value. In addition, the first-order DTOA is much lower for the beacons (0.16 µs/second median absolute drift rate) than for the SV's (1.3 µs/second median absolute drift rate), due to the much higher observed speed of the MEO satellites.

The SV and beacon signal FOA's also adhere closely to a first-order drift model over 10 s intervals, inducing a second-order differential FOA (DFOA) of <1 Hz over 10 seconds, in contrast to the >200 Hz difference in FOA between all of the platforms. However, the second-order DFOA is large enough to warrant higher-order FOA models under some reception scenarios.

The SV and beacon signal RIP's adhere closely to a zero-order drift model over 10 s intervals, exhibiting a median first-order differential RIP (DRIP) of 0.00012 dB/s. However, the SV RIP's (−139 dBm median RIP) are much weaker than the beacon RIP's (−113 dBm median RIP), despite the 15 dB lower assumed transmit EIRP for the beacons.

FIG. 11 provides a tabular summary of the azimuthal (FIG. 11A) and elevation (FIG. 11B) LOB from the SV and beacon transmitters to the receiver under the reception scenario shown in FIG. 9, computed over the same time interval used in FIG. 10. The LOB is purely a function of the geometry between the transmitters and the receivers. Parameters tabulated in this Figure include minimum, maximum, and median ranges; and results of linear regression analyses to determine closeness of fit of parameters to zero-order, first-order, and second-order time variation models over the 10 s reception interval. As this Figure shows, the SV and beacon signal LOB's adhere to a zero-order azimuthal and elevation drift model over 10 s intervals, exhibiting a median absolute differential azimuth and elevation of 0.0076°/s and 0.0024°/s, respectively.

FIG. 12 provides a tabular summary of the azimuthal (FIG. 12A) and elevation (FIG. 12B) local DOA from the SV and beacon transmitters to the receiver under the reception scenario shown in FIG. 9, computed over the same time interval used in FIG. 10 and FIG. 11. The local DOA includes the effect of platform orientation on the observed directions of arrival from the transmitters, which varies from the LOB as the receiver platform moves along its flight path. Results are compiled separately for the GNSS SV's and the beacons, in order to contrast differences in statistics between the two transmitter types and transmission platforms. Parameters tabulated in this Figure include minimum, maximum, and median ranges; and results of linear regression analyses to determine closeness of fit of parameters to zero-order, first-order, and second-order time variation models over the 10 s reception interval. As this Figure shows, the receiver motion causes the local differential DOA to 0.3°/s in azimuth and 0.02° in elevation. In addition, the change in azimuthal differential DOA is nearly the same for both signal classes, indicating that the change in dynamics is almost completely due to motion of the receiver. However, in both cases, the DOA adheres strongly to a first-order model, i.e., the second-order differential change is low.

Figure 13:
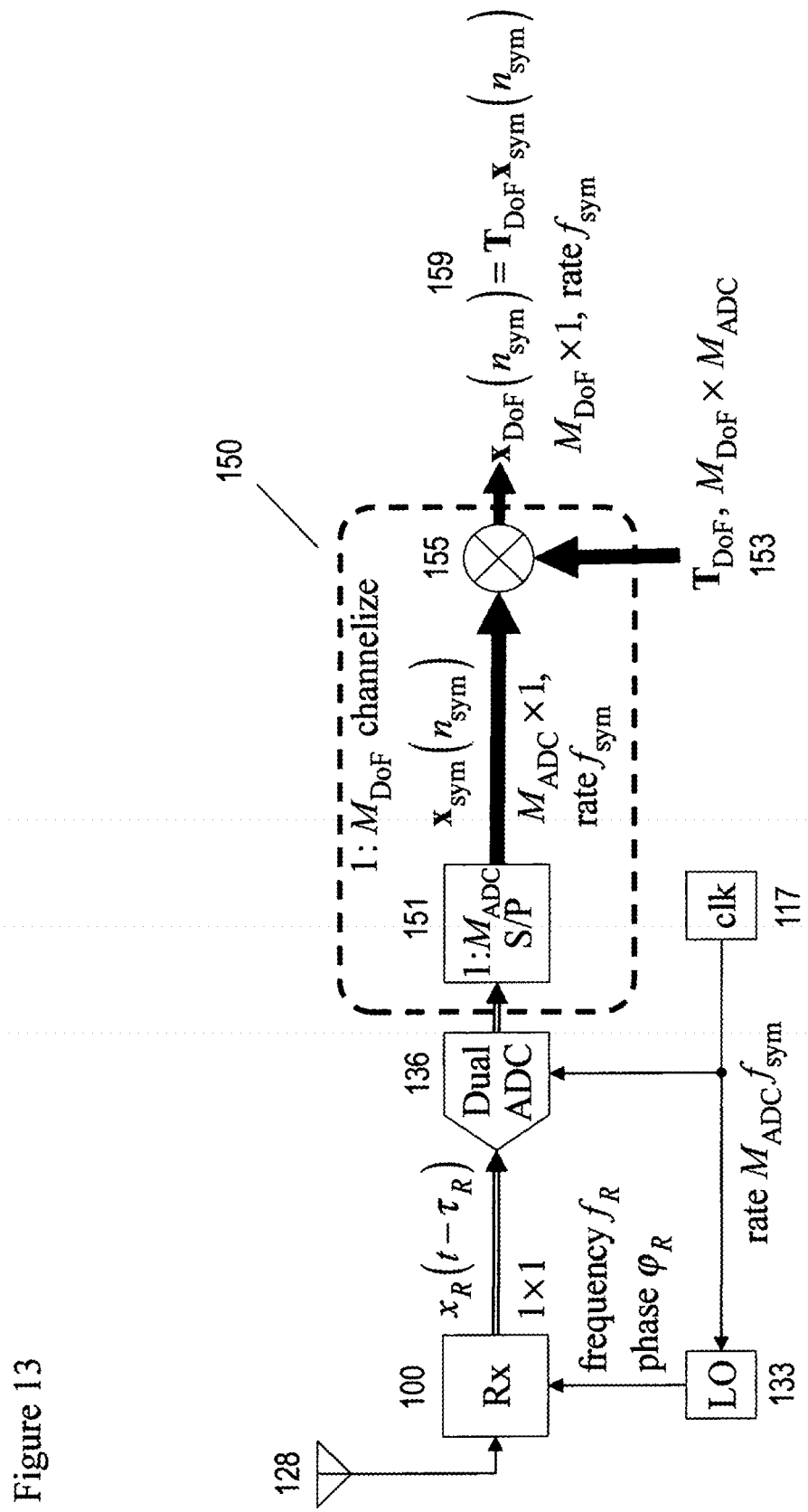
FIG. 13 shows the baseline single-feed receiver structure, describing the symbol-synchronous channelizer integral to the present invention.

FIG. 13 shows a single-feed receiver structure used in one embodiment of the invention, describing the symbol-rate synchronous vector channelizer (150) integral to the present invention. A SiS is received at an antenna (128), and downconverted to complex baseband using a direct-conversion receiver (100) implementing operations such as those shown in FIG. 4, comprising reception, frequency downconversion by receive frequency $f_R$ to complex baseband representation, and sampling using a dual ADC (136) with sampling rate $M_{ADC}f_{sym}$, where $M_{ADC}$ is a positive integer. The sampled signal is then passed to a symbol-rate synchronous channelizer (150) comprising the following conceptual operations:

A 1:$M_{ADC}$ serial-to-parallel conversion operation that transforms the rate $M_{ADC}f_{sym}$ ADC output signal to an $M_{ADC} \times 1$ vector signal $x_{sym}(n_{sym})$ with rate $f_{sym}$, given by $$x_{sym}(n_{sym}) = \begin{pmatrix} x_R(T_{sym}n_{sym} - \tau_R) \\ \vdots \\ x_R\left(T_{sym}\left(n_{sym} + \frac{m_{ADC}-1}{M_{ADC}}\right) - \tau_R\right) \end{pmatrix}. \qquad \text{Eqn (1)}$$

An $M_{ADC}$:$M_{DoF}$ cannelization operation (155), conceptually performed by multiplying $x_{sym}(n_{sym})$ by $M_{DoF} \times M_{ADC}$ channelization matrix $T_{DoF}$ (153) to form $M_{DoF} \times 1$ channelizer output signal $x_{DoF}(n_{sym}) = T_{DoF} x_{sym}(n_{sym})$ (159), where $M_{DoF}$ is the degrees of freedom (DoF's) of the channelizer output signal.

The data rate of $x_{DoF}(n_{sym})$ is nominally equal to the symbol rate of the GNSS signal of interest to the system (less offset due to nonideal error in the ADC clock), e.g., 1 ksps for the signals listed in FIG. 3. Hence this is referred to here as a symbol-rate synchronous vector channelizer. A variety of different channelization methods can be implemented using this general processing structure, including time and frequency domain channelization methods, or channelizations employing mixed time-frequency channelizations such as wavelet-based channelizers.

Figure 14:
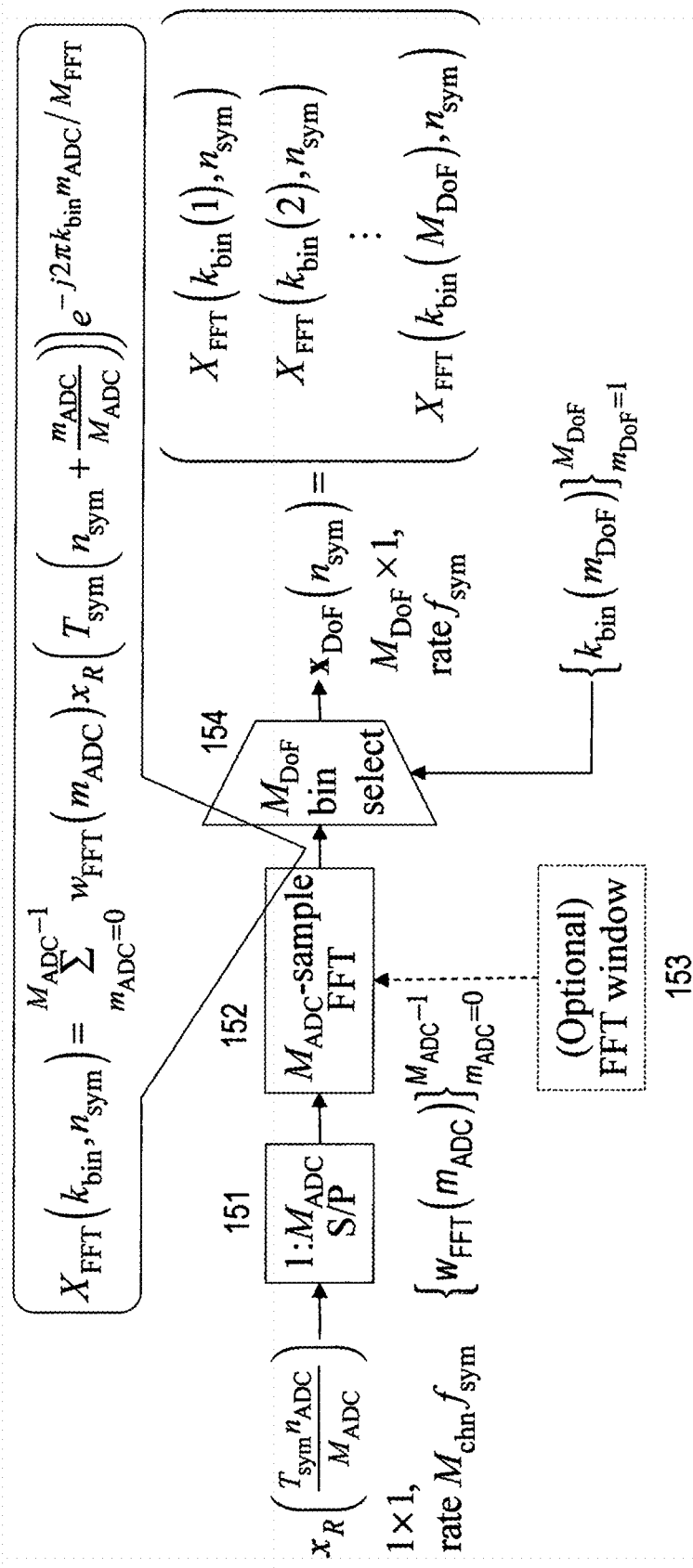
FIG. 14 shows a specific instantiation of the symbol-synchronous channelizer, using Fast-Fourier Transform (FFT) operations. The general transform T_DoF and its FFT instantiation including a bin selection operation are used in ways unique and novel to the invention.

FIG. 14 shows a specific instantiation of the symbol-rate synchronous vector channelizer (150), using Fast-Fourier Transform (FFT) operations. The channelizer first applies a zero-padded FFT with $M_{ADC}$ input samples, $M_{FFT} \geq M_{ADC}$ output bins (152), and a (nominally rectangular) window $\{w_{FFT}(m_{ADC})\}_{m_{ADC}=0}^{M_{ADC}-1}$ to each S/P output vector, where $M_{FFT}$ is conveniently chosen to minimize computational complexity and/or cost of the FFT operation. The channelizer then selects $M_{DoF}$ output bins $\{k_{bin}(m_{DoF})\}_{m_{DoF}=0}^{M_{DoF}-1}$ for use in subsequent adaptive processing algorithms (154). The channelizer thereby implements channelizer matrix $$T_{DoF} = \left[\exp\left(-j2\pi k_{bin}(m_{DoF})\frac{m_{ADC}}{M_{FFT}}\right)w_{FFT}(m_{ADC})\right]. \qquad (153)$$

In one embodiment, the output channelizer bins are preselected, e.g., to avoid known receiver impairments such as LO leakage, or to reduce complexity of the channelization operation, e.g., using sparse FFT methods. In other embodiments, the output channelizer bins are adaptively selected, e.g., to avoid dynamic narrowband co-channel interferers (NBCCI).

FIG. 14 is implemented for the real-ADC output of the superheterodyne receivers shown in FIG. 5, by passing the real ADC signal (137) into the same operations shown in this Figure, and choosing output bins centered on the intermediate frequency (IF) of the ADC output signal.

The approach extends easily to polyphase filters, given generally by $x_{DoF}(n_{sym}) =$ $$\sum_{m_{sym}=0}^{M_{sym}} T_{DoF}(m_{sym})x_{sym}(n_{sym} - m_{sym}), \text{ e.g.,} \qquad \text{Eqn (2)}$$

$$x_{DoF}(n_{sym}) = T_{DoF} \sum_{m_{sym}=0}^{M_{sym}} (w_{sym}(m_{sym}) \odot x_{sym}(n_{sym} - m_{sym})),$$

where $\{w_{sym}(m_{sym})\}_{m_{sym}=0}^{M_{sym}-1}$ is an order-$M_{sym}$ polyphase filter, "$\odot$" denotes the element-wise multiplication operation, and $$T_{DoF} = \left[\exp\left(-j2\pi k_{bin}(m_{DoF})\frac{m_{ADC}}{M_{ADC}}\right)\right]$$

is the $M_{DoF} \times M_{ADC}$ matrix that implements an unpadded, unwindowed FFT with $M_{ADC}$ input samples and $M_{DoF}$ output bins. This channelizer is especially useful in environments subject to very strong NBCCI. However, it affects dispersion added to the channelizer output signal.

The general transform $T_{DoF}$ and its FFT instantiation including the bin selection operation, are used in ways unique and novel to the invention.

Figure 15:
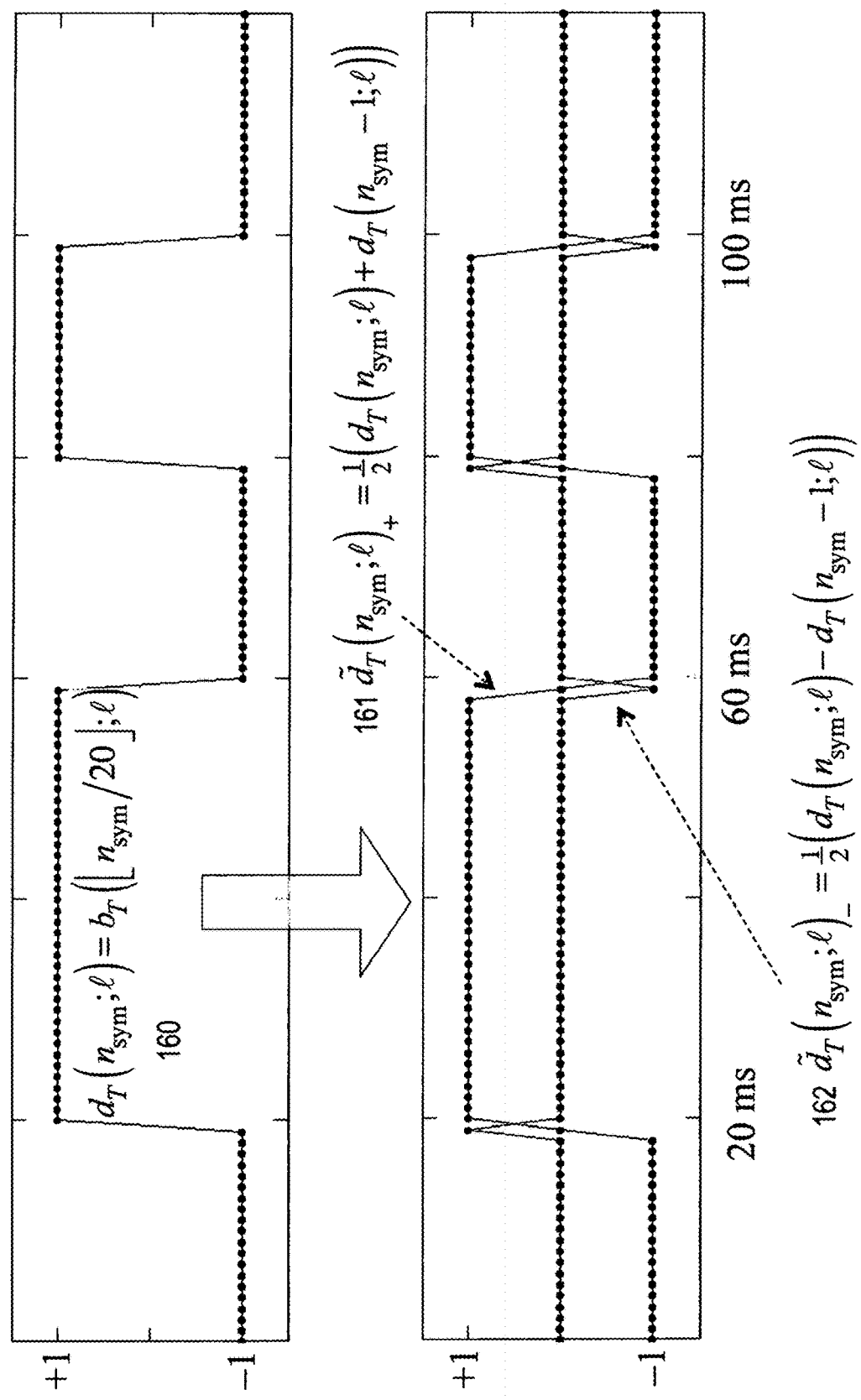
FIG. 15 shows the L1 GPS C/A Navigation Symbol Stream, and depicts attributes of that stream (decomposition into sum and difference components with unique features) that allow instantiation of blind despreading operations implemented in embodiments of the invention.

FIG. 15 shows the L1 GPS C/A Navigation Symbol Stream, $d_T(n_{sym};1)$ (160), and depicts attributes of that stream (decomposition into sum and difference components $\tilde{d}_T(n_{sym};1)_+$ (161) and $\tilde{d}_T(n_{sym};1)_-$ (162), respectively, with unique features) that allow instantiation of blind despreading operations implemented in embodiments of the invention. As this Figure shows, $\tilde{d}_T(n_{sym};1)_+$ (161) only has zero value at transitions between navigation bits, whereas $\tilde{d}_T(n_{sym};1)_-$ (162) only has nonzero value at those transitions. The signal components also possess distinctively different features, which can be used to both detect and differentiate between those signal components in subsequent adaptive processing operations.

Figure 16:
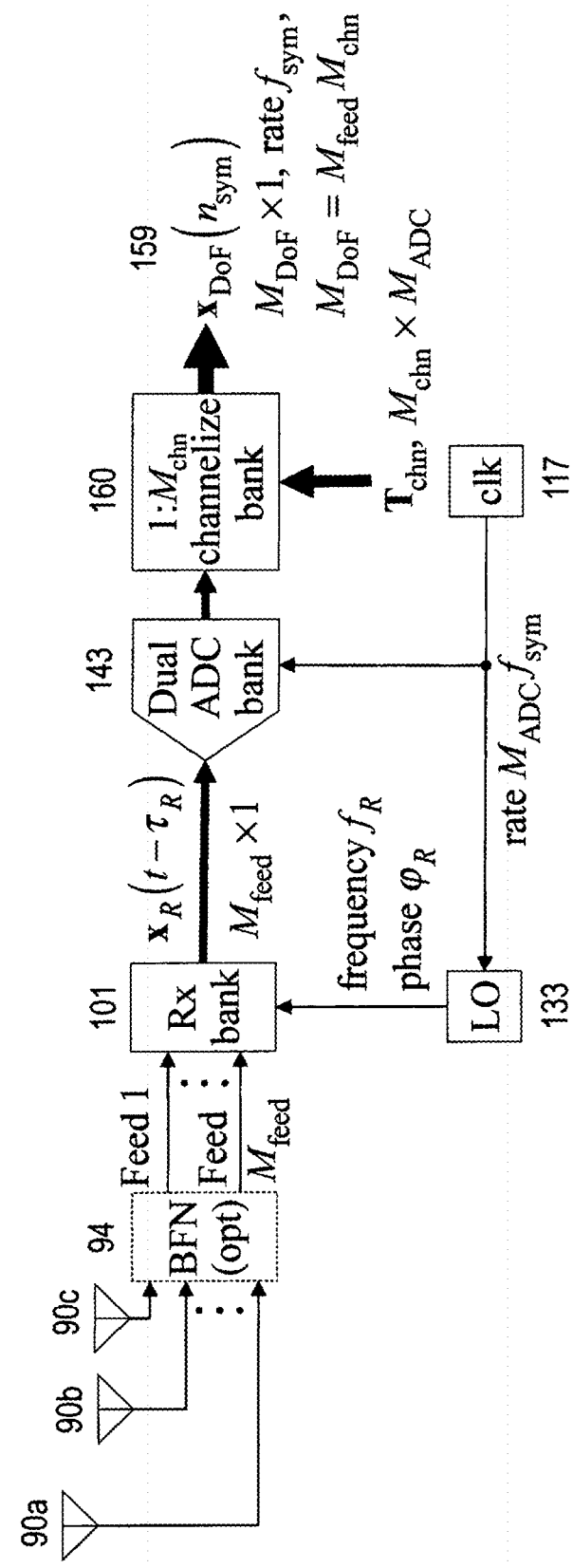
FIG. 16 shows an exemplary multifeed receiver with an optional beam-forming network (BFN) and an implementation of the symbol-synchronous channelization operations for the invention.

FIG. 16 shows an exemplary multifeed extension of the single-feed receiver, in which the GNSS signals are received over multiple spatial or polarization diverse antennas. The multifeed receiver front-end and symbol-rate synchronous channelization operations start when GNSS signals are received on multiple antennas (90a, 90b, 90c) using an array of spatial and/or polarization diverse antennas. In one embodiment, there are $M_{feed}$ antennas, and the signals received by the array are passed directly to a bank of direct-conversion receivers (101) where they are coherently down-converted to $M_{feed}$ complex-baseband signals, represented here as $M_{feed} \times 1$ vector signal $x_R(t-\tau_R) = [x_R(t-\tau_R; m_{feed})]_{m_{feed}=1}^{M_{feed}}$. In another embodiment, the antenna output signals (90a, 90b, 90c) are passed to a beamforming network (BFN) (94), which converts those signals to $M_{feed}$ signals that are in turn passed to the receiver bank (101). The receiver output signal vector is then sampled by a bank of $M_{feed}$ dual ADC's (143), each with sampling rate $M_{ADC}f_{sym}$, provided by a common clock (117), where $M_{ADC}$ is a positive integer and $f_{sym}$ is the baseband GNSS signal symbol rate, e.g., 1 ksps for all of the civil GNSS signals shown in FIG. 3. The $M_{feed}$ ADC output signals are then passed to a bank of symbol-rate synchronous vector channelizers (160), each synchronous vector channelizer implemented using a 1:$M_{ADC}$ S/P operation and a $M_{chn} \times M_{ADC}$ channelization matrix $T_{chn}$, in one embodiment, which converts the signals into $M_{feed}$ $M_{chn} \times 1$ signals $\{x_{chn}(n_{sym}; m_{feed})\}_{m_{feed}=1}^{M_{feed}}$. The channelizer outputs are then combined into a $M_{DoF} \times 1$ complex vector representation $x_{DoF}(n_{sym})$ (159), for example, by stacking the channelized signals as $$x_{DoF}(n_{sym}) = \begin{pmatrix} x_{chn}(n_{sym}; 1) \\ \vdots \\ x_{chn}(n_{sym}; M_{feed}) \end{pmatrix}, \qquad \text{Eqn (3)}$$

where $M_{DoF}=M_{feed}M_{chn}$ is the total number of receiver DoF's.

The multifeed receiver structure shown in FIG. 16 is one of many structures that the invention can be used with. For example, the bank of direct-conversion receivers (101) and dual-ADC's (143) can be replaced by a bank of superheterodyne receivers and real ADC's, and the channelizer bank (160) can be altered to convert the subsequent real-IF ADC output vector to the same complex channelizer output signal Note that the structure of the symbol-rate channelized multifeed signal $x_{DoF}(n_{sym})$ (159) shown in FIG. 16 is identical to the structure of the single-feed $x_{DoF}(n_{sym})$ (159) shown in FIG. 13. In fact, as shall be shown below, the blindly signal detection, demodulation, and geo-observable estimation methods used in the invention can be applied to either a single-feed or a multifeed receiver with no change in structure, albeit with differences in implementation complexity if $M_{DoF}$ varies as a function of $M_{feed}$, and with differences in performance, e.g., if the additional spatial/polarization of the received signals allows the processor to better separate GNSS signals or remove co-channel interference (CCI), e.g., jammers.

To overcome this complexity issue, in one embodiment, the baseline channelizer method is adjusted to provide the same number of DoF's for the multifeed receiver as the single-feed receiver, for example, by reducing $M_{chn}$ or the ADC sampling rate by $1/M_{feed}$, such that $M_{DoF}$ remains constant as $M_{feed}$ is increased. This is easily accomplished using the thinned-FFT channelizer shown in FIG. 14, by simply reducing the number of output bins used by the channelizer. If the channelizer bins remain densely spaced, this approach has the added benefit of reducing the effect of TOA blur on the output signal. Alternately, if the channelizer bins are sparsely spaced, this approach can reduce complexity of the channelization operation itself. However, it should be noted that this processor sacrifices despreading gain that could improve the SINR of the output symbol stream.

Importantly, while the TOA and FOA of a GNSS transmitter can be easily spoofed in the targeted spoofing scenario shown in FIG. 8, the DOA (and, to a lesser degree, the polarization) of that transmitter cannot be easily spoofed. In addition, the multifeed receiver can null any CCI impinging on the array, if the array has sufficient degrees of freedom to separate that CCI from the GNSS signals. This includes both targeted spoofers and wideband jammers.

Figure 17:
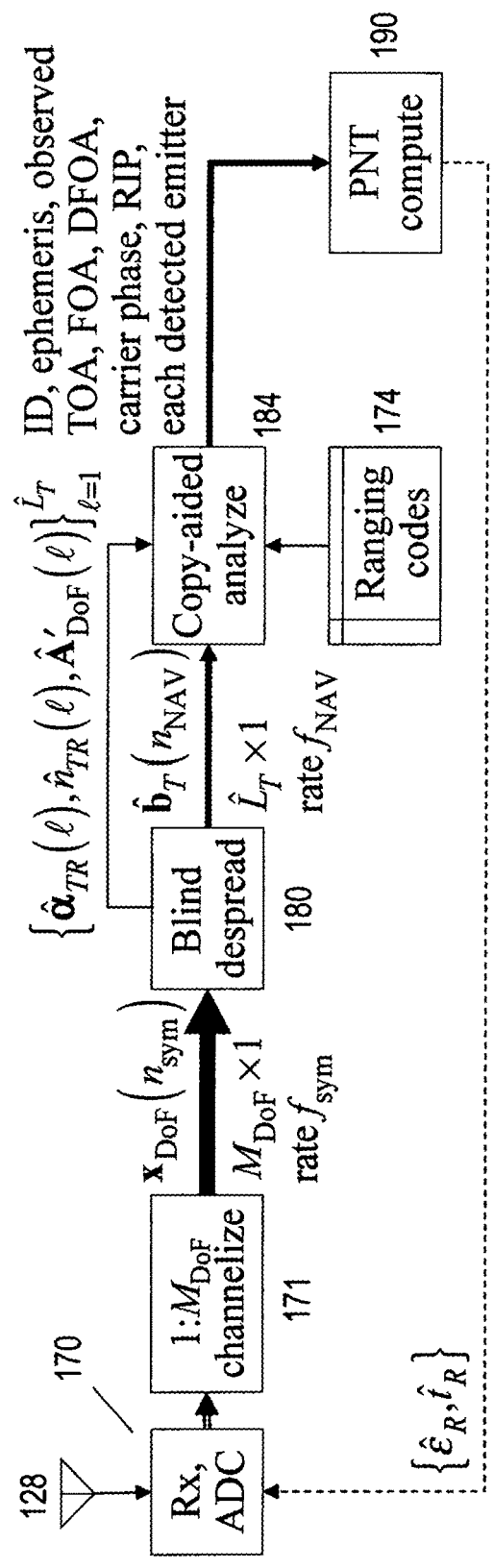
FIG. 17 shows an exemplary single-feed active despreader structure and implementation of the blind despreading for the invention.

FIG. 17 shows an exemplary single-feed despreading structure. The GNSS SiS is received by an antenna (128) and passed to a receiver front-end, comprising at least a receiver and an ADC converter (170) with sampling rate $M_{ADC}f_{sym}$, where $M_{ADC}$ is a positive integer and $f_{sym}$ is the baseband symbol rate of the civil GNSS signals, followed by a symbol-rate synchronous vector channelizer (171), which downconverts, digitizes, and channelizes the GNSS SiS to provide an $M_{DoF}\times 1$ vector signal $x_{DoF}(n_{sym})$ with sample rate $f_{sym}$ equal to the baseband symbol rate of the GNSS signals. The symbol-rate synchronous channelizer (172) passes the vector signal on to:

A blind despreader (180), which detects, despreads, and demodulates the received GNSS signal without explicitly using or searching over ranging codes, using only the MOS-DSSS properties of the civil GNSS signals. Among other advantages, this can operate under potentially heavy CCI. This stage also estimates at least the fractional fine FOA (less a factor-of-1 kHz ambiguity) and DFOA of each detected signal, and the coarse (1 ms granularity) TOA of each detected signal. In some embodiments, this stage also estimates the MIMO channel signature, described below, for each detected signal.

If desired, the blind despreader (180) passes these estimates to a copy-aided analyzer (184), which determines remaining geo-observables needed for a full PNT solution, using copy-aided parameter estimation methods that exploit results of the blind despreading stage and detailed structure of the MIMO link matrices, and ranging code information held in memory (174). Although this stage does require search over code timing to determine fine TOA, the search is simplified by geo-observables already estimated in the blind despreader, and does not require a search over code PRN if the PRN index is provided in the demodulated navigation signal stream. The copy-aided estimator also outperforms correlative methods, especially in presence of strong CCI and GNSS signals, e.g. co-channel beacons, due to inherent robustness of the copy-aided approach to CCI and network interference. Lastly, given calibration of the transmitter and receiver phase, the copy-aided analyzer also provides an estimation of the carrier phase suitable for high-precision geolocation.

The copy-aided analyzer then passes any of the set of demodulated SV ID's, ephemeres, observed TOA, FOA, DFOA, CCP, RIP—the geo-observables—for each detected signal to a positioning, navigation and timing (PNT) computation element (190), implemented using methods well known to those skilled in the art. In some embodiments, the PNT computation element (190) further sends timing and clock offset adjustment parameters back to the receiver front-end (170), in order to remove any FOA or TOA offset due to error between the receiver and GNSS transmitter clocks.

Figure 18:
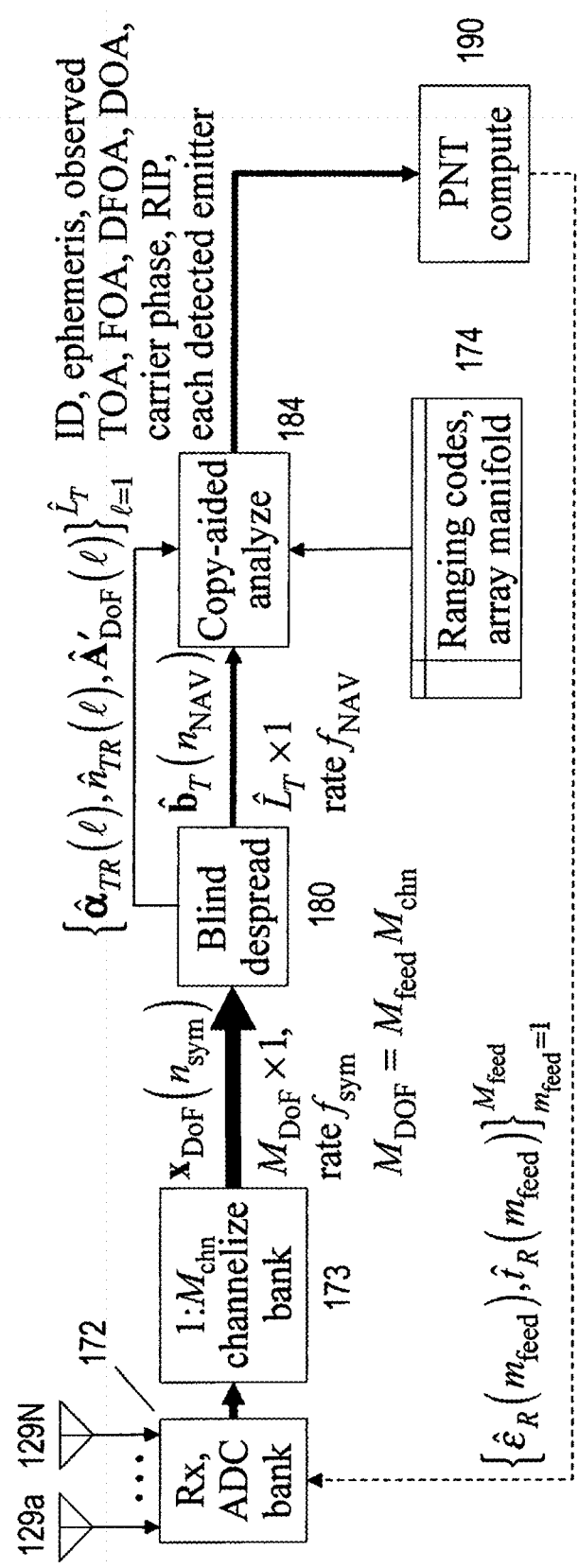
FIG. 18 shows an exemplary multifeed active despreader structure and implementation of the blind despreading for the invention.

FIG. 18 shows an exemplary multifeed extension of the despreader structure shown in FIG. 17. A GNSS SiS is received by an array of spatially and/or polarization diverse antennas (129a-129N), and passed to a receiver bank (172), comprising $M_{feed}$ receivers and $M_{feed}$ ADC converters, each with sampling rates $M_{ADC}f_{sym}$, where $M_{ADC}$ is a positive integer and $f_{sym}$ is the baseband symbol rate of the civil GNSS signals, followed by a bank of symbol-rate synchronous vector channelizers (173) with output channelizer dimensionality $M_{chn}$, which coherently downconverts, digitizes, and channelizes the GNSS SiS to provide an $M_{DoF}\times 1$ vector signal $x_{DoF}(n_{sym})$ with sample rate $f_{sym}$, where $M_{DoF}=M_{feed}M_{chn}$.

The channelizer output signal is then passed to a blind despreader (180), which implements the same operations performed in FIG. 17, and a copy-aided analyzer, which determines remaining geo-observables needed for a full PNT solution, using copy-aided parameter estimation methods that exploit results of the blind despreading stage and detailed structure of the multiple-input, multiple-output (MIMO) link matrices, and ranging code information and array manifold information held in memory (174). Using array manifold information, the analyzer is able to further analyze this information to determine the DOA of the detected signals.

The copy-aided analyzer then passes any of the set of demodulated SV ID's, ephemeres, and geo-observables (including DOA) for each detected signal to a positioning, navigation and timing (PNT) computation element (190), implemented using methods well known to those skilled in the art. In some embodiments, the PNT computation element (190) further sends timing and clock offset adjustment parameters back to the receiver front-end (170), in order to remove any FOA or TOA offset due to error between the receiver and GNSS transmitter clocks.

Among other advantages, if coupled to a spatial/polarization diverse antenna array as shown in FIG. 18, the blind despreader provides additional inherent excision of non-GNSS CCI impinging on the array, including CCI from up to $M_{feed}-1$ noiselike jammers. The blind despreader also provides inherent excision of targeted spoofers impinging on the array, even if those spoofers employ the same PRN code as the targeted GNSS signal and are closely aligned in FOA and TOA with that targeted GNSS signal, and even if their RIP is close to the RIP of the targeted GNSS signal (covert aligned spoofing scenario) or much stronger than the target GNSS signal (noncovert aligned spoofing scenario), due to the differing DOA of the spoofer and targeted GNSS signal. This advantage is not provided through any additional processing performed in the blind despreader, but simply through inherent properties of the transmission channel under this reception scenario.

The copy-aided analyzer shown in FIG. 18 can also be implemented using joint TOA-DOA estimators that are substantively similar to the TOA-estimators employed in the single-feed system shown in FIG. 17, or they can be implemented using methods that explicitly exploit channel structure introduced by the multifeed front-end. In some use scenarios where it suffices to simply identify SV's and ground beacons, the need to search over TOA and DOA can be eliminated entirely (using methods discussed in a further alternative and novel embodiment—not shown).

The despreading structures shown in FIG. 17 and FIG. 18 can be further simplified if prior information such as trial signal FOA's or GNSS navigation streams are made available to the receiver (using methods discussed in a further alternative and novel embodiment, e.g., through web-based ancillary data capture—not shown).

Figure 19:
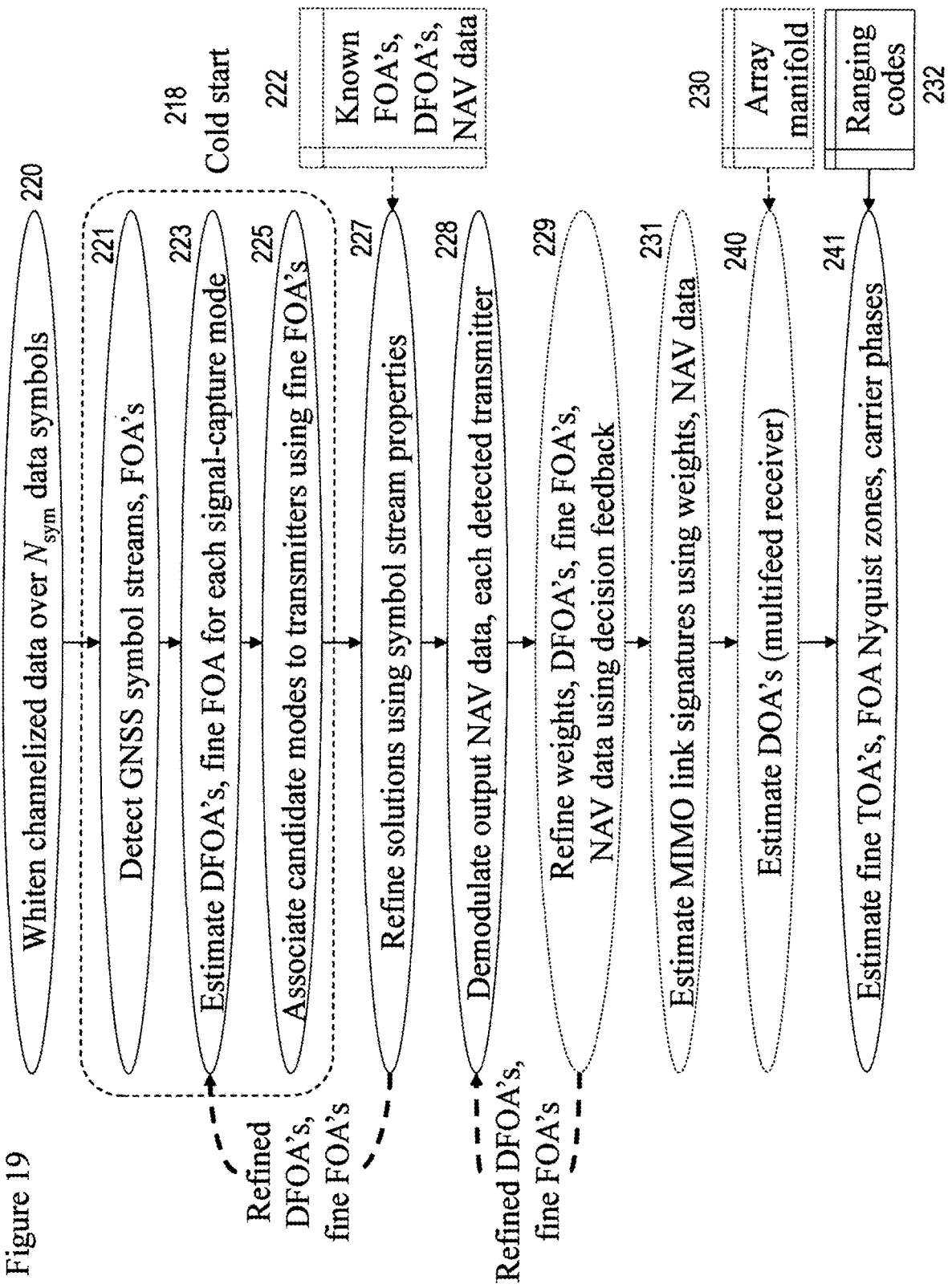
FIG. 19 shows a flowchart for the batch adaptation procedure including embodiments in which prior information, e.g., baseband navigation sequences or known transmitter frequencies-of-arrival and differences in FOA (DFOA), are, or can be made, available for the invention while processing the incoming transmission(s).

FIG. 19 shows a flowchart for batch processor, applicable to the single-feed or multi-feed despreader structures shown in FIG. 17 and FIG. 18, in which channelizer output data is collected over $N_{sym}$ output samples and processed on a stand-alone basis to detect and extract the GNSS data contained within that sample set. This flow diagram encompasses embodiments in which prior information, e.g., GNSS navigation sequences or known transmitter frequencies-of-arrival (FOA) and differences in FOA (DFOA), are, or can be made, available for the invention while processing the incoming transmission(s).

The first stage (blind despreading component) of this process comprises the following key processing operations:

A channelized data whitening operation (220), described in more detail below, in which the data block is separated into a whitened data component and a set of autocorrelation statistics using highly regular and well-known linear algebraic operations, e.g., QR decompositions, implemented as a means for reducing complexity of subsequent processing steps.

An emitter detection substage (221), which detects received data modes due to presence of GNSS signals in the environment, using known properties of the underlying symbol sequence, and provides preliminary estimates of the fine fractional FOA's and DFOA's of those modes. In presence of TOA blur due to nonzero DTOA, each GNSS signal can generate multiple modes due to TOA drift over the batch reception interval.

A FOA refinement substage (223), in exemplary embodiments performed as part of the emitter detection stage, which further refines fine FOA's and DFOA's of modes associated with the GNSS signals.

A mode association substage (225), which associates those modes with specific GNSS transmissions based on commonality of the FDA's and DFOA's for those modes.

A despreader refinement substage (227), which refines the despreading solution and fine FOA and DFOA estimates of the detected GNSS signals based on additional properties of the underlying symbol sequence.

A navigation (NAV) stream demodulation substage (228), which identifies the navigation stream timing phase (coarse TOA) within each GNSS symbol stream, and extracts the navigation symbols from the symbol stream.

Optional despreader and FOA refinement substages (229) that further refine despreading solutions, fine FOA, DFOA, and coarse TOA of the detected and demodulated GNSS signals, e.g., using decision feedback operations.

An optional MIMO link signature estimation substage (231), which blindly estimates the MIMO link signatures of the detected GNSS signals, for use in subsequent copy-aided analysis stages.

If needed, the spatial signatures and NAV data are then passed to a copy-aided DOA estimation stage (230), implemented if the invention is implemented using a multifeed receiver such as that shown in FIG. 18, which uses array manifold information stored in memory (230) to estimate the direction of arrival of the detected emitters; and to a copy-aided TOA estimation stage (241), which uses ranging code information stored in memory (232) to estimate the fine (sub-symbol) TOA, FOA Nyquist zone (multiple of 1 kHz FOA ambiguity), and carrier phase of the detected GNSS symbols. In some embodiments, the DOA and TOA estimators can be decoupled, or simplified estimators that first determine coarse DOA estimates of the detected signals can be employed to quickly identify terrestrial emitters, including beacons and spoofers, based on elevation of the emitters (both emitter classes), or commonality of DOAs (e.g., spoofers emanating from a single source).

Processing stages (221), (223) and (225) are typically only performed in "cold start" scenarios (218) where no information about the GNSS signals in the received data band are available to the receiver. Example use scenarios include those where the receiver has just been turned on; where the receiver has been idle for an extended period (so-called "warm start" scenarios); or where the receiver has tuned to a new band to assess availability of GNSS signals within that band. These processing stages can be eliminated or simplified if prior information can be made available to the receiver, e.g., known FOA's or NAV data, through a memory database (222).

These approaches are referred to here as fully-blind and partially-blind despreading strategies. In both approaches, the channel signature matrix, and therefore the ranging codes underlying that signature matrix, are assumed to be unknown (e.g., "Type C3" blind reception strategies as defined in the prior art). This assumption allows the use of broad ranges of methods that can operate without prior knowledge of the GNSS ranging code, or elements of the channel or receiver that can modulate that code, including FOA, TOA, or multipath induced by the channel; frequency, sampling, and timing offsets induced by the receiver front-end; and potentially severe filtering induced by the receiver. This assumption also allows the use of methods that can approach or achieve the maximum-attainable SINR (max- SINR) of the despreader, using linear algebraic methods that do not require complex prior information about the GNSS signals or interferers in the field of view of the receiver.

Neither ranging codes (232) nor (for multifeed receivers) array manifold data (230) is required until the copy-aided TOA (241) and DOA (240) analysis stages. In particular, the navigation data can be demodulated without ever searching over that data. This is a marked departure from both conventional correlative or despreading methods, which require identification and search over the ranging code before the navigation signal can be demodulated, and "codeless despreading" algorithms that cannot demodulate that data.

Figure 20:
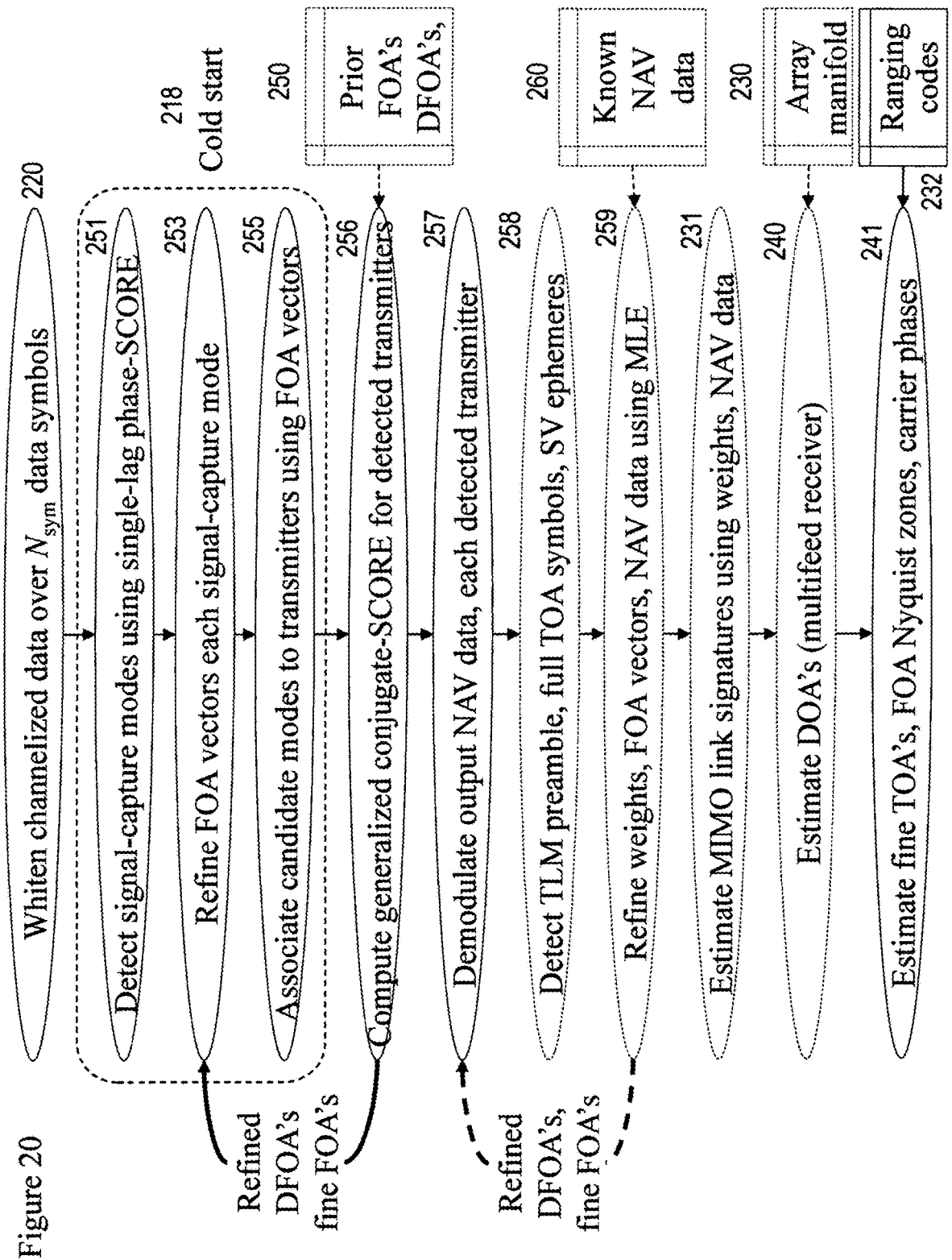
FIG. 20 shows a flowchart for the batch adaptation procedure for use in embodiments wherein the GPS C/A signal is being received by the invention while processing the incoming transmission(s) including embodiments in which prior information, e.g., baseband navigation sequences of known transmitter frequencies-of-arrival (FOA's) and differences in FOA (DFOA) are, or can be made, available for the invention while processing the incoming transmission(s).

FIG. 20 shows a flowchart for a batch adaptation procedure for use in embodiments wherein the GPS C/A signal is being received by the invention, including embodiments in which prior information, e.g., baseband navigation sequences of known transmitter frequencies-of-arrival (FOA's) and differences in FOA (DFOA) are, or can be made, available for the invention while processing the incoming transmission(s).

The first stage (blind despreading component) of this process comprises the following key processing operations:

- A channelized data whitening operation (220), in which the data block is separated into a whitened data component and a set of autocorrelation statistics using highly regular and well-known linear algebraic operations, e.g., QR decompositions, implemented as a means for reducing complexity of subsequent processing steps.
- An emitter detection operation (251), which detects GNSS emitters in the environment using a phase-SCORE algorithm such as those described in the prior art, that exploits the high single-lag correlation of the 1 ksps baseband GNSS symbol streams.
- A FOA vector refinement operation (253), which refines the FOA vectors provided by each detected phase-SCORE mode, using a generalized frequency doubler spectrum that exploits the BPSK structure of the GNSS symbol streams, and prunes the detected modes based on statistics generated during the FOA vector optimization procedure.
- A mode association operation (255), which associates confirmed phase-SCORE modes with specific emitters based on commonality of the FOA vectors for modes induced by each emitter.
- A further despreader refinement procedure (256), which refines FOA vectors and generates refined 1 ksps FOA-compensated symbol data, using a generalized conjugate-SCORE algorithm.
- A navigation stream demodulation algorithm (257), which estimates the coarse (1 ms granularity) TOA of the despread 1 ksps symbol data and extracts the 50 bps NAV sequence from that data.
- If sufficient data is available, analyze the demodulated navigation stream to detect the telemetry (TLM) preamble transmitted every 6 seconds within the NAV stream, and use that preamble to resolve ambiguities induced by the blind adaptation procedures (±1 BPSK ambiguity, modulo-20 TOA symbol ambiguity), and to extract additional navigation information needed to complete a navigation solution for the receiver, e.g., the handover word (HOW) message, and the SV ephemeres (258).
- Further refine parameters based on the demodulated NAV message, e.g., using maximum-likelihood (Ml) estimation (MLE) strategies (259).
- Estimate MIMO link signatures (231) for use in subsequent copy aided DOA (240) and copy-aided TOA (241) operations, if needed for use scenarios that the invention is being applied to.

As in the more general flow diagram shown in FIG. 19, steps (251), (253), and (255) are only needed in cold start scenarios (218) where no information about the GPS signals (except perhaps the GPS almanac) are available to the receiver. If additional material can be made available, then these steps can be dispensed with. In particular, if prior FOA's and DFOA's can be made available to the receiver (250), then processing can start with the generalized conjugate SCORE procedure (256). If the 50 bps NAV stream can be made available to the receiver (260), without or without prior FOA's, processing can start at the maximum-likelihood (ML) estimator (259).

FIG. 21 shows tabulated complexity of the blind despreader, for a fully-blind instantiation applied to the GPS C/A Signal. The Figure assumes reception of 24 civil GNSS signals, e.g., 12 signals from GNSS SV's and 12 signals from terrestrial beacons or spoofers, using a four-feed receiver ($M_{feed}$=4), the FFT-based symbol-rate synchronous vector channelizer shown in FIG. 14, with 16, 32, 64, 128, or 256 output FFT bins/feed, and the blind despreader shown in FIG. 20, with 64, 128, 256, 512, or 1,024 degrees of freedom. Complexity results are summarized at the end of the phase-SCORE detection operations, which includes complexity needed to channelized and whiten the ADC output data, and to implement all of the phase SCORE detection operations using that whitened data; and at the end of the conjugate SCORE refinement operations. This Figure does not directly address the performance of the despreader in any of these processing scenarios; however, all of these scenarios should be able to separate all 24 signals, and all of these scenarios should in particular be able to detect and demodulate the terrestrial signals if they are emanating from beacons with reasonable (e.g., 30 dBm) transmit EIRP's. Moreover the scenarios with 256 DoF's should be able to detect and demodulate any signals received with RIP's on the order of −140 dBm or higher, commensurate with SV and beacon/spoofer RIP's under nominal reception conditions.

Observations that can be made from this Figure are as follows:

- The channelization and whitening operations contribute less than 0.2% of the total operations in the and are easily implemented using low-cost DSP equipment, e.g., commensurate with current-generation Cortex M4 ARM processors.
- The total operations needed to detect and determine preliminary geo-observables using phase SCORE contribute less than 20% of the total operations in the processor, and are implementable using low-to-medium cost DSP equipment, e.g., Cortex M4 or A8 ARM processors, for most of the processing scenarios shown in this Table.
- All of the operations shown in these scenarios are implementable using currently available DSP equipment, e.g., Cortex A18 ARM processors. Moreover, although the complexity of conjugate SCORE can be high, it scales linearly with the number of emitters detected in using phase-SCORE, and is dominated by highly regular operations, such as the CCM computation, that can be implemented in FPGA or ASIC's.

It should be noted as well that many of these operations, or operations of similar complexity, are performed in the general civil GNSS flow diagram shown in FIG. 20. In this regard, the summary complexity through phase-SCORE detection operations is likely to be commensurate with processing requirements for any civil GNSS signals employing unmodulated pilot signals, or in resilient PNT use scenario's in which baseband symbol data can be supplied to the processor, e.g., to develop PNT analytics in order to aid a primary PNT unit.

DETAILED DESCRIPTION OF VARIOUS ASPECTS OF THE INVENTION

Baseline Single-Antenna Reception

The Blind Despreading Anti-Spoofing (BDAS) approach for the baseline single-feed reception scenario is shown in FIG. 1, in which a GNSS receiver (1) with position modeled by 3×1 time-varying vector $p_R(t)$ and yaw-pitch-roll orientation modeled by 3×3 time-varying rotation matrix $\Psi_R(l)$ is assumed to be operating within the field of view (FoV) of $L_T$ transmitters (3,5,7), e.g., satellite vehicles (SV's) (3), with positions modeled by 3×1 time-varying vectors $\{p_T(t;l)\}_{l=1}^{L_T}$. Ignoring relativistic effects and atmospheric propagation factors, the observed position of transmitter within the frame of reference of the receiver can then be modeled by 3×1 position vector $p_{TR}(t;l) = p_T(t;l) - p_R(t)$. Over short time intervals, $p_{TR}(t;l)$ can be further approximated by $$p_{TR}(t;\ell) \approx p_{TR}(t_0;\ell) + v_{TR}(t_0;\ell)(t-t_0) + \frac{1}{2}a_{TR}(t_0;\ell)(t-t_0)^2, \quad \text{Eqn (4)}$$

where $v_{TR}(t;l) = v_T(t;l) - v_R(t)$ and $a_{TR}(t;l) = a_T(t;l) - a_R(t)$ are the observed velocity and acceleration of transmitter l within the frame of reference of the receiver, and where $|t-t_0|$ is small.

Each GNSS transmitter generates a short civil GNSS signal-in-space (SiS), given by $\sqrt{2P_T(l)} \text{Re}\{s_T(t-\tau_T(l);l)e^{j(2\pi f_T t + \varphi_T(l))}\}$ for transmitter l in FIG. 1, where $f_T(l)$ is the transmit frequency, typically common to all SV's ($f_T(l) \equiv f_T$), and where $P_T(l)$, $\varphi_T(l)$ and $\tau_T(l)$ are the transmit power, phase, and electronics delay for SiS l, respectively.

As shown in FIG. 2, the civil GNSS complex baseband signal $s_T(t;l)$ is a modulation-on-symbol direct-sequence spread spectrum (MOS-DSSS) signal, given by $$s_T(t;\ell) = \sum_{n_{sym}} d_T(n_{sym};\ell) h_T(t - T_{sym} n_{sym}; \ell), \quad \text{Eqn (5)}$$

where $d_T(n_{sym};l)$ is a civil GNSS baseband symbol stream with symbol rate $f_{sym} = 1/T_{sym}$, and $h_T(t;l)$ is a spread symbol given by $$h_T(t;\ell) = \sum_{m_{chp}=0}^{M_{chp}} c_T(m_{chp};\ell) g_T(t - T_{chp} m_{chp}; \ell), \quad \text{Eqn (6)}$$

$$T_{chp} = \frac{T_{sym}}{M_{chp}},$$

and where $\{c_T(m_{chp};l)\}_{m_{chp}=0}^{M_{chp}-1}$ is a pseudorandom code with length $M_{chp}$, and $g_T(t;l)$ is the chip symbol modulated by each chip. For the GPS L1 signal, the chip shaping is nominally rectangular and identical for each transmitted signal ($g_T(t;l) \equiv g_T(t)$); however, in practice, the shaping can vary between transmitters. The chip shaping can also vary between different GNSS formats.

For the L1 GPS C/A signal, the symbol period is 1 millisecond (ms) and the baseband symbol rate is 1 kilo-sample/second (ksps), the ranging code is a Gold code with pseudorandom noise (PRN) index $k_{PRN}(l)$ and length $M_{chp} = 1,023$, and the chip-shaping is a rectangular pulse with duration $T_{chp} = 1/1,023$ ms, modulated by digital and analog processing elements in the transmission chain. The L1 GPS symbol stream also possess additional exploitable structure, as it is constructed from a 50 bit/second (bps) BPSK (real) navigation signal $b_T(n_{NAV};l)$, repeated 20 times per MOS-DSSS symbol to generated the 1 ksps baseband MOS-DSSS symbol sequence $d_T(n_{sym};l)$, i.e., $d_T(n_{sym};l) = b_T(\lfloor n_{sym}/M_{NAV} \rfloor;l)$ where $M_{NAV} = 20$ and $\lfloor \cdot \rfloor$ denotes the integer truncation operation. Moreover, the navigation signal possess internal fields that can be exploited to aid the demodulation process, e.g., the TLM Word Preamble transmitted every 6 seconds, i.e., within every 300-bit Navigation subframe.

This model ignores other SiS's that may be transmitted simultaneously with civil GNSS signals, e.g., the GPS P(Y), M, and L1C SiS's. In practice, these signals are largely outside the band occupied by the civil GNSS signals, and are moreover received well below the noise floor. Therefore, their effect on the despreading methods described herein should be small. An important exception is military GNSS signals that may be generated by ground pseudolites, as those signal components may be above the noise floor within the civil GNSS passband in some use scenarios.

A list of civil GNSS signals that possess MOS-DSSS modulation format is provided in FIG. 3. As this Figure shows, every GNSS network deployed to date possesses at least one signal type that can be modeled by Eqn (5)-Eqn (6). Moreover, all of these signals have a 1 millisecond (ms) ranging code period, albeit with widely varying chip rates and SiS bandwidths, allowing their demodulation using a common receiver structure. Lastly, as the last column of FIG. 3 shows, the symbol streams of each of these signals possess properties that can be used to detect and differentiate them from other signals in the environment, including military GNSS signals, jammers, and civil GNSS signals with the same or similar properties.

Using either of the single-feed receiver front-ends shown in FIG. 4 and FIG. 5 and described in detail earlier, or equivalent reception structures, the single-feed GNSS receiver (1) receives a SiS over a radio frequency (RF) band encompassing at least part of a civil GNSS band; downconverts that signal by frequency shift $f_R$ to complex baseband, where it is represented as a complex signal $x_R(t-\tau_R)$ comprising an in-phase (I) rail as its real part and a quadrature (Q) rail as its imaginary part; or downconverts that signal by frequency shift $f_R - f_{IF}$ to an intermediate frequency (IF) $f_{IF}$, where it is represented as a real signal; and where a carrier phase offset $\varphi_R$ and delay $\tau_R$ are induced in the signal due to impairments in the receiver's local oscillator (LO) and reception electronics. The downconverted analog signal $x_R(t-\tau_R)$ is then converted to digital format using an analog-to-digital converter (ADC) with sampling rate $M_{ADC} f_{sym}$, where $f_{sym}$ is the civil GNSS signal symbol rate shown in FIG. 2 and $M_{ADC}$ is a positive integer.

The receiver frequency shift $f_R$ need not be equal to the civil GNSS transmit frequency $f_T$ (or $f_T(l)$), and the receiver bandwidth may encompass only a portion of the civil GNSS band of interest to the receiver. Moreover, the ADC symbol multiplier $M_{ADC}$ need not bear any relationship to the spreading factor $M_{chp}$ shown in FIG. 2. This can greatly improve cost and flexibility of the receiver hardware. For example, if the receiver is implemented using a software-defined radio (SDR) architecture as shown in FIG. 4B or FIG. 5B, the receiver can be flexibly tasked to any civil GNSS band, or to any portion of a civil GNSS band, and can downconvert and sample that band, or that portion of a band, using exactly the same hardware, regardless of the parameters of the civil GNSS signal being transmitted on that band. Moreover, the receiver can use low-cost, commercial off-the-shelf components with generic bandwidths, down-conversion frequencies, and sampling rates, rather than custom built gear that is matched to the transmit frequency, bandwidth, and chip-rate of the civil GNSS signal.

Assuming the direct-conversion receiver structure shown in FIG. 4, $x_R(l)$ is given by $$x_R(t) = i_R(t) + \sum_{\ell=1}^{L} s_R(t; \ell), \quad \text{Eqn (7)}$$

where $i_R(t)$ is the noise and interference received in the receiver passband and $s_R(t;l)$ is the complex-baseband representation of the signal received from transmitter l. In absence of multipath, and ignoring atmospheric propagation effects, $s_R(t;l)$ is modeled by $$s_R(t;l) = g_{TR}(t;l) e^{j2\pi(f_T(l)-f_R)t} e^{-j2\pi f_T(l)\tau_{TR}(t;l)} s_T(t - \tau_{TR}(t;l) - \tau_T(l); l), \quad \text{Eqn. (8)}$$

$$g_{Tr}(t;l) = \sqrt{P_R(t;l)} e^{j(\varphi_T(l) - \varphi_R)}, \quad \text{Eqn. (9)}$$

where $$\tau_{TR}(t; \ell) = \frac{1}{c} \|p_{TR}(t; \ell)\|_2$$

and $P_R(t;l)$ are the observed time-of-arrival (TOA) (defined separately from the aggregate delay $\tau_T(l)$ induced in the transmitter electronics) and received incident power (RIP) of GNSS signal l at the receiver, respectively, and where $\|\bullet\|_2$ denotes the Euclidean L-2 norm. The time-varying TOA also induces a Doppler shift in $s_R(t;l)$, given by frequency of arrival (FOA)

$$\alpha_{TR}(t;l) = -f_T(l)\tau_{TR}^{(1)}(t;l), \quad \text{Eqn. (10)}$$

defined separately from the frequency offset $f_T(l)-f_R$ induced by difference between the transmit and target receive frequency, where $\tau_{TR}^{(1)}(t;l)$ is the first derivative of $\tau_{TR}(t;l)$, $$\tau_{TR}^{(1)}(t; \ell) = \frac{1}{c}\frac{d}{dt}\|p_{TR}(t; \ell)\|_2 = \frac{1}{c} u_{TR}^T(t; \ell) v_{TR}(t; \ell), \quad \text{Eq (11)}$$

where $u_{TR}(t;l) = p_{TR}(t;l)/\|p_{TR}(t;l)\|_2$ is the line-of-bearing (LOB) direction vector from the receiver to transmitter l, which can be expressed in azimuth relative to East and elevation relative to the plane of the Earth using well-known directional transformations. The local direction-of-arrival (DOA) of the signal received from transmitter l is then represented by local DOA direction vector $u_R(t;l) = \Psi_R(t) u_{TR}(t;l)$, which can be converted to azimuth relative to the local receiver heading and elevation relative to the plane of receiver motion using well-known directional transformations. Lastly, if the transmitter and receiver phases (assumed constant over the reception interval) can be calibrated and removed from the end-to-end phase measurement, then the calibrated carrier phase (CCP) $\varphi_{TR}(t;l) = -2\pi f_T(l)\tau_{TR}(t;l)$ can be used to provide a precise estimate of range from the transmitter to the receiver.

The TOA, RIP, FOA, LOB, DOA, and CCP are summarized in FIG. 6, where they are referred to as geo-observables, as they are observable parameters of the GNSS received signals that can be used to geo-locate the GNSS receiver, given knowledge of the GNSS transmitter locations over time, which are transmitted within the navigation stream of those signals. They are also referred to here as positioning, navigation, and timing (PNT) analytics, as they provide metadata of the transmitted signals that can be used for purposes beyond geo-location of the receiver, e.g., to assess quality and reliability of the received GNSS signals, in order to aid other PNT systems on board the receiver platform.

In this regard, the following reception scenarios are particularly pertinent to the invention:

SDR reception scenarios, in which the invention is used to rapidly scan all of the GNSS bands, and assess availability of GNSS resources for dedicated GNSS receivers already on board the receiver platform. A feature of the invention that is particularly useful in this scenario is its ability to provide a fast and robust time-to-first-fix (TTFF) from a cold start, through its ability to detect all of the GNSS transmitters in the receiver's field of view (FoV), and to determine usable geo-observables of signals received from those transmitters, without a search over timing or ranging codes, using a flexible SDR receiver with a standardized reception bandwidth.

Beacon reception scenarios, in which the invention is used to separate signals from terrestrial beacons. This can include mixed GNSS SV, beacon reception scenarios, in which the terrestrial beacons are operating in the same band as the GNSS SV's, as well as scenarios in which the beacons are operating in separate bands. A feature of the invention that is particularly useful in this scenario is its ability to detect, separate, and determine usable geo-observables of GNSS signals with extreme wide disparity in RIP, and with receive signal-to-interference ratios that are strong enough to substantively degrade performance of conventional correlative signal detection methods.

Targeted spoofing scenarios, in which the invention is used to separate signals from GNSS SV's and spoofers that are attempting to deceive the receiver, by generating signals that jam the legitimate GNSS SV's and emulate those SV's (aligned spoofers) or SV's in other geographical locations. A feature of the invention that is particularly useful in this scenario is its ability to detect and separate GNSS signals with close (covert spoofing) or wide (non-covert spoofing) disparity in RIP, and to estimate geo-observables that can be used to both detect spoofing, and (with appropriate ancillary information) identify which signals are emanating from spoofers or legitimate GNSS transmitters.

Detection and geo-observable parameter estimation methods developed in the context of these applications are referred to here as resilient PNT analytics.

As shown in FIG. 10 for the dynamic mixed GNSS SV/beacon reception environment shown in FIG. 9, although the geo-observables are in general time-varying, they adhere closely to a zero-order model in RIP, and to a first-order model in TOA and FOA, over time intervals on the order of 1-10 seconds, such that $$P_R(t;l) \approx P_R(t_0;l), \qquad \text{Eqn (12)}$$

$$\tau_{TR}(t;l) \approx \tau_{TR}(t_0;l) + \tau_{TR}^{(1)}(t_0;l)(t-t_0), \qquad \text{Eqn. (13)}$$

$$\alpha_{TR}(t;l) \approx \alpha_{TR}(t_0;l) + \alpha_{TR}^{(1)}(t_0;l)(t-t_0), \qquad \text{Eqn. (14)}$$

for $t_0 \leq t \leq t_0+10$ s. Taking all of the phase and delay shifts induced in the transmitter and receiver hardware together yields received link 1 GNSS signal model $$s_R(t_0 + t; \ell) \approx \qquad \text{Eqn (15)}$$
$$e^{j2\pi(\alpha_{TR}(\ell)t + \frac{1}{2}\alpha_{TR}^{(1)}(\ell)t^2)} g_{TR}(\ell) s_T((1 - \tau_{TR}^{(1)}(\ell))t - \tau_{TR}(\ell); \ell),$$

at the input to the dual-ADC's shown in FIG. 4, where $$g_{TR}(l) \triangleq \sqrt{P_R(t_0;l)} \exp(j\varphi_{TR}(l)), \text{ end-to-end complex channel gain} \qquad \text{Eqn (16)}$$

$$\varphi_{TR}(l) \triangleq \varphi_T(l) - \varphi_R - 2\pi f_T(l)\tau_{TR}(t_0;l), \text{ end-to-end channel phase} \qquad \text{Eqn (17)}$$

$$\tau_{TR}(l) \triangleq \tau_T(l) + \tau_R + \tau_{TR}(t_0;l), \text{ end-to-end observed TOA} \qquad \text{Eqn (18)}$$

$$\alpha_{TR}(l) \triangleq f_T(l) + f_R + \alpha_{TR}(t_0;l), \text{ end-to-end observed FOA} \qquad \text{Eqn (19)}$$

$$\tau_{TR}^{(1)}(l) \triangleq \tau_{TR}^{(1)}(t_0;l), \text{ observed differential TOA (DTOA)} \qquad \text{Eqn (20)}$$

$$\alpha_{TR}^{(1)}(l) \triangleq \alpha_{TR}^{(1)}(t_0;l), \text{ observed differential FOA (DFOA).} \qquad \text{Eqn (21)}$$

Similarly, GNSS signal 1 can be approximated by $$\tilde{s}_R(t_0+t;l) \approx \sqrt{2} Re\{e^{j2\pi f_1 Ft} s_R(t_0+t;l)\}, \qquad \text{Eqn (22)}$$

at the input to the ADC shown in FIG. 5, where $s_R(t_0+t;l)$ is given by Eqn (15) and $\varphi_R = \varphi_R^{(1)} + \varphi_R^{(2)}$.

As shown in FIG. 11, and FIG. 12 the LOB and local DOA also adhere closely to a zero-order and first-order model over similar time intervals. Moreover, the variation in local DOA is nearly identical for all of the received GNSS signals, as it primarily due to motion/orientation of the receiver, which equally affects all of the signal LOB's.

As shown in FIG. 13, the ADC output signal is passed to a symbol-rate synchronous vector channelizer, integral to the resent invention, which transforms that signal into a $M_{DoF} \times 1$ vector signal $x_{DoF}(n_{sym})$ with rate $f_{sym}$ equal to the rate of the baseband symbol sequence of the MOS-DSSS civil GNSS signal shown in FIG. 2, e.g., 1 ksps for the civil GNSS signals shown in FIG. 3, and where $M_{DoF}$ is the degrees of freedom (DoF's) of the channelizer output signal. The symbol-rate synchronous channelizer shown in FIG. 13 is implemented using a 1:$M_{ADC}$ serial-to-parallel (S/P) operation, which forms $M_{ADC} \times 1$ S/P output signal $x_{sym}(n_{sym})$ given by Eqn (1), where $T_{sym}=1/f_{sym}$ is the baseband symbol period, followed by multiplication by $M_{DoF} \times M_{ADC}$ channelization matrix $T_{DoF}$, forming $M_{DoF} \times 1$ channelizer output signal $x_{DoF}(n_{sym}) = T_{DoF} \times \text{sym}(n_{sym})$. Both signals have data rate $f_{sym}$.

FIG. 14 describes a particularly useful channelizer based on fast Fourier transform (FFT) operations. The channelizer first applies FFT with $M_{ADC}$ input samples, $M_{FFT} \geq M_{ADC}$ output bins, and a (nominally) rectangular window $\{w_{FFT}(m_{ADC})\}_{m_{ADC}=0}^{M_{ADC}-1}$ to each S/P output vector. The channelizer then selects $M_{DoF}$ output bins $\{k_{bin}(m_{DoF})\}_{m_{DoF}=0}^{M_{DoF}-1}$ for use in subsequent adaptive processing algorithms. The channelizer thereby implements channelizer matrix $$T_{DoF} = \left[ \exp\left(-j2\pi k_{bin}(m_{DoF}) \frac{m_{ADC}}{M_{FFT}}\right) w_{FFT}(m_{ADC}) \right].$$

The output bins can be preselected, e.g., to avoid known receiver impairments such as LO leakage, or to reduce complexity of the channelization operation, e.g., using sparse FFT methods; or adaptively selected, e.g., to avoid dynamic narrowband co-channel interferers (NBCCI).

In one embodiment, the approach is extended polyphase filtering operation $x_{DoF}(n_{sym})=$ $$T_{DoF} \sum_{m_{sym}=0}^{M_{sym}} (w_{sym}(m_{sym}) \odot x_{sym}(n_{sym} - m_{sym})),$$

where $\{w_{sym}(w_{sym}(m_{sym})\}_{m_{sym}=0}^{M_{sym}-1}$ is an order-$M_{sym}$ polyphase filter, "$\odot$" denotes the element-wise multiplication operation, and $M_{DoF} \times M_{ADC}$ matrix $$T_{DoF} = \left[ \exp\left(-j2\pi k_{bin}(m_{DoF}) \frac{m_{ADC}}{M_{FFT}}\right) \right]$$

implements an unpadded, unwindowed FFT with $M_{ADC}$ input samples and $M_{DoF}$ output bins. This channelizer is especially useful in environments subject to very strong NBCCI. However, it affects dispersion added to the channelizer output signal.

Given the reception scenario described in FIG. 6, then the single-sample channelizer output signal shown in FIG. 13 can be modeled by $$x_{DoF}(n_{sym}) = i_{DoF}(n_{sym}) + \sum_{\ell=1}^{L_T} s_{DoF}(n_{sym}; \ell), \qquad \text{Eqn (23)}$$

where $i_{DoF}(n_{sym}) = T_{DoF} i_{sym}(n_{sym})$ and $s_{DoF}(n_{sym};l) = T_{DoF} s_{sym}(n_{sym};l)$ are the $M_{DoF} \times 1$ interference and GNSS signal 1 channelizer output signals, respectively, and where $$i_{sym}(n_{sym}) = \left[ i_R\left(T_{sym}\left(n_{sym} + \frac{m_{ADC}}{M_{ADC}}\right)\right) \right] \text{ and}$$

$$s_{sym}(n_{sym}; \ell) = \left[ s_R\left(T_{sym}\left(n_{sym} + \frac{m_{ADC}}{M_{ADC}}\right); \ell\right) \right]$$

are the $M_{ADC} \times 1$ interference and GNSS signal 1 S/P output vectors, respectively. Assuming the RIP, TOA, and FOA time variation models given in Eqn (12)-Eqn (14), decomposing $\tau_{TR}(l)$ and $\alpha_{TR}(l)$ into symbol-normalized FOA and TOA components $$\tau_{TR}(\ell) = (\tilde{\tau}_{TR}(\ell) + n_{TR}(\ell)) T_{sym} \qquad \text{Eqn (24)}$$

$$\begin{cases} \tilde{\tau}_{TR}(\ell) \in [0\ 1), & \text{fractional fine initial } TOA \\ n_{TR}(\ell) \in \mathbb{Z}, & \text{initial } TOA \text{ symbol offset,} \end{cases}$$

$$\alpha_{TR}(\ell) = \qquad \text{Eqn (25)}$$

$$(\tilde{\alpha}_{TR}(\ell) + k_{TR}(\ell))f_{sym} \begin{cases} \tilde{\alpha}_{TR}(\ell) \in \left[-\frac{1}{2}, \frac{1}{2}\right], & \text{fractional fine } FOA \\ k_{TR}(\ell) \in \mathbb{Z}, & FOA \text{ Nyquist zone,} \end{cases}$$

and defining dimensionless symbol-normalized DFOA $\tilde{\alpha}_{TR}^{(1)}(l) \triangleq \alpha_{TR}^{(1)}(l) T_{sym}^2$, then over short (<10 s) reception intervals $s_{DoF}(n_{sym};l)$ can be modeled by $$s_{DoF}(n_{sym}; \ell) = \qquad \text{Eqn (26)}$$

$$A_{DoF}(n_{sym}; \ell) d_T(n_{sym} - n_{TR}(\ell); \ell) e^{j2\pi(\tilde{\alpha}_{TR}(\ell)n_{sym} + \frac{1}{2}\tilde{\alpha}_{TR}^{(1)}(\ell)n_{sym}^2)},$$

where $d_T(n_{sym};l)$ is a $Q_{sym}(l) \times 1$ transmitted symbol delay-line vector given by $$d_T(n_{sym}; \ell) = \begin{pmatrix} d_T(n_{sym} - Q_{min}(\ell); \ell) \\ \vdots \\ d_T(n_{sym} - Q_{max}(\ell); \ell) \end{pmatrix}, \qquad \text{Eqn (27)}$$

such that $\{d_T(n_{sym}-q_{sym}-n_{TR}(1);1)\}_{q_{sym}=Q_{min}(l)}^{Q_{max}(l)}$ are all the transmitted data symbols observable within $S_{DoF}(n_{sym};l)$, and $A_{DoF}(n_{sym};l)$ is a slowly time-varying, dispersive $M_{DoF} \times Q_{sym}(l)$ multiple-input, multiple-output (MIMO) link signature matrix between the transmitted GNSS l symbol stream and the channelizer output vector, given by $$A_{DoF}(n_{sym}; \ell) = T_{DoF} A_{sym}(n_{sym}; \ell), \qquad \text{Eqn (28)}$$

$$A_{sym}(n_{sym}; \ell) = g_{TR}(\ell)\Delta_R(n_{sym}; \ell)H_R(n_{sym}; \ell), \qquad \text{Eqn (29)}$$

$$\Delta_R(n_{sym}; \ell) = \qquad \text{Eqn (30)}$$

$$\text{diag}\left\{\exp\left(j2\pi\left(\tilde{\alpha}_{TR}(\ell) + k_{TR}(\ell) + \tilde{\alpha}_{TR}^{(1)}(\ell)\left(n_{sym} + \frac{1}{2}\frac{m_{ADC}}{M_{ADC}}\right)\right)\frac{m_{ADC}}{M_{ADC}}\right)\right\},$$

$$H_R(n_{sym}; \ell) = \qquad \text{Eqn (31)}$$

$$\left[h_T\left(t_0 + T_{sym}\left(q_{sym} + \frac{m_{ADC}}{M_{ADC}} - \tilde{\tau}_{TR}(\ell) - \tau_{TR}^{(1)}(\ell)\left(n_{sym} + \frac{m_{ADC}}{M_{ADC}}\right)\right); \ell\right)\right],$$

and where $Q_{sym}(1)=Q_{max}(1)-Q_{min}(1)+1$. Note that Eqn (30) is a function of the symbol-normalized normalized DFOA $\tilde{\alpha}_{TR}^{(1)}(l)$ and fine fractional FOA $\tilde{\alpha}_{TR}(l)$, while Eqn (31) is a function of the DTOA $\tau_{TR}^{(1)}(l)$ and symbol-normalized TOA $\tilde{\tau}_{TR}(l)$.

Over short observation intervals, and assuming the single-symbol channelization approach shown in FIG. 13, $Q_{min}(1)=0$, and $Q_{max}(1)=1$ or 2, resulting in $Q_{sym}(1)=2$ or 3, with the larger value only occurring if $\tilde{\tau}_{TR}(1) \approx 1$. Over sufficiently long observation intervals, $Q_{max}(1) \rightarrow +2$ if $\varepsilon_{TR}(1)>0$, or $Q_{min}(1) \rightarrow -1$ if $\varepsilon_{TR}(1)<0$. Thus all reasonable TOA drift can be accommodated over long observation intervals by setting $Q_{min}(1)=-1$ and $Q_{max}(1)=+2$, yielding $Q_{sym}(1)=4$, for all of the GNSS signals in the receiver's field of view. However, even in this case, the lagging or leading column of $A_{DoF}(n_{sym};1)$ is substantively weaker than the base columns, such that $A_{DoF}(n_{sym};1)$ has "substantive" rank 2. If the channelizer spans multiple symbols, e.g., if it is implemented using an order-$M_{sym}$ polyphase filter, then $Q_{max}(1)$ will be increased by the number of additional symbols spanned in the channelizer, e.g., $Q_{max}(1) \leftarrow Q_{max}(1) + M_{sym}$ and $Q_{sym}(1) \leftarrow Q_{sym}(1) + M_{sym}$.

Defining observed GNSS signal l received symbol vector $$d_R(n_{sym}; \ell) \triangleq \qquad \text{Eqn (32)}$$

$$d_T(n_{sym} - n_{TR}(\ell); \ell)\exp\left(j2\pi\left(\tilde{\alpha}_{TR}(\ell)n_{sym} + \frac{1}{2}\tilde{\alpha}_{TR}^{(1)}(\ell)n_{sym}^2\right)\right),$$

and substituting Eqn (26) into Eqn (23), yields channelizer output signal model $$x_{DoF}(n_{sym}) = i_{DoF}(n_{sym}) + \sum_{\ell=1}^{L_T} A_{DoF}(n_{sym}; \ell)d_R(n_{sym}; \ell) \qquad \text{Eqn (33)}$$

$$= i_{DoF}(n_{sym}) + A_{DoF}(n_{sym})d_R(n_{sym}),$$

where $d_R(n_{sym})$ is the $Q_{net} \times 1$ dispersive network received symbol vector and $A_{DoF}(n_{sym})$ is the slowly time-varying, dispersive $M_{chn} \times Q_{net}$ MIMO network signature matrix between all of the GNSS transmitted and the received symbols, given by $$A_{DoF}(n_{sym}) = [A_{DOF}(n_{sym}; 1) \dots A_{DOF}(n_{sym}; L_T)], \qquad \text{Eqn (34)}$$

$$d_R(n_{sym}) = \begin{pmatrix} d_R(n_{sym}; 1) \\ \vdots \\ d_R(n_{sym}; L_T) \end{pmatrix}, \qquad \text{Eqn (35)}$$

respectively, and where $$Q_{net} \triangleq \sum_{\ell=1}^{L_T} Q_{sym}(\ell)$$

is the total network loading induced by the GNSS signals.

If $M_{DoF} \geq Q_{net}$ and the GNSS signals are received with high despread SINR, the entire network symbol stream can be extracted from the channel, i.e., the interfering GNSS symbol streams can be excised from each GNSS symbol, using purely linear combining operations. This can include methods well known to the signal processing community, e.g., blind adaptive baseband extraction methods described in the prior art, and linear minimum-mean-square-error (LMMSE) methods described in the prior art. For signals transmitted from MEO GNSS SV's, and in the absence of pseudolites or spoofers operating in the same band as those SV's, no more than 12 SV's are likely to be within the field of view of a GNSS receiver at any one time ($L_T \leq 12$). Over short observation intervals, $Q_{sym}(1) \approx 2$, and the maximum substantive rank of the MIMO network signature matrix is therefore likely to be 24. This number can grow to 48 in the presence of 12 spoofers "assigned" to each legitimate GNSS signal. In both cases, $Q_{net}$ is much less than the number of channels available for any GNSS signals listed in FIG. 3.

This channel response is also exactly analogous to channel responses induced in massive MIMO networks currently under investigation for next-generation (5G) cellular communication systems. However, it achieves this response using only a single-feed receiver front-end, thereby bypassing the most challenging aspect of massive MIMO transceiver technology. And it provides an output signal with an effective data rate of 1 ksps for all of the signals listed in FIG. 3, as opposed to 10-20 Msps for massive MIMO networks under consideration for 5G cellular communication applications. This receiver front-end also provides considerable flexibility in the number of degrees of freedom $M_{DoF}$ used at the receiver, e.g., by modifying the ADC sampling rate, or the number of FFT bins used in the channelizer, or any combination thereof (albeit, at loss in processing gain if the channelizer does not fully cover the GNSS signal passband).

Lastly, the digital signal processing (DSP) operations needed to exploit this channel response are expected to be very similar to operations needed for 5G data reception, albeit at a 3-4 order-of-magnitude lower switching rate. Given the massive investment expected in 5G communications over the next decade, and the ongoing exponential improvements in cost and performance of DSP processing and memory, e.g., Moore's and Kryder's Laws, the ability to fully exploit this channel response will become increasingly easier over time.

Modeling Link Signature Blur

Over long observation intervals, the time-varying components of Eqn (30) and Eqn (31) results in "FOA blur" and "TOA blur" of the link signature matrix, exactly analogous to "signature blur" caused by change in observed direction-of-arrival (DOA) of moving platforms in conventional MIMO networks. Over moderate observation intervals, e.g., $0 \le t < T_{sym}N_{sym}$ where $\tilde{\alpha}_{TR}^{(1)}(l)N_{sym} \ll 1$ in Eqn (30) and $\tau_{TR}^{(1)}(l)T_{sym}N_{sym} \ll 1$ in Eqn (31), this can be quantified by expanding $\Delta_R(n_{sym};l)$ and $H_R(n_{sym};l)$ in Taylor-series expansions $$\Delta_R(n_{sym}; \ell) = \left(\sum_{q=0}^{\infty} \frac{1}{q!} \text{diag}\left\{\left(j2\pi\tilde{\alpha}_{TR}^{(1)}(\ell)\left(n_{sym} + \frac{1}{2}\frac{m_{ADC}}{M_{ADC}}\right)\frac{m_{ADC}}{M_{ADC}}\right)^q\right\}\right)\Delta_R(\ell) \quad \text{Eqn (36)}$$

$$\approx \left(\sum_{q=0}^{\infty} \frac{1}{q!}(j2\pi\tilde{\alpha}_{TR}^{(1)}(\ell)n_{sym})^q \text{diag}\left\{\left(\frac{m_{ADC}}{M_{ADC}}\right)^q\right\}\right)\Delta_R(\ell),$$

$$\Delta_R(\ell) = \text{diag}\left\{\exp\left(j2\pi(\tilde{\alpha}_{TR}(\ell) + k_{TR}(\ell))\frac{m_{ADC}}{M_{ADC}}\right)\right\}, \quad \text{Eqn (37)}$$

$$H_R(n_{sym}; \ell) = \sum_{q=0}^{\infty} \frac{1}{q!} \text{diag}\left\{\left(-\tau_{TR}^{(1)}(\ell)T_{sym}\left(n_{sym} + \frac{m_{ADC}}{M_{ADC}}\right)\right)^q\right\}H_R^{(q)}(\ell) \quad \text{Eqn (38)}$$

$$\approx \sum_{q=0}^{\infty} \frac{1}{q!}(-\tau_{TR}^{(1)}(\ell)T_{sym}n_{sym})^q H_R^{(q)}(\ell),$$

$$H_R^{(q)}(\ell) = \left[h_T^{(q)}\left(t_0 + T_{sym}\left(q_{sym} + \frac{m_{ADC}}{M_{ADC}} - \tilde{\tau}_{TR}(\ell)\right); \ell\right)\right], \quad \text{Eqn (39)}$$

where $h_T^{(q)}(t;l) = d^q h_T(t;l)/dt^q$. For the range of DTOA and DFOA values measured over the reception scenario shown in FIG. 9 and summarized in FIG. 10, $|\tau_{TR}^{(1)}(l)T_{sym}|$ and $|\tilde{\alpha}_{TR}^{(1)}(l)|$ are less than $2.3 \times 10^{-6}$ and $3.1 \times 10^{-6}$, respectively, or 0.023 and 0.031 over 10,000 symbols (10 seconds), respectively, and Eqn (36)-Eqn (39) should therefore hold closely for small expansion orders. In this case, $A_{DoF}(n_{sym};l)$ is well represented by a low-order regression model over small observation intervals, e.g., $$A_{DoF}(n_{sym}; \ell) \approx \sum_{q_{blur}=0}^{Q_{blur}(\ell)} A_{DoF}^{(q_{blur})}(\ell)g_{blur}^{(q_{blur})}(n_{sym}), \quad \text{Eqn (40)}$$

where $\{g_{blur}^{(q_{blur})}(n_{sym})\}_{q_{blur}=0}^{Q_{blur}(l)}$ is a deterministic sequence with order $Q_{blur}(l)$. Using Eqn (40), $s_{DoF}(n_{sym};l)$ is expressed as $$s_{DoF}(n_{sym}; \ell) \approx \left(\sum_{q_{blur}=0}^{Q_{blur}(\ell)} A_{DoF}^{(q_{blur})}(\ell)g_{blur}^{(q_{blur})}(n_{sym})\right)d_R(n_{sym}; \ell) \quad \text{Eqn (41)}$$

$$= \left[A_{DoF}^{(0)}(\ell) \ldots A_{DoF}^{(Q_{blur}(\ell))}(\ell)\right]$$

$$\begin{pmatrix} g_{blur}^{(0)}(n_{sym})d_R(n_{sym}; \ell) \\ \vdots \\ g_{blur}^{(Q_{blur}(\ell))}(n_{sym})d_R(n_{sym}; \ell) \end{pmatrix}$$

$$= \left[A_{DoF}^{(0)}(\ell) \ldots A_{DoF}^{(Q_{blur}(\ell))}(\ell)\right]$$

$$(g_{blur}(n_{sym}; \ell) \otimes d_R(n_{sym}; \ell)),$$

where $g_{blur}(n_{sym};l) = [g_{blur}^{(q_{blur})}(n_{sym})]_{q_{blur}=0}^{Q_{blur}(l)}$ is a $(1+Q_{blur}(l)) \times 1$ deterministic basis function and "$\otimes$" denotes the Kronecker product operation. A more useful form of Eqn (41) can be developed by reversing the order of the Kronecker product order, yielding link model $$s_{DoF}(n_{sym};l) \approx A'_{DoF}(l)d'_R(n_{sym};l), \quad \text{Eqn (42)}$$

$$d'_R(n_{sym};l) = d_R(n_{sym};l) \otimes g_{blur}(n_{sym};l), \quad \text{Eqn (43)}$$

$$A'_{DoF}(l) = [A'_{DoF}(q_{min}(l);l) \ldots A'_{DoF}(q_{max}(l);l)], \quad \text{Eqn (44)}$$

where $A'_{DoF}(q;l) = [a_{DoF}^{(0)}(:,q;l) \ldots a_{DoF}^{(Q_{blur}(l))}(:,q;l)]$ is the $M_{DoF} \times (1+Q_{blur}(l))$ blurred signature matrix multiplying $g_{blur}(n_{sym};l)d_R(n_{sym}-q;l)$. Substituting Eqn. (42) into Eqn (33) yields network model $$x_{DoF}(n_{sym}) = i_{DoF}(n_{sym}) + \sum_{\ell=1}^{L_T} A'_{DoF}(\ell)d'_R(n_{sym}; \ell) \quad \text{Eqn (45)}$$

$$= i_{DoF}(n_{sym}) + A'_{DoF}d'_R(n_{sym}).$$

The rank of the MIMO link and network matrices grow to $Q'_{sym}(l) = Q_{sym}(l)(1+Q_{blur}(l))$ and $$Q'_{net} = \sum_{\ell=1}^{L_T} Q'_{sym}(\ell),$$

respectively. Regression analysis of $A_{DoF}(n_{sym};l)$ for GPS C/A ranging codes and a channelizer output bandwidth of 250 kHz ($M_{DoF} \sim 250$) shows that $A_{DoF}(n_{sym};l)$ is well modeled by Eqn (40) over observation intervals on the order of 2 seconds using a $1^{st}$-order polynomial sequence, i.e., $Q_{blur}(l)=1$, if the signal is transmitted from a MEO SV, and using a $0^{th}$-order polynomial sequence, i.e., $Q_{blur}(l)=0$, if the receiver is fixed and the symbol stream is transmitted from a pseudolite or ground beacon. Thus over long observation intervals the rank of the MIMO network matrix can double, e.g., to 48 in non-spoofing scenarios, or 96 in spoofing scenarios, which is still much lower than channelization factors commensurate with full-band or even partial-band reception of any of the civil GNSS signals listed in FIG. 3.

Extension to More Complex Channels

This signal description, or model, is also now more effectively and easily extensible to more complex channels. Two simple extensions include local multipath channels, in which the simple direct path link model shown in FIG. 1 is extended to include effects of multipath due to scattering or specular reflectors local to and traveling with the receiver platform, and unsynchronized reception scenarios in which the clock driving the ADC and LO has a rate and timing phase that is not fully synchronized to universal time coordinates (UTC). In the former case, Eqn (8) can be extended to $$s_R(t_0 + t; \ell) \approx e^{j2\pi(\alpha_{TR}(\ell)t + \frac{1}{2}\alpha_{TR}^{(1)}(\ell)t^2)} \quad \text{Eqn (46)}$$

$$g_{TR}(\ell)(h_R(t; \ell) * s_T((1 - \tau_{TR}^{(1)}(\ell))t - \tau_{TR}(\ell); \ell))$$

where $h_R(t;l)$ is the impulse response of the channel local to the receiver and "*" denotes the convolution operation. The GNSS link l channel model is then adjusted by replacing $h_T(t;l)$ with $$h_{TR}(t, \ell) = \quad \text{Eqn (47)}$$

$$\frac{1}{1 - \tau_{TR}^{(1)}(\ell)} \int h_R\left(\frac{u}{1 - \tau_{TR}^{(1)}(\ell)}; \ell\right) h_T(t - u; \ell) du \leftrightarrow H_{TR}(f; \ell) =$$

$$H_R((1 - \tau_{TR}^{(1)}(\ell))f; \ell) H_T(f; \ell),$$

in Eqn (39), where $H_T(f;l)$, $H_R(f;l)$, and $H_{TR}(f;l)$ are the Fourier transforms of $h_T(t;l)$, $h_R(t;l)$, and $h_{TR}(t;l)$, respectively.

In the latter case, assuming fractional clock rate offset of $\varepsilon_R$ and timing offset of $t_R$, such that the LO downconversion frequency is given by $f_R=(1+\varepsilon_R)f_T$ and the ADC sampling times are given by $t(n_{ADC})=t_R+T_{ADC}n_{ADC}$, where $T_{ADC}=T_{sym}/(1+\varepsilon_R)M_{ADC}$, then the description derived here is revised by replacing $\varphi_{TR}(l)$, $\tau_{TR}(l)$, $\tau_{TR}^{(1)}(l)$, $\alpha_{TR}(l)$, and $\alpha_{TR}^{(1)}(l)$ with $$\varphi_{TR}(\ell) \leftarrow \varphi_{TR}(\ell) + 2\pi\left((\alpha_{TR}(\ell) - \varepsilon_R f_R)t_R + \frac{1}{2}\alpha_{TR}^{(1)}(\ell)t_R^2\right), \quad \text{Eqn (48)}$$

$$\tau_{TR}(\ell) \leftarrow \tau_{TR}(\ell) + t_R \tau_{TR}^{(1)}(\ell), \quad \text{Eqn (49)}$$

$$\tau_{TR}^{(1)}(\ell) \leftarrow \frac{\tau_{TR}^{(1)}(\ell) + \varepsilon_R}{1 + \varepsilon_R}, \quad \text{Eqn (50)}$$

$$\alpha_{TR}(\ell) \leftarrow \frac{\alpha_{TR}(\ell) + \alpha_{TR}^{(1)}(\ell)t_R - \varepsilon_R f_R}{1 + \varepsilon_R}, \quad \text{Eqn (51)}$$

$$\alpha_{TR}^{(1)}(\ell) \leftarrow \frac{\alpha_{TR}^{(1)}(\ell)}{1 + \varepsilon_R}, \quad \text{Eqn (52)}$$

in all channel descriptions given after the ADC operation.

Extension to Multifeed Reception

The single-feed reception can be extended simply to multifeed reception shown in FIG. 16, in which the GNSS signals are received over multiple spatial or polarization diverse antennas. In the exemplary direct-conversion system shown in FIG. 16, the GNSS signals are received over $M_{food}$ feeds using a set of spatial and/or polarization diverse antennas (90a-90c), in some embodiments coupled from a larger set of antennas to $M_{feed}$ feeds using a beamforming network (BFN) (94). The $M_{feed}$ feeds are then coherently converted to complex-baseband using a direct-conversion receiver bank (101), to form $M_{feed} \times 1$ signal vector $x_R(t-\tau_R)=[x_R(t-\tau_R;m_{feed})]_{m_{feed}=1}^{M_{feed}}$. The feed vector $x_R(t-\tau_R)$ is then sampled by a bank of dual-ADC's 143, at sampling rate $M_{ADC}f_{sym}$ determined by a common clock (117) where $f_{sym}$ is the baseband symbol rate of the MOS-DSSS civil GNSS signals transmitted to the receiver, and $M_{ADC}$ is a positive integer, and channelized into an $M_{chn} \times 1$ signal vector $x_{chn}(n_{sym};m_{feed})$ using a bank of symbol-rate synchronous 1:$M_{chn}$ vector channelizers (160), for example, using a 1:$M_{ADC}$ S/P operation and an $M_{chn} \times M_{ADC}$ channelization matrix $T_{chn}$. The channelizer output signals) $\{x_{chn}(n_{sym};m_{feed})\}_{m_{feed}=1}^{M_{feed}}$ are then combined to form an $M_{DoF} \times 1$ complex vector $x_{DoF}(n_{sym})$ (159), for example, by stacking them over receiver feeds as shown in Eqn (3), where $M_{DoF}=M_{feed}M_{chn}$ is the total number of receiver DoF's used by the invention.

Assuming coherent downconversion of the received signals, the complex $M_{feed} \times 1$ signal generated at the input to the dual-ADC band is modeled as $$x_R(t - \tau_R) = i_R(t - \tau_R) + \sum_{\ell=1}^{L} s_R(t - \tau_R; \ell),$$

where $i_R(t)$ comprises the $M_{feed} \times 1$ vector of background noise and CCI present in the GNSS band, and $s_R(t-\tau_R;l)$ is $M_{feed} \times 1$ vector of GNSS signals received from transmitted l. In the absence of nonlocal multipath, and over narrow receiver bandwidth, $s_R(t;l)$ is modeled by $$s_R(t_0 + t; \ell) \approx \quad \text{Eqn (53)}$$

$$a_{TR}(t; \ell)e^{j2\pi(\alpha_{TR}(\ell)t + \frac{1}{2}\alpha_{TR}^{(1)}(\ell)t^2)}g_{TR}(\ell)s_T((1 - \tau_{TR}^{(1)}(\ell))t - \tau_{TR}(\ell); \ell),$$

where $a_{TR}(t;l)$ is the $M_{feed} \times 1$ time-varying spatial signature of the signal, which is also assumed to adhere to a first-order DOA blur model due to movement of the receiver over the reception interval.

Assuming the antennas have nonzero gain along right-hand and left-hand circular polarizations, and in absence of local scattering multipath, $a_{TR}(t;l)$ can be modeled as $$a_{TR}(t;l) = A_R(\Psi_R(t)u_{TR}(t;l))\rho_{Tr}(t;l), \quad \text{Eqn (54)}$$

where $\{A_R(u)\}_{\|u\|_2=1}=\{[a_R(u)|_{RHCP} a_R(u)|_{LHCP}]\}_{\|u\|_2=1}$ is the array manifold of $M_{feed} \times 2$ complex gains along the right-hand and left-hand circular polarizations at the BFN output, parameterized with respect to 3×1 unit-norm local direction-of-arrival (DOA) vector u, and where $\rho_{TR}(t;l)$ is a (generally time-varying) 2×1 unit-norm polarization gain vector. The array manifold can include adjustments to account for multipath local to the receiver platform, mutual coupling between antenna elements, and direction-independent complex gains in any distribution system coupling the array to the BFN and/or the receiver bank.

As discussed for the scenario shown in FIG. 9 and summarized in FIG. 11, the local signal DOA's adhere's closely to a first-order model over time intervals on the order of 10 seconds. For an antenna array with close element spacing, the time-varying spatial signature should therefore also adhere to a first-order model, i.e., $a_{TR}(t;l) \approx a_{TR}(t_0;l) + a_{TR}^{(1)}(t_0;l)(t-t_0)$ for $|t-t_0| \leq 10$ s, where $a_{TR}^{(1)}(t;l) \triangleq da_{TR}(t;l)/dt$ is the first derivative of $a_{TR}(t;l)$. Using this approximation, then the GNSS signal l MIMO link matrix is given by $$A_{DoF}(n_{sym};l) = (a_{TR}(t_0;l) + a_{TR}^{(1)}(t_0;l)T_{sym}n_{sym}) \otimes A_{chn}(n_{sym};l) + a_{TR}^{(1)}(t_0;l)T_{sym} \otimes A_{chn}^{(1)}(n_{sym};l),$$  Eqn (55)

where $$A_{chn}(n_{sym};\ell) = T_{chn}A_{sym}(n_{sym};\ell) \text{ and } A_{chn}^{(1)}(n_{sym};\ell) = T_{chn}\text{diag}\left\{\frac{m_{ADC}}{M_{ADC}}\right\}A_{sym}(n_{sym};\ell),$$

and where $A_{sym}(n_{sym};l)$ is given by Eqn (29)-Eqn (31). Equation Eqn (55) also admits low-order regression model Eqn (40) for $A_{DoF}(n_{sym};l)$, allowing $s_{DoF}(n_{sym};l)$ to be modeled by Eqn (42)-Eqn (44). This receiver model also extends to dispersive channels in which the feeds are subject to local multipath, including local multipath that is substantively different on each feed, using channel modifications given in Eqn (46)-Eqn (47); and to receivers with clocks that are not synchronized to UTC, using channel modifications given in Eqn (48)-Eqn (52).

Note that the structure of the end-to-end multifeed MIMO network model is identical to the structure of the single-feed MIMO network model given in Eqn (33) and Eqn (45). Any differences lie only in the internal structure of the MIMO link matrix $A_{DoF}(n_{sym};l)$ and $A'_{DoF}(l)$, and the structure of the co-channel interference added to those signals. Therefore, any algorithm that blindly exploits the network model given in Eqn (33) or Eqn (45) can be applied to either a single-feed or a multifeed receiver with no change in structure, albeit with differences in implementation complexity if $M_{DoF}$ varies as a function of $M_{feed}$, and with differences in performance, e.g., if the additional spatial/polarization of the received signals allows the processor to better separate GNSS signals or remove CCI.

To overcome this complexity issue, the baseline channelizer method can be adjusted to provide the same number of DoF's for the multifeed receiver as the single-feed receiver, by reducing $M_{chn}$ or the ADC sampling rate by $1/M_{feed}$, such that $M_{DoF}$ remains constant as $M_{feed}$ is increased. This is easily accomplished using the thinned-FFT channelizer shown in FIG. 14, by simply reducing the number of output bins used by the channelizer. If the channelizer bins remain densely spaced, this approach has the added benefit of reducing the effect of TOA blur on the output signal. Alternately, if the channelizer bins are sparsely spaced, this approach can reduce complexity of the channelization operation itself. However, it should be noted that this processor sacrifices despreading gain that could improve the SINR of the output symbol stream.

Importantly, while the TOA and FOA of a GNSS transmitter can be easily spoofed in a covert or "aligned" spoofing scenario, the DOA (and, to a lesser degree, the polarization) of that transmitter cannot be easily spoofed. In addition, the multifeed receiver can null any CCI impinging on the array, if the array has sufficient degrees of freedom to separate that CCI from the GNSS signals.

Blind Civil GNSS Despreading Method

Adaptive Despreader Structures

The single-feed and multifeed adaptive despreader structures are shown in FIG. 17 and FIG. 18. Both structures comprise the following.

A receiver front-end, which downconverts, digitizes, and channelizes signals received over one or more antennas, providing a $M_{DoF} \times 1$ vector signal $x_{DoF}(n_{sym})$ with sample rate $f_{sym}$ equal to the GNSS signal symbol rates.

A blind despreading stage, which directly exploits the general MIMO network structure given in Equation Eqn (33) or Eqn (45) to detect, despread, and demodulate received GNSS signals without explicitly using or searching over ranging codes or (for multifeed receivers) the array manifold of the receiver, using only that MIMO network structure and properties of the GNSS symbol streams listed in FIG. 3. Among other advantages, this stage can operate under potentially heavy CCI, including wideband CCI in multifeed receivers, and can greatly exceed the performance of conventional correlative matched-filter despreaders. This stage also estimates the number of transmitted GNSS signals $L_T$ in the receiver's field of view, and estimates key geo-observables of those signals, e.g., the fractional fine FOA and symbol-normalized DFOA (referred to here as the FOA vectors $\{\alpha_{TR}(l)\}_{l=1}^{L_T}$), initial coarse TOA symbol offsets $\{n_{TR}(l)\}_{l=1}^{L_T}$, and in some embodiments MIMO signature matrices $\{A'_{DoF}(l)\}_{l=1}^{L_T}$ for the detected GNSS signals, as part of the blind despreading procedure.

A optional copy-aided analysis stage, which determines remaining geo-observables needed for a full PNT solution, using copy-aided parameter estimation methods that exploit results of the blind despreading stage and detailed structure of the MIMO link matrices given in Eqn (28)-Eqn (31) for the single-feed system shown in FIG. 17, and the additional structure given in Eqn (54)-Eqn (55) for the multifeed system shown in FIG. 18. The copy-aided analysis stage does require search over code timing to complete the PNT, as well as the array manifold if DOA is accessible and desired, e.g., to unambiguously identify spoofers. However this search is simplified by geo-observables already estimated in the blind despreader, and does not require a search over code PRN if that is accessible within the demodulated navigation signals. Moreover, the copy-aided estimator outperforms estimators obtained using correlative methods, especially in presence of strong CCI and GNSS signals, e.g., co-channel beacons, because those prior statistics are both robust to CCI and cross-interference between other GNSS signals. This performance improvement can be substantive if co-channel beacons are received at strong signal-to-noise ratio (SNR), as in this case the performance of correlative methods will be gated by cross-interference between beacons rather than background noise and interference.

The PNT solution can also be used to provide clock offset estimates to synchronize the receiver(s) to UTC, possibly on a per-feed basis if the receivers in FIG. 18 are driven by independent clocks (not recommended). In this case, the corrections can be applied directly to the receiver(s), or in digital post-processing after the ADC.

The despreading structures can be adapted on either a continuous basis, in which geo-observables are updated rapidly over time, or on a batch processing basis, in which a block of $N_{sym}$ channelized data symbols $\{x_{DoF}(n_{sym})\}_{n_{sym}=0}^{N_{sym}-1}$ are computed and passed to a DSP processing element that detects the GNSS signals within that data block. The latter approach is especially useful if the invention is being used to develop resilient PNT analytics to aid a primary navigation system, e.g., to assess quality and availability of new GNSS transmissions, or to detect or confirm spoofing transmissions on a periodic basis. The batch adaptive despreading algorithms are described in more detail below.

Batch Adaptive Despreading Procedure for General Civil GNSS Signals

An exemplary adaptation procedure generally applicable to batch processing of any of the MOS-DSSS civil GNSS signals described in FIG. 3, and that improves any set of the efficiency and speed of the signal processing, is shown in FIG. 19 and described in more specific detail in the detailed description for that drawing. The algorithm is implemented on a "batch processing" basis, by collecting channelizer output data over $N_{sym}$ data symbols, and detecting and extracting the civil GNSS navigation streams directly from that data set. The algorithm is designed to perform this processing from a "cold start," (218) i.e., with no prior information about the signals contained within that data set. However, if the prior FOA's and DFOA's of the signals can be provided to the processor (222), or if baseband symbols or navigation data for the signals can be provided (222), then the procedure can be started at an intermediate point in the processing.

The first 8 steps of FIG. 20 are those operations performed in the blind despreading stage. The last two steps of FIG. 20 are the copy-aided analysis stage. Note that neither ranging code nor array calibration data is required until the copy-aided analysis stages; in particular, the navigation data can be demodulated without ever searching over that data. This is a marked departure from both conventional correlative or despreading methods in the prior art, which require identification and search over the ranging code before the navigation signal can be demodulated, and "codeless despreading" algorithms that cannot demodulate that data.

This procedure enables a great deal of refinement and accurate discrimination to more closely constrain and limit the processing necessary to accurately interpret the signal's content, before the copy-aided analysis phase begins. In some use scenarios, the blind despreading stage can in fact obviate the copy-aided analysis phase, e.g., if the invention is developing resilient PNT analytics to aid a primary navigation system, or it can be used to substantively thin the number of transmissions that must be analyzed. This procedure can thereby reduce the processing complexity and considerable feedback lag, enabling quicker, more effective signal discrimination without requiring the full processing and analysis of the signal be completed first (or even together).

Batch Adaptive Despreadinq Procedure Implementation for GPS C/A Signals

An exemplary adaptation procedure applicable to the GPS C/A signal, and that improves any set of the efficiency and speed of the signal processing is shown in FIG. 20 and described in more specific detail in the detailed description for that drawing. The algorithm is implemented on a "batch processing" basis, by collecting channelizer output data over $N_{sym}$ data symbols, and detecting and extracting the GPS navigation streams directly from that data set. The algorithm is designed to perform this processing from a "cold start," i.e., with no prior information about the signals contained within that data set. However, if the prior FOA's of the signals (and in particular FOA's derived from the FOA vectors for those signals) are known, then the procedure can be started at an intermediate point in the processing.

The first 8 steps of FIG. 20 are those operations performed in the blind despreading stage. The last two steps of FIG. 20 are the copy-aided analysis stage. Note that neither ranging code nor array calibration data is required until the copy-aided analysis stages; in particular, the navigation data can be demodulated without ever searching over that data. This is a marked departure from both conventional correlative or despreading methods in the prior art, which require identification and search over the ranging code before the navigation signal can be demodulated, and "codeless despreading" algorithms that cannot demodulate that data.

This procedure enables a great deal of refinement and accurate discrimination to more closely constrain and limit the processing necessary to accurately interpret the signal's content, before the copy-aided analysis phase begins. In some use scenarios, the blind despreading stage can in fact obviate the copy-aided analysis phase, e.g., if the invention is developing resilient PNT analytics to aid a primary navigation system, or it can be used to substantively thin the number of transmissions that must be analyzed. This procedure can thereby reduce the processing complexity and considerable feedback lag, enabling quicker, more effective signal discrimination without requiring the full processing and analysis of the signal be completed first (or even together).

Data Whitening Operation

The batch processing procedures shown in FIG. 19 and FIG. 20 perform a preliminary data whitening operation (220) to simplify subsequent despreading and linear algebraic adaptation algorithms. An exemplary whitening procedure is the QR decomposition (QRD), known to those skilled in that field. Forming $N_{sym} \times M_{DoF}$ windowed data matrix $$X_{DoF} \triangleq \begin{pmatrix} \sqrt{\omega_{DoF}(0)}\, x_{DoF}^H(0) \\ \vdots \\ \sqrt{\omega_{DoF}(N_{sym}-1)}\, x_{DoF}^H(N_{sym}-1) \end{pmatrix}, \quad \text{Eqn (56)}$$

where $\{\omega_{DoF}(n_{sym})\}_{n_{sym}=0}^{N_{sym}-1}$ is a real data window satisfying $$\sum_{n_{sym}=0}^{N_{sym}-1} \omega_{DoF}(n_{sym}) = 1 \text{ and } (\bullet)^H$$

denotes the conjugate-transpose (Hermitian) operation, then the QRD of $X_{DoF}$, denoted $\{Q_{DoF}, R_{DoF}\} = \text{QRD}(X_{DoF})$, solves $$R_{DoF} = chol\{X_{DoF}^H X_{DoF}\}, \quad \text{Eqn (57)}$$

$$Q_{DoF} = X_{DoF} R_{DoF}^{-1} = \begin{pmatrix} q_{DoF}^H(0) \\ \vdots \\ q_{DoF}^H(N_{sym} - 1) \end{pmatrix}, \quad \text{Eqn (58)}$$

where chol(•) is the Cholesky factorization operation, such that $X_{DoF} = Q_{DoF} R_{DoF}$ and $Q_{DoF}{}^H Q_{DoF} = I_{M_{DoF}}$, where $I_M$ is the M×M identity matrix. The data window is norminally rectangular; however, other windows are recommended if the FOA offset between GNSS signals is small, e.g., for fixed ground beacons or aligned spoofers.

Blind GPS C/A Despreading Algorithms

The blind GPS C/A despreading flow diagram shown in FIG. 20 comprises the following key processing stages:

- An emitter detection operation, which detects GNSS emitters in the environment using a phase-SCORE algorithm that exploits the high single-lag correlation of the GNSS symbol streams, along with additional analysis operations to associate phase-SCORE solutions with specific emitters.
- A FOA refinement operation, which refines the fine fractional FOA estimate provided by phase-SCORE, and prunes false alarms, using a frequency doubler spectrum that exploits the BPSK structure of the GNSS symbol streams.
- A despreader refinement operation, which refines the phase-SCORE based emitter solution, using a conjugate-SCORE algorithm that also exploits the BPSK structure of the GNSS symbol streams.
- A NAV stream demodulation operation, which identifies the 50 sps NAV stream timing phase within each 1 ksps GNSS symbol stream, and demodulates each NAV stream, based on the 1:20 interpolated BPSK structure of the NAV stream.

These operations are described in more detail in the subsections below.

Phase-SCORE Detection Implementation

Phase-SCORE Eigenequation

The phase-SCORE implementation exploits the autocorrelation function $R_{d_T d_T}(m_{lag}) = \langle d_T(n_{sym}) d^*_T(n_{sym} - m_{lag}) \rangle$ induced by the 1:$M_{NAV}$ interpolation of the transmitted (BPSK) GPC C/A symbol stream, i.e., $d_T(n_{sym}) = b_T(\lfloor n_{sym}/M_{NAV} \rfloor)$, given by $$R_{d_T d_T}(m_{lag}) = \begin{cases} 1 - \dfrac{|m_{lag}|}{M_{NAV}}, & -M_{NAV} < m_{lag} < M_{NAV} \\ 0, & \text{otherwise} \end{cases} \quad \text{Eqn (59)}$$

for general 1:$M_{NAV}$ interpolation, where $\langle \cdot \rangle$ denotes infinite time-averaging over $n_{sym}$ and $(\cdot)^*$ denotes the conjugation operation (unused here for BPSK symbol sequences). The phase-SCORE implementation exploits this property, by solving the generalized eigenequation $$\lambda_{PSC}(m) \hat{R}_{x_{DoF} x_{DoF}} w_{PSC}(m) = \hat{R}_{x_{DoF} x_{DoF}}(m_{lag}) w_{PSC}(m),$$
$$|\lambda_{PSC}(m)| \geq |\lambda_{PSC}(m+1)|, \quad \text{Eqn (60)}$$

where $\hat{R}_{x_{DoF} x_{DoF}}(m_{lag})$ is the lag-$m_{lag}$ sample data autocorrelation matrix (ACM) computed over data set $$\{x_{DoF}(n_{sym})\}_{n_{sym}=0}^{N_{sym}-1}, \quad \text{Eqn (61)}$$

$$\hat{R}_{x_{DoF} x_{DoF}}(m_{lag}) \triangleq$$

$$\sum_{n_{sym}=m_{lag}}^{N_{sym}-1} \sqrt{\omega_{DoF}(n_{sym}) \omega_{DoF}(n_{sym} - m_{lag})} \, x_{DoF}(n_{sym})$$

$$x_{DoF}^H(n_{sym} - m_{lag}) = X_{DoF}^H S(m_{lag}) X_{DoF},$$

$$S(m_{lag}) = \begin{pmatrix} 0 & 0 \\ I_{N_{sym}-m_{lag}} & 0 \end{pmatrix},$$

and where zero-lag ACM $\hat{R}_{x_{DoF} x_{DoF}} \triangleq \hat{R}_{x_{DoF} x_{DoF}}(0)$ and $X_{DoF}$ is given by Eqn (56).

Using the QRD described in Eqn (56)-Eqn (58), the phase-SCORE eigenequation given in Eqn (60) is compactly expressed as $$\lambda_{PSC}(m) u_{PSC}(m) = \hat{R}_{q_{DoF} q_{DoF}}(m_{lag}) u_{PSC}(m), \quad \text{Eqn (62)}$$
$$|\lambda_{PSC}(m)| \geq |\lambda_{PSC}(m+1)|,$$

$$\hat{R}_{q_{DoF} q_{DoF}}(m_{lag}) = \sum_{n_{sym}=1}^{N_{sym}-1} q_{DoF}(n_{sym}) q_{DoF}^H(n_{sym} - m_{lag}) \quad \text{Eqn (63)}$$

$$= Q_{DoF}^H S(m_{lag}) Q_{DoF},$$

where $u_{PSC}(m) = R_{DoF} w_{PSC}(m) / \|R_{DoF} w_{PSC}(m)\|_2$ is the unit-norm whitened phase-SCORE eigenvector for mode m, which forms mode m windowed despread output signal $z_{PSC}(n_{sym}; m) = u_{PSC}^H(m) q_{DoF}(n_{sym}) = \sqrt{\omega_{DoF}(n_{sym})} y_{PSC}(n_{sym}; m)$, and where $y_{PSC}(n_{sym}; m) = w_{PSC}^H(m) x_{DoF}(n_{sym})$. The whitening operation efficiently implements many additional operations performed in the system, reducing computational complexity and load.

In the presence of TOA blur, and under the same conditions described above, the phase-SCORE eigenequation provides $Q'_{net}$ signal-capture solutions, separated into $L_T$ sets of eigenequations for each GNSS signal. The signal-capture set for GNSS signal l comprises $Q'_{sym}(l)$ solutions in which the eigenvalue phase is approximately proportional to the fine fractional FOA $\alpha_{TR}(l)$, and the eigenvector nulls the other GNSS symbol streams $\{d'_R(n_{sym}; l')\}_{l' \neq l} = \{d_R(n_{sym}; l') \otimes g_{blur}(n_{sym}; l')\}_{l' \neq l}$, suppresses the received non-GNSS interference, and extracts a linear combination of the elements of $d'_R(n_{sym}; l) = d_R(n_{sym}; l) \otimes g_{blur}(n_{sym}; l)$. This allows phase-SCORE modes to be associated with specific emitters, based on the phase of the phase-SCORE eigenvalues. In practice, phase-SCORE should detect $1 + Q_{blur}(l)$ modes per GNSS signal, associated with the single-lag symbol stream.

In the presence of FOA blur due to nonzero DFOA, the lag correlation statistic exploited by the eigenequation is degraded. However, if $|\alpha_{TR}^{(1)} m_{lag}| N_{sym} \ll 1$, this degradation will be small. Examination of FIG. 10B for the exemplary scenario shown in FIG. 9 shows that $|\alpha_{TR}^{(1)}| N_{sym} \leq 0.03$ over reception intervals on the order of 10 s ($N_{sym} = 10,000$), and for $m_{lag} = 1$, and this condition holds.

The autocorrelation function given in Equation Eqn (59) is a well known property of the GPS C/A signal, and has been explicitly exploited to design algorithms for adaptation of spatial antijam arrays using the closely-related cross- SCORE algorithm. Yet, while as shown in the prior art the cross-SCORE algorithm also possesses an eigensorting property, it fails to sort signals with the same correlation strength. In contrast, the phase-SCORE algorithm can eigensort signals with differing autocorrelation phase, even if they have the same strength. And, if the receiver front-end is spatially diverse, it can provide the same ability to null wideband CCI as the spatial antijam methods in the prior art.

Note that the GNSS signal capture solutions also automatically reject narrowband CCI (NBCCI), if that NBCCI occupies a small number of output channels. However, in the limiting case where the NBCCI is a CW tone, the phase-SCORE algorithm will also possess a single tone capture solution that extracts that tone from the received data. In that case, additional screening algorithms must used to identify and remove those tones ahead of any subsequent demodulation operations. Also, even in that case, the system should possess sufficient degrees of freedom to remove literally dozens of those tones from the GNSS signal capture solutions.

With the geo-observables (Frequency, Timing, and Direction of Arrival) distinguished for a received signal, any set of those values can be compared against a set for such which are known to be correct, i.e. associated with an authorized transmitter—just as a phone number, or Caller ID text link, can be compared against a listing of authorized callers—all without reference to the content of the incoming signal, or message. Signals with the wrong metadata can then be dropped from any further processing, improving the efficiency of the receiver. Only those with correct metadata or not-proven-wrong-yet metadata, need to be further processed to examine the content and structure of the message. This is akin to hearing a shout across a field from a direction (or time) where (or when) no friendly speaker can be calling; or receiving a phone call, text, or email purporting to be from the IRS but originating in Ghana. You don't need to understand any such message to know it's a fake.

Phase-SCORE Detection Operations

The phase-SCORE detection operations comprise the following steps:

A whitened correlation matrix computation operation to compute $M_{DoF} \times M_{DoF}$ matrix $\hat{R}_{q_{DoF} q_{DoF}}(1)$ using Eqn (63).

An eigenvalue computation operation to compute eigenvalues $\{\lambda_{PSC}(m)\}_{m=1}^{M_{DoF}}$ solving Eqn (62), using mature methods such as the QR algorithm.

A preliminary mode selection operation to identify $M_{PSC}$ candidate signal-capture solutions based on $\{|\lambda_{PSC}(m)|\}_{m=1}^{M_{DoF}}$.

An eigenvector computation operation to compute eigenvectors $\{u_{PSC}(m)\}_{m=1}^{M_{PSC}}$ for the $M_{PSC}$ preliminary candidate signal-capture solutions, using mature methods such as Schur decomposition and back-substitution algorithms.

A FOA vector optimization procedure, to estimate FOA vectors $\{\hat{\alpha}_{PSC}(m)\}_{m=1}^{M_{PSC}}$ for each candidate signal-capture solution, using generalized frequency doubler spectra generated from $\{z_{PSC}(n_{sym};m)\}_{m=1}^{M_{PSC}}$, where $z_{PSC}(n_{sym};m) = u_{PSC}^H(m) q_{PSC}(n_{sym})$.

A mode screening procedure, to select $\hat{M}_{PSC}$ finalized GNSS signal-capture modes based on the optimized generalized frequency doubler spectra. In some embodiments additional statistics are computed and used to remove modes associated with non-GNSS signals, e.g., tonal interferers.

A mode association procedure, to associate final GNSS signal-capture modes with specific GNSS signals based on commonality of FOA vectors, estimate the number of GNSS signals $\hat{L}_T$ detected by the algorithm, and to estimate symbol-normalized FOA vectors $$\{\hat{\alpha}_{TR}(\ell)\}_{\ell=1}^{\hat{L}_T}$$

comprising the fine fractional FOA and symbol-normalized DFOA for each detected GNSS signal.

In some embodiments, additional processing is performed to further optimize GNSS signal capture weights for each detected GNSS signal.

Exemplary mode selection, FOA optimization, mode screening, and mode association operations are described below.

Preliminary Mode Selection Operations

Exemplary methods for selecting $M_{PSC}$ preliminary signal-capture modes include the following:

Mode cutoff sorting procedures, in $M_{PSC}$-strongest eigenvalues computed using Eqn (62)-Eqn (63), where $M_{PSC}$ is a preset cutoff parameter, and $\{\lambda_{PSC}(m), u_{PSC}(m)\}_{m=1}^{M_{PSC}}$ are selected as candidate modes and sent on to confirmation stages.

Model-fitting procedures, in which $M_{PSC}$ is adaptively computed by fitting $\{|\lambda_{PSC}(m)|\}_{m=1}^{M_{DoF}}$ against a signal-present and signal-absent profile. A reliable model-fitting approach based on the minimum description length (MDL) principle has been developed and tested using the phase-SCORE eigenvalue strength model $$|\lambda_{PSC}(m)| \sim \begin{cases} s(m) + b^T(m) c_{fit} & m = 1, \ldots, M_{PSC} \\ b^T(m) c_{fit}, & m = M_{PSC} + 1, \ldots, M_{DoF} \end{cases} \quad \text{Eqn (64)}$$

where $\{b(m)\}_{m=1}^{M_{DoF}}$ is an order-$Q_{fit}$ deterministic basis function, e.g., the polynomial basis $b(m) = [(m-1)^q]_{q=0}^{Q_{fit}}$, and $(\bullet)^T$ denotes the matrix transpose operation. In one embodiment, the MDL procedure is implemented in the following manner:

Precompute $(M_{DoF} - Q_{fit} - 1) \times M_{DoF}$ matrix $B_\perp = \text{null}(B)$, where $B = [b(1) \ldots b(M_{DoF})]^T$ is the $(Q_{fit}+1) \times M_{DoF}$ basis matrix and $\text{null}(\bullet)$ is the matrix null operation, and pseudoinverse null-matrix set $$\{B_\perp^\dagger(M_{PSC})\}_{M_{PSC}=1}^{M_{PSC}^{max}},$$

where $B_\perp^\dagger(M_{PSC}) \triangleq (B_\perp^T(:,1:M_{PSC}) B_\perp(:,1:M_{PSC}))^{-1} B_\perp^T(:,1:M_{PSC})$ is the $M_{PSC} \times (M_{DoF} - Q_{fit} - 1)$ pseudoinverse of the first $M_{PSC}$ columns of $B_\perp$.

Initialize:

$$\varepsilon_\perp = B_\perp \begin{pmatrix} |\lambda_{PSC}(1)| \\ \vdots \\ |\lambda_{PSC}(M_{DoF})| \end{pmatrix}, \quad \begin{matrix} (M_{DoF} - Q_{fit} - 1) \times 1 \\ \text{signal-absent regression statistic} \end{matrix}$$

-continued $$F_{LS}(0) = \|\varepsilon_\perp\|_2^2, \quad \text{signal-absent least-squares regression error}$$

$$S_{MDL}(0) = \frac{Q_{fit}}{M_{DoF}}\ln(M_{DoF}) - \ln(F_{LS}(0)), \quad \text{signal-absent } MDL \text{ metric}$$

Iterate until maximized:

$$F_{LS}(M'_{PSC}) = F_{LS}(0) - \|B_\perp^\dagger(M'_{PSC})\varepsilon_\perp\|_2^2, \quad M'_{PSC}\text{-mode least-squares regression error}$$

$$S_{MDL}(M'_{PSC}) = \frac{M'_{PSC} + Q_{fit}}{M_{DoF}}\ln(M_{DoF}) - \ln(F_{LS}(M'_{PSC})), \quad M'_{PSC}\text{-}MDL \text{ metric}$$

The MDL mode loading estimate is then $$M_{PSC} = \arg\max_{M'_{PSC}\in\{0,M^{max}_{PSC}\}} S_{MDL}(M'_{PSC}),$$

with $M_{PSC}=0$ denoting signal absence.

The mode cutoff procedure works particularly well in environments where the number of potential candidate modes is small and/or predictable, especially if reliable confirmation methods can be used to prune modes developed under the procedure.

FOA Vector Optimization Operations

Once $M_{PSC}$ preliminary candidate phase-SCORE signal capture modes have been identified, and the $M_{PSC}$ whitened eigenvectors $\{u_{PSC}(m)\}_{m=1}^{M_{PSC}}$ associated with those modes have been computed, the FOA vectors of the signal captured by each candidate mode are determined by maximizing the magnitude of the generalized frequency-doubler spectrum, given by $$\hat{R}_{yy^*}(\alpha) \triangleq \sum_{n_{sym}=0}^{N_{sym}-1}\omega_{DoF}(n_{sym})y^2(n_{sym})\exp(-j4\pi g_{FOA}^T(n_{sym})\alpha) \quad \text{Eqn (65)}$$

$$= \sum_{n_{sym}=0}^{N_{sym}-1}z^2(n_{sym})\exp(-j4\pi g_{FOA}^T(n_{sym})\alpha),$$

for general despreader output signal $y(n_{sym}) \triangleq w^H x_{DoF}(n_{sym})$ and associated whitened despreader output signal $z(n_{sym})=u^H q_{DoF}(n_{sym})$, where $u=R_{DoF}w$, and where $g_{FOA}(n_{sym})=[g_{FOA}^{(q_{FOA})}(n_{sym})]_{q_{FOA}}^{Q_{FOA}}$ is a $Q_{FOA}\times 1$ deterministic FOA basis function, and $\alpha=[\alpha(q_{FOA})]_{q_{FOA}}^{Q_{FOA}}$ is a $Q_{FOA}\times 1$ unknown real coefficient vector, referred to here as the FOA vector. If $$g_{FOA}^{(q_{FOA})}(n_{sym}) = \frac{1}{q_{FOA}!}n_{sym}^{q_{FOA}},$$

referred to here as the polynomial basis, then $\alpha(1)=\tilde{\alpha}_{TR}$ (and is the fine fractional FOA), and $\alpha(2)=\tilde{\alpha}_{TR}^{(1)}$ (and is the symbol-normalized first-order DFOA); however, Eqn (65) can be used to estimate the signal FOA and DFOA's of arbitrarily high-order. Eqn (65) can also be defined using other FOA bases, if warranted based on characteristics of the transmission channel. If $Q_{FOA}=1$ and $g_{FOA}^{(1)}(n_{sym})=n_{sym}$, then Eqn (65) reduces to the conventional frequency-doubler spectrum described in the prior art, and referred to as the zero-lag conjugate-cyclic autocorrelation function $\hat{R}_{yy^*}^{2\alpha}$ described in the prior art as a well-known means for detection and "open-loop" carrier recovery of BPSK and BPSK-DSSS signals.

The generalized frequency-doubler spectrum can be derived as a maximum-likelihood estimator, by modeling $y(n_{sym})$ as $$y(n_{sym})=\varepsilon(n_{sym})+d(n_{sym})e^{j\varphi(n_{sym})} \quad \text{Eq. 66}$$

where $\varepsilon(n_{sym})$ is an independent, identically-distributed (i.i.d.) circularly-symmetric complex-Gaussian (CSCG) noise sequence with mean zero and unknown nonnegative variance $\sigma^2$, $d(n_{sym})$ is an unknown real signal sequence, and $\varphi(n_{sym})=\varphi+2\pi g_{FOA}^T(n_{sym})\alpha$ is a time-varying phase sequence, and where $\varphi$ is an unknown real signal phase. The joint ML estimate of $\alpha$, $\varphi$, $\sigma^2$, and $d(n_{sym})$ under these assumptions is then given by $$\hat{\alpha}_{ML} = \arg\max_{\alpha\in R^{Q_{FOA}}}|\hat{R}_{yy^*}(\alpha)|, \quad \text{Eqn (67)}$$

$$\hat{\varphi}_{ML} = \pi\delta + \frac{1}{2}\arg\hat{R}_{yy^*}(\hat{\alpha}_{ML}), \delta=0,1, \quad \text{Eqn (68)}$$

$$\hat{\sigma}_{ML}^2 = \frac{1}{2}(\hat{R}_{yy} - |\hat{R}_{yy^*}(\hat{\alpha}_{ML})|), \quad \text{Eqn (69)}$$

$$\hat{d}_{ML}(n_{sym}) = \text{Re}\{y(n_{sym})\exp(-j(\hat{\varphi}_{ML}+2\pi g_{FOA}^T(n_{sym})\hat{\alpha}_{ML}))\}. \quad \text{Eqn (70)}$$

Note that $\hat{\varphi}_{ML}$ possesses an ambiguity of 0 or $\pi$, resulting in a sign ambiguity of $\pm 1$ in $\hat{d}_{ML}(n_{sym})$. Similarly, the polynomial basis induces an ambiguity of 0 or $\pm\frac{1}{2}$ in $\hat{\alpha}_{ML}(1)$, since $\hat{R}_{yy^*}(\alpha')=\hat{R}_{yy^*}(\alpha)$ if $g_{FOA}^{(1)}(n_{sym})=n_{sym}$ and $$\alpha'(1) = \alpha(1) + \frac{1}{2},$$

resulting in a further frequency modulation ambiguity of 1 or $(-1)^{n_{sym}}$ in $\hat{d}_{ML}(n_{sym})$. The frequency modulation ambiguity can be resolved for each mode from the phase of the phase-SCORE eigenvalue $\hat{\alpha}_{PSC}(m)$, which is roughly proportional to the true FOA. Additional information is needed to resolve the sign ambiguity, e.g., by identifying the TLM preamble in the GPS navigation message stream.

In one embodiment, the maximal value of Eqn (65) is robustly found for the polynomial basis and $Q_{FOA}=2$ using the following procedure:

Compute the generalized discrete frequency doubler spectrum given by $$S(k,\ell) = \left|FFT_{K_{FFT}}\left(z^2(n_{sym})\exp\left(-j2\pi\Delta_{DFOA}\frac{\ell}{L}n_{sym}^2\right)\right)\right|^2, \quad \text{Eqn (71)}$$

for $\ell=-L-1, \ldots, L+1$ and $k=0, \ldots, K_{FFT}-1$ where $FFT_{K_{FFT}}(\bullet)$ is the fast-Fourier transform (FFT) operation with $K_{FFT}\geq N_{sym}$ output bins (for example, a power-of-two greater than $2N_{sym}$), $z(n_{sym})$ is given by Eqn (65), and $\Delta_{FOA}$ covers the range of expected symbol-synchronized DFOA's, e.g., $3.07\times 10^{-6}$ for the reception scenario shown in FIG. 9, and where $k=0, \ldots \kappa_{FFT}-1$ is the output FFT bin index.

$$\text{Set}(k_{max}, \ell_{max}) = \arg \max_{\substack{k \in \{0, \ldots, K_{FFT}-1\} \\ \ell \in \{-L, \ldots, L\}}} S(k, \ell),$$

and refine each index to sub-bin accuracy using a quadratic-fit algorithm, e.g., $$k_{max} \leftarrow$$

$$k_{max} + \frac{1}{2} \frac{S((k_{max}-1) \bmod K_{FFT}, \ell_{max}) - S((k_{max}+1) \bmod K_{FFT}, \ell_{max})}{S((k_{max}-1) \bmod K_{FFT}, \ell_{max}) - 2S(k_{max}, \ell_{max}) + S((k_{max}+1) \bmod K_{FFT}, \ell_{max})}$$

$$\ell_{max} \leftarrow \ell_{max} + \frac{1}{2} \frac{S(k_{max}, \ell_{max}-1) - S(k_{max}, \ell_{max}+1)}{S(k_{max}, \ell_{max}-1) - 2S(k_{max}, \ell_{max}) + S(k_{max}, \ell_{max}+1)}.$$

$$\text{Set } \hat{\alpha}_{max}(1) = \frac{1}{2} \text{wrap}\left(\frac{k_{max}}{K_{FFT}}\right),$$

where $\text{wrap}(f) \triangleq f - \text{round}(f)$ maps frequency f to $$\left[-\frac{1}{2}, \frac{1}{2}\right),$$

$$\hat{\alpha}_{max}(2) = \Delta_{FDOA} \frac{\ell_{max}}{L},$$

and $\hat{\alpha}_{max}(q_{FOA}) \equiv 0$ for $q_{FOA} > 2$ if higher-order DFOA's are desired/needed to fully track the time-varying signal FOA.

Optimize $\hat{\alpha}$ using a Newton recursion, given by $$s(n_{sym}) = z^2(n_{sym}) \exp(-j4\pi g_{FOA}^T(n_{sym}) \hat{\alpha}_{max}), \quad \text{Eqn (72)}$$

$$r_0 = \sum_{n_{sym}=0}^{N_{sym}-1} s(n_{sym}), \quad \text{Eqn (73)}$$

$$r_1 = \sum_{n_{sym}=0}^{N_{sym}-1} s(n_{sym}) g_{FOA}(n_{sym}), \quad \text{Eqn (74)}$$

$$R_2 = \sum_{n_{sym}=0}^{N_{sym}-1} s(n_{sym}) g_{FOA}(n_{sym}) g_{FOA}^T(n_{sym}), \quad \text{Eqn (75)}$$

$$G = 8\pi \text{Im}(r_0^* r_1), \quad \text{Eqn (76)}$$
$$G = 0 \text{ at maximum},$$

$$H = -32\pi^2 \text{Re}(r_0^* R_2 - r_1 r_1^H), \quad \text{Eqn (77)}$$
$$H < 0 \text{ at maximum},$$

$$\hat{\alpha}_{max} \leftarrow \hat{\alpha}_{max} - H^{-1} G, \quad \text{Eqn (78)}$$

for general basis function $g_{FOA}(n_{sym})$. Recursion Eqn (72)-Eqn (78) maximizes $|\hat{R}_{yy^*}(\alpha)|^2 = |r_0|^2$ with gradient $\nabla_\alpha |\hat{R}_{yy^*}(\alpha)|^2 = G$ that converges quadratically to zero over multiple iterations, if $\hat{\alpha}$ is initialized sufficiently closely to the global maximum of $|\hat{R}_{yy^*}(\alpha)|^2$. The Hessian $\nabla_\alpha \nabla_\alpha^T |\hat{R}_{yy^*}(\alpha)|^2 = H$ can also be adjusted to prevent $\hat{\alpha}$ from converging to non-maximum point of $|\hat{R}_{yy^*}(\alpha)|^2$.

Once maximal value $\hat{\alpha}_{max}(m) = [\hat{\alpha}_{max}(q_{foa}; m)]_{q_{FOA}=1}^{Q_{FOA}}$ is computed for whitened phase-SCORE despreader output signal $z_{PSC}(n_{sym}; m)$, and assuming a polynomial basis, the FOA estimate is set to $$\hat{\alpha}_{max}(1; m) \leftarrow \text{wrap}\left(\hat{\alpha}_{max}(1; m) + \frac{1}{2} \text{round}(2\hat{\alpha}_{PSC}(m))\right), \quad \text{Eqn (79)}$$

where the initial value of $\hat{\alpha}_{PSC}(m)$ is set from the phase-SCORE algorithm. This resolves the frequency ambiguity in the frequency-doubler spectrum. However, it does not resolve the scalar ±1 sign ambiguity.

Mode Screening Operations

Once the generalized frequency-doubler spectra are computed, and the FOA vectors that maximize those spectra are computed, those spectra are used to confirm successful capture of GNSS signals by candidate modes, and to identify and remove modes that fail to capture such signals. In one embodiment, this is accomplished by computing deflection $$\hat{\gamma}_{max} = \ln(2) |\hat{R}_{yy^*}(\hat{\alpha}_{max})|^2 / \median_{\substack{k_{bin}=\{0,\ldots,K_{FFT}-1\} \\ \ell=\{-L-1,\ldots,L+1\}}} S(k, \ell), \quad \text{Eqn (80)}$$

where median(•) is the sample median operation, and then classifying modes as signal-capture or signal rejection modes based on a threshold test against Eqn (80).

Additional screening methods can also be developed to identify and remove tone-capture solutions from the loaded phase-SCORE modes. These methods can exploit both the structure of the despread signal, which will appear as a pure complex sinusoid at the despreader output, or the despreader solution itself. A simple exemplary test is the despreader output correlation lag function $$\hat{R}_{zz}(m_{lag}) = \sum_{n_{sym}=m_{lag}}^{N_{sym}-1} z(n_{sym}) z^*(n_{sym} - m_{lag}),$$

which has near-constant strength for all values of $m_{lag}$ if $z(n_{sym})$ is a (windowed) tonal signal.

Mode Association Operations

Once $\hat{M}_{PSC}$ finalized maximal FOA vectors $$\{\hat{\alpha}_{max}(m)\}_{m=1}^{\hat{M}_{PSC}}$$

and quality metrics, e.g., deflections $$\{\hat{\gamma}_{max}(m)\}_{m=1}^{\hat{M}_{PSC}},$$

are calculated for each confirmed phase-SCORE mode, these estimates are used to associate confirmed modes with candidate GNSS signals. In one exemplary approach, loaded phase-SCORE mode indices $\{1, \ldots, \hat{M}_{PSC}\}$ are organized into $\hat{L}_T$ complete nonoverlapping mode sets $$\{M_{PSC}(\ell)\}_{\ell=1}^{\hat{L}_T}$$

based on distance measurement strategy $$M_{PSC}(\ell) = \left\{ m \in \{1, \ldots, \hat{M}_{PSC}\}: \frac{|\hat{R}_{y_{PSC}y_{PSC}^*}(\hat{\alpha}_{max}(m'); m)|}{|\hat{R}_{y_{PSC}y_{PSC}^*}(\hat{\alpha}_{max}(m); m)|} > \rho_{max} \forall m, m' \in M_{PSC}(\ell) \right\}, \quad \text{Eqn (81)}$$

where $$\hat{R}_{y_{PSC}y_{PSC}^*}(\alpha; m)$$

is the generalized frequency-doubler spectrum for phase-SCORE mode m, such that $M_{PSC}(l) \cap M_{PSC}(l') = \{\,\}$ for $$\ell \neq \ell' \text{ and } \bigcup_{\ell=1}^{\hat{L}_T} M_{PSC}(\ell) = \{1, \ldots, \hat{M}_{PSC}\}.$$

A symbol-normalized FOA vector is then computed for each mode set by optimizing $$\hat{\alpha}_{TR}(\ell) = \underset{\alpha}{\operatorname{argmax}} \sum_{m \in M_{PSC}(\ell)} \hat{\gamma}_{max}(m) |R_{y_{PSC}y_{PSC}^*}(\alpha; m)|, \quad \text{Eqn (82)}$$

e.g., using a multimode extension of the Newton recursion given in Eqn (72)-Eqn (78). A simple weighted average is also given by $$\hat{\alpha}_{TR}(\ell) = \frac{\sum_{m \in M_{PSC}(\ell)} \hat{\gamma}(m) \hat{\alpha}_{max}(m)}{\sum_{m \in M_{PSC}(\ell)} \hat{\gamma}(m)}, \ell = 1, \ldots, \hat{L}_T. \quad \text{Eqn (83)}$$

Criterion Eqn (82) can be further adjusted to modify both $\hat{L}_T$ and $$\{M_{PSC}(\ell)\}_{\ell=1}^{\hat{L}_T},$$

e.g., to maximize MDL-like criterion $$S_{MDL}\left(\{M_{PSC}(\ell)\}_{\ell=1}^{\hat{L}_T}\right) = -\frac{\hat{L}_T}{2}\ln(\hat{M}_{PSC}) + \sum_{\ell=1}^{\hat{L}_T}\left(\sum_{m \in M_{PSC}(\ell)} \hat{\gamma}_{max}(m) |R_{y_{PSC}y_{PSC}^*}(\hat{\alpha}_{TR}(\ell); m)|\right), \quad \text{Eqn (84)}$$

which can be developed based on maximum-likelihood estimation principles. Criterion Eqn (84) can also be used to resolve any overlap between mode sets.

The outcome of the association algorithm is an estimate of the number of GNSS transmitter $\hat{L}_T$ present in the received data set, and an estimate of the symbol-normalized FOA vectors $$\{\hat{\alpha}_{TR}(\ell)\}_{\ell=1}^{\hat{L}_T}$$

for each of these transmitters. These fine FOA estimates are then forwarded to the generalized conjugate-SCORE refinement algorithm to optimize the despreading weights, described below.

Conjugate-SCORE Refinement Implementation

Generalized Conjugate-SCORE Eigenequation

The conjugate-SCORE algorithm further exploits the BPSK (more generally, real) GPS C/A symbol stream, by adapting linear combiner weights to optimize the frequency-doubler spectrum for each estimated symbol-normalized FOA vector $\hat{\alpha}_{TR}(l)$. The optimized weights are the solutions to the generalized conjugate-SCORE pseudo-eigenequation given by $$\lambda_{CSC}(m;\alpha)\hat{R}_{x_{DoF}x_{DoF}}w_{CSC}(m;\alpha) = \hat{R}_{x_{DoF}x^*_{DoF}}(\alpha)w^*_{CSC}(m;\alpha), \quad \text{Eqn (85)}$$

where $\lambda_{CSC}(m;\alpha) \geq \lambda_{CSC}(m+1;\alpha) \geq 0$ ($\lambda_{CSC}(m;\alpha) \searrow$), and $\hat{R}_{x_{DoF}x^*_{DoF}}(\alpha)$ is the zero-lag data generalized cyclic conjugate correlation matrix (CCCM) given by $$\hat{R}_{x_{DoF}x_{DoF}}(\alpha) \triangleq \sum_{n_{sym}=0}^{N_{sym}-1} \omega_{DoF}(n_{sym})x_{DoF}(n_{sym})x_{DoF}^T(n_{sym}) \quad \text{Eqn (86)}$$

$$\exp(-j4\pi g_{FOA}^T(n_{sym})\alpha)$$

$$= \sum_{n_{sym}=0}^{N_{sym}-1} \omega_{DoF}(n_{sym})x_{DoF}(n_{sym};\alpha)x_{DoF}^T(n_{sym};\alpha),$$

and where $g_{FOA}(n_{sym})$ is the $Q_{FOA} \times 1$ basis function used in the generalized frequency doubler, and $x_{DoF}(n_{sym};\alpha)$ is the FOA-compensated channelized received signal given by $$x_{DoF}(n_{sym};\alpha) \triangleq x_{DoF}(n_{sym})\exp(-j2\pi g_{FOA}^T(n_{sym})\alpha). \quad \text{Eqn (87)}$$

If $$Q_{FOA} = 1 \text{ and } g_{FOA}^{(1)}(n_{sym}) = n_{sym}, \text{ then } \hat{R}_{x_{DoF}x^*_{DoF}}(\alpha)$$

reduces to the conventional CCCM with cycle frequency $2\alpha(1)$, and <Eq. 86> reduces to the conventional conjugate-SCORE algorithm described in the prior art.

Using the data QRD given in Eqn (57)-Eqn (58), the generalized conjugate-SCORE eigenequation is compactly expressed as $$\lambda_{CSC}(m;\alpha)v_{CSC}(m;\alpha) = \hat{R}_{q_{DoF}q^*_{DoF}}(\alpha)v^*_{CSC}(m;\alpha), \quad \text{Eqn (88)}$$

$$\lambda_{CSC}(m;\alpha) \searrow,$$

$$\hat{R}_{q_{DoF}q^*_{DoF}}(\alpha) = \sum_{n_{sym}=0}^{N_{sym}-1} q_{DoF}(n_{sym})q^T_{DoF}(n_{sym}) \quad \text{Eqn (89)}$$

$$\exp(-j4\pi g^T_{FOA}(n_{sym})\alpha)$$

$$= \sum_{n_{sym}=0}^{N_{sym}-1} q_{DoF}(n_{sym};\alpha)q^T_{DoF}(n_{sym};\alpha),$$

$$= Q^H_{DoF}(\alpha)Q^*_{DoF}(\alpha),$$

where $v_{CSC}(m;\alpha)=R_{DoF}w_{CSC}(m;\alpha)$, and $q_{DoF}(n_{sym};\alpha)=q_{DoF}(n_{sym})\exp(-j2\pi g_{FOA}^T(n_{sym})\alpha)$ is the FOA-compensated whitened channelized data vector, such that $$Q_{DoF}(\alpha)=\Delta(\alpha)Q_{DoF}, \quad \text{Eqn (90)}$$

$$\Delta(\alpha) \triangleq \text{diag}\{\exp(j2\pi g_{FOA}^T(n_{sym})\alpha)\}_{n_{sym}=0}^{N_{sym}-1}. \quad \text{Eqn (91)}$$

The whitened pseudo-eigenvectors are additionally set to unity, i.e., $\|v_{CSC}(m;\alpha)\|_2=1$ to maintain unity output-power on FOA-compensated despreader output signal $v_{CSC}^H(m;\alpha)q_{DoF}(n_{sym};\alpha)$. Noting that $$\hat{R}_{q_{DoF}q^*_{DoF}}(\alpha) = \hat{R}^T_{q_{DoF}q^*_{DoF}}(\alpha), \text{ then } \hat{R}_{q_{DoF}q^*_{DoF}}(\alpha)$$

has a singular-value decomposition (SVD)

$$\hat{R}_{q_{DoF}q^*_{DoF}}(\alpha) = V_{CSC}(\alpha)\Lambda_{CSC}(\alpha)V^T_{CSC}(\alpha), \quad \text{Eqn (92)}$$

where $\Lambda_{CSC}(\alpha)=\text{diag}\{\lambda_{CSC}(m;\alpha)\}_{m=1}^{M_{DoF}}$ and $V_{CSC}(\alpha)=[v_{CSC}(m;\alpha)]_{m=1}^{M_{DoF}}$ are the matrices of singular values and left-singular vectors of $$\hat{R}_{q_{DoF}q^*_{DoF}}(\alpha),$$

respectively, and where $\{\lambda_{CSC}(m;\alpha), v_{CSC}(m;\alpha)\}_{m=1}^{M_{DoF}}$ are also the solutions to Eqn (88). Defining $$\tilde{Q}_{DoF}(\alpha) = \frac{1}{\sqrt{2}}[Q_{DoF}(\alpha) \ Q^*_{DoF}(\alpha)] \quad \text{Eqn (93)}$$

such that $$\tilde{Q}_{DoF}(\alpha)\tilde{u} = \text{Re}(Q_{DoF}(\alpha)u), \quad \text{Eqn (94)}$$

$$\tilde{u} \triangleq \frac{1}{\sqrt{2}}\begin{pmatrix}u\\u^*\end{pmatrix},$$

the SVD of $\tilde{Q}_{DoF}(\alpha)$ is further given by $$\tilde{Q}_{DoF}(\alpha) = \tilde{D}_{CSC}(\alpha)\text{diag}\{\sqrt{\eta_{CSC}(q;\alpha)}\}_{q=1}^{2M_{DoF}}\tilde{V}^H_{CSC}(\alpha), \quad \text{Eqn (95)}$$

$$\tilde{D}_{CSC}(\alpha) = [D^{(+)}_{CSC}(\alpha) \ D^{(-)}_{CSC}(\alpha)] \quad \text{Eqn (96)}$$

$$D^{(+)}_{CSC}(\alpha) = \text{Re}\{Q_{DoF}(\alpha)U^{(+)}_{CSC}(1:M_{DoF};\alpha)\}, \quad \text{Eqn (97)}$$

$$D^{(-)}_{CSC}(\alpha) = \text{Im}\{Q_{DoF}(\alpha)U^{(-)}_{CSC}(M_{DoF}:-1:1;\alpha)\}, \quad \text{Eqn (98)}$$

$$U^{(\pm)}_{CSC}(\alpha) = \sqrt{2} \ V_{CSC}(\alpha)(I_{M_{DoF}} \pm \Lambda_{CSC}(\alpha))^{-1/2}, \quad \text{Eqn (99)}$$

$$\eta_{CSC}(q;\alpha) = \quad \text{Eqn (100)}$$

$$\begin{cases}\frac{1+\lambda_{CSC}(q;\alpha)}{2}, & q=1,\ldots,M_{DoF}\\ \frac{1-\lambda_{CSC}(2M_{DoF}-q+1;\alpha)}{2}, & q=M_{DoF}+1,\ldots,2M_{DoF}\end{cases}$$

$$\tilde{V}_{CSC}(\alpha) = \frac{1}{\sqrt{2}}\begin{pmatrix}V_{CSC}(1:M_{DoF};\alpha) & -N_{CSC}(M_{DoF}:-1:1;\alpha)\\ V^*_{CSC}(1:M_{DoF};\alpha) & N^*_{CSC}(M_{DoF}:-1:1;\alpha)\end{pmatrix}, \quad \text{Eqn (101)}$$

which is used in certain processing steps to improve the computational processing effectiveness.

In presence of TOA blur, using the link and channel model given in Eqn (45), the conjugate-SCORE algorithm provides $Q'_{sym}(1)$ signal-capture solutions for each GNSS signal. The signal-capture solutions are a linear combination of the weights that extract $d'_T(n_{sym}-n_{TR}(1);1)=d_T(n_{sym}-n_{TR}(1);1) \otimes g_{blur}(n_{sym};1)$ from the received data, and optimally excise the CCI and other GNSS signals received with different FOA's.

Generalized Conjugate-SCORE Refinement Operations

In one embodiment, the generalized conjugate-SCORE refinement operations are performed independently for each trial link l FOA vector $\hat{\alpha}_{TR}(l)$. These operations comprise the following:

A whitened channelized-data FOA compensation operation, to form $Q_{DoF}(\hat{\alpha}_{TR}(l))=\Delta(\hat{\alpha}_{TR}(l))Q_{DoF}(\hat{\alpha}_{TR}(l))$ using Eqn (90).

A whitened conjugate-correlation matrix computation, to form $$\hat{R}_{q_{DoF}q^*_{DoF}}(\hat{\alpha}_{TR}(l)) = Q^H_{DoF}(\hat{\alpha}_{TR}(l))Q^*_{DoF}(\hat{\alpha}_{TR}(l)).$$

A partial SVD operation, to form dominant SVD modes $$\{\lambda_{CSC}(q;\hat{\alpha}_{TR}(l)), v_{CSC}(q;\hat{\alpha}_{TR}(l))\}_{q=1}^{Q_{CSC}(\hat{\alpha}_{TR}(l))},$$

where $Q_{CSC}(\hat{\alpha}_{TR}(l))$ is a predetermined or adapted loading factor for trial link l, and where $\lambda_{CSC}(q;\hat{\alpha}_{TR}(l)) \geq \lambda_{CSC}(q+1;\hat{\alpha}_{TR}(l))$.

A generalized conjugate-SCORE FOA-compensated despreading operation, to form FOA-compensated despreader output signal $\hat{D}_{CSC}(\hat{\alpha}_{CSC}(\hat{\alpha}_{TR}(l)))$ from the $Q_{CSC}(\hat{\alpha}_{TR}(l))$ dominant modes provided by the partial SVD operation.

In some embodiments, a generalized conjugate-SCORE refinement operation, to further refine $\hat{\alpha}_{TR}(l)$ and $\hat{D}_{CSC}(\hat{\alpha}_{TR}(l))$.

In some embodiments, a symbol extraction operation, to extract the 1 ksps symbol sequence $d_T(n_{sym}-n_{TR}(\ell))$ from $\hat{D}_{CSC}(\hat{\alpha}_{TR}(\ell))$.

Pertinent elements of the operations summarized above are described below.

Partial SVD Computation Operations

Assuming $Q_{CSC} \ll M_{DoF}$ significant modes, such that $\lambda_{CSC}(m;\alpha) \ll 1$ for $m > Q_{CSC}$, then the first $Q_{CSC}$ singular values and left-singular vectors of $$\hat{R}_{q_{DoF}q^*_{DoF}}(\alpha)$$

are efficiently calculated using the complex-symmetric QR method given by $$\{\hat{V}_{CSC}(\alpha), \hat{\Lambda}_{CSC}(\alpha)\} \leftarrow QRD\{\hat{R}_{q_{DoF}q^*_{DoF}}(\alpha)\hat{V}^*_{CSC}(\alpha)\}, \quad \text{Eqn (102)}$$

where $\hat{V}_{CSC}(\alpha)$ is an $M_{DoF} \times Q_{CSC}$ initial left-singular matrix estimate. Over multiple iterations of Eqn (102), $\hat{V}_{CSC}(\alpha)$ and $\hat{\Lambda}_{CSC}(\alpha)$ converge to $[v_{CSC}(q;\alpha)]_{q=1}^{Q_{CSC}}$ and $\text{diag}[\lambda_{CSC}(q,\alpha)]_{q=1}^{Q_{CSC}}$, respectively, from almost any initial estimate for $\hat{V}_{CSC}(\alpha)$, e.g., $\hat{V}_{CSC}(\alpha)|_{init} = R_{DoF}(:, M_{DoF}:-1:M_{DoF}-Q_{CSC}+1)$, with exponential convergence rate governed by mode spread $[\lambda_{CSC}(q+1,\alpha)/\lambda_{CSC}(q,\alpha)]_{q=1}^{Q_{CSC}}$. Acceleration methods, e.g., using Householder transforms and deflation as known in the prior art, can also be adjusted to exploit complex symmetry of $$\hat{R}_{q_{DoF}q^*_{DoF}}(\alpha).$$

Generalized Conjugate-SCORE FOA-Compensated Despreading Operations

The FOA-compensated despreader output signal is given by $$\hat{D}_{CSC}(\alpha) = Re[Q_{DoF}(\alpha)\hat{U}_{CSC}(\alpha)], \quad \text{Eqn (103)}$$

$$\hat{U}_{CSC}(\alpha) = \sqrt{2}\hat{V}_{CSC}(\alpha)(I_{Q_{CSC}} + \hat{\Lambda}_{CSC}(\alpha))^{-1/2}, \quad \text{Eqn (104)}$$

which satisfies orthonormality condition $\hat{D}_{CSC}^T(\alpha)\hat{D}_{CSC}(\alpha) = I_{Q_{CSC}}$ given SVD (and QRD) orthonormality condition $V_{CSC}^H(\alpha)V_{CSC}(\alpha) = I_{M_{DoF}}$. $Q_{CSC}$ can be predetermined, e.g., based on the expected TOA blur of the received data, or adaptively selected based on the singular values $\{\lambda_{CSC}(m;\alpha)\}_{m=1}^{M_{DoF}}$ and other statistics, in which case it provides an estimate of the channel loading at trial FOA vector $\alpha$.

Generalized Conjugate-SCORE Refinement Operations

In some embodiments, the FOA vector $\hat{\alpha}_{TR}(\ell)$ and despreader output signal $\hat{D}_{CSC}(\hat{\alpha}_{TR}(\ell))$ are further refined to optimize ML-like objective function $$S_{CSC}(D,\alpha|Q_{CSC}) = \ln|D^T D| - \ln|I_{Q_{CSC}} - D^T Q_{DoF}(\alpha)Q_{DoF}^H(\alpha)D|, \quad \text{Eqn (105)}$$

by alternately adjusting $\hat{\alpha}_{TR}(\ell)$ to maximize $S_{CSC}(\hat{D}_{CSC}(\hat{\alpha}_{TR}(\ell)), \alpha|Q_{CSC})$ over $\alpha$, and adjusting $\hat{D}_{CSC}(\hat{\alpha}_{TR}(\ell))$ to maximize $S_{CSC}(D,\hat{\alpha}_{TR}(\ell)|Q_{CSC})$ over $D$. In one embodiment, optimization of $\hat{\alpha}_{TR}(\ell)$ is performed using multi-port Newton recursion $$U = Q_{DoF}^H(\hat{\alpha}_{TR}(\ell))\hat{D}_{CSC}(\hat{\alpha}_{TR}(\ell)) \quad \text{Eqn (106)}$$

$$C = chol(I_{Q_{CSC}} - U^H U)^{-1} \quad \text{Eqn (107)}$$

$$U \leftarrow UC \quad \text{Eqn (108)}$$

$$V_q = \left(Q_{DoF}^H(\hat{\alpha}_{TR}(\ell))\text{diag}\{g_{FOA}^{(q)}(n_{sym})\}_{n_{sym}=0}^{N_{sym}-1}\hat{D}_{CSC}(\hat{\alpha}_{TR}(\ell))\right)C \quad \text{Eqn (109)}$$

$$T_{p,q} = \left(Q_{DoF}^H(\hat{\alpha}_{TR}(\ell))\text{diag}\{g_{FOA}^{(p)}(n_{sym})g_{FOA}^{(q)}(n_{sym})\}\hat{D}_{CSC}(\hat{\alpha}_{TR}(\ell))\right)C \quad \text{Eqn (110)}$$

$$(G)_q = \text{Im}\{Tr(U^H V_q)\} \quad \text{Eqn (111)}$$

$$(H)_{p,q} = Tr(V_p^H V_q) + Tr((U^H V_p)^H(U^H V_q)) - \text{Re}\{Tr(U^H T_{p,q}) + Tr((U^H V_p)(U^H V_q))\} \quad \text{Eqn (112)}$$

$$\hat{\alpha}_{TR}(\ell) \leftarrow \hat{\alpha}_{TR}(\ell) - H^{-1}G \quad \text{Eqn (113)}$$

$$Q_{DoF}(\hat{\alpha}_{TR}(\ell)) \leftarrow \Delta(\hat{\alpha}_{TR}(\ell))Q_{DoF}, \quad \text{Eqn (114)}$$

where $p,q = 1, \ldots, Q_{FOA}$ in Eqn (109)-Eqn (112). The ML objective function, gradient, and curvature (Hessian) of $S_{CSC}(\hat{D}_{CSC}(\hat{\alpha}_{TR}(\ell)), \alpha|Q_{CSC})$ immediately prior to step Eqn (113) is then given by $$S_{CSC}(\hat{D}_{CSC}(\hat{\alpha}_{TR}(\ell)), \hat{\alpha}_{TR}(\ell)|Q_{CSC}) = 2\sum_{q=1}^{\hat{Q}_{sym}(\ell)-1} \ln(C)_{q,q},$$

$$G_{ML}(\hat{\alpha}_{TR}(\ell)) = 4\pi N_{sym} G$$

and $H_{ML}(\hat{\alpha}_{TR}(\ell)) = 8\pi^2 N_{sym} H$, respectively. In this case, Eqn (106)-Eqn (114) exhibits quadratic convergence to a stationary point of $S_{CSC}(\hat{D}_{CSC}(\hat{\alpha}_{TR}(\ell)), \alpha|Q_{CSC})$. More robust methods such as coarse-search or quadratic fit can be used to adjust $\hat{\alpha}_{TR}(\ell)$ if Eqn (106)-Eqn (114) fails to converge to a maximal value, or converges to a false maximum of $S_{CSC}(\hat{D}_{CSC}(\hat{\alpha}_{TR}(\ell)), \alpha|Q_{CSC})$ is found.

The conjugate-SCORE despreader output data is then updated by setting $\hat{D}_{CSC}(\hat{\alpha}_{TR}(\ell))$ given $\hat{\alpha}_{TR}(\ell)$ using $$\hat{R}_{q_{DoF}q^*_{DoF}}(\hat{\alpha}_{TR}(\ell)) \leftarrow Q_{DoF}^H(\hat{\alpha}_{TR}(\ell))Q_{DoF}^*(\hat{\alpha}_{TR}(\ell)), \quad \text{Eqn (115)}$$

$$\{\hat{V}_{CSC}(\hat{\alpha}_{TR}(\ell)), \hat{\Lambda}_{CSC}(\hat{\alpha}_{TR}(\ell))\} \leftarrow QRD\{\hat{R}_{q_{DoF}q^*_{DoF}}(\hat{\alpha}_{TR}(\ell))\hat{V}^*_{CSC}(\hat{\alpha}_{TR}(\ell))\}, \quad \text{Eqn (116)}$$

$$\hat{U}_{CSC}(\hat{\alpha}_{TR}(\ell)) \leftarrow \sqrt{2}\hat{V}_{CSC}(\hat{\alpha}_{TR}(\ell))(I_{Q_{CSC}} + \hat{\Lambda}_{CSC}(\hat{\alpha}_{TR}(\ell)))^{-1/2}, \quad \text{Eqn (117)}$$

$$\hat{D}_{CSC}(\hat{\alpha}_{TR}(\ell)) \leftarrow \text{Re}\{Q_{DoF}(\hat{\alpha}_{TR}(\ell))\hat{U}_{CSC}(\hat{\alpha}_{TR}(\ell))\}, \quad \text{Eqn (118)}$$

In one embodiment, Eqn (106)-Eqn (114) is repeated multiple times with $\hat{D}_{CSC}(\hat{\alpha}_{TR}(\ell))$ held constant, after which Eqn (115)-Eqn (118) is used to update $\hat{D}_{CSC}(\hat{\alpha}_{TR}(\ell))$.

In some embodiments, the channel loading factor $Q_{CSC}$ is also updated using MDL-like model order estimator $$\hat{Q}_{CSC} = \arg\max_{1 \leq Q_{CSC} \leq M_{DoF}} S_{MDL}(Q_{CSC}), \qquad \text{Eqn (119)}$$

$$S_{MDL}(Q_{CSC}) = N_{sym} S_{CSC}\big(\hat{D}_{CSC}(\hat{\alpha}_{TR}(\ell)), \hat{\alpha}_{TR}(\ell) \mid Q_{CSC}\big) - \qquad \text{Eqn (120)}$$
$$Q_{CSC}\left(M_{DoF} + \frac{Q_{FOA} + N_{sym}}{2}\right)\ln(2N_{sym}).$$

Symbol Extraction Algorithm

In some embodiments, additional processing is performed to extract the 1 kbps symbol stream $d_T(n_{sym} - n_{TR}(l); l)$ from the FOA-compensated despreader output data $\hat{D}_{CSC}(\hat{\alpha}_{TR}(l))$. While the generalized conjugate-SCORE algorithm can remove interference from the target signal, the rows of $\hat{D}_{CSC}(\hat{\alpha}_{TR}(l))$ provide a linear combination of the elements of the $Q_{sym}(l) \times 1$ delayed symbol vector $d_T(n_{sym} - n_{TR}(l); l)$, or linear combinations of the $Q'_{sym}(l) \times 1$ blurred and delayed symbol vector $d'_T(n_{sym} - n_{TR}(l); l) = d_T(n_{sym} - n_{TR}(l); l) \otimes g_{blur}(n_{sym}; l)$.

In one embodiment, a real least-squares constant-modulus algorithm (RLSCME) adjusts $Q_{CSC} \times 1$ real linear combiner weight vector u to minimize objective function $$F_{RCMA}(u;l) = \|\text{abs}(\hat{D}_{CSC}(\hat{\alpha}_{TR}(l))u) - 1_{N_{sym}}\|_2^2, \qquad \text{Eqn (121)}$$

where abs(•) is the element-wise real absolute-value operation and $1_N$ is the N×1 all-ones vector. The weight vector is initialized to $u = e_{Q_{CSC}}(q_{min}(l))$, where $e_M(q) = [\delta m - q]_{m=0}^{M-1}$ is the M×1 Euclidean basis vector and $\delta(m)$ is the Kronecker delta function, and where $q_{min}(l)$ is the column of $\hat{D}_{CSC}(\hat{\alpha}_{TR}(l))$ with minimum modulus variation, i.e., $$q_{min}(\ell) = \arg\min_{q \in \{0, \ldots, Q_{CSC}-1\}} F_{RCMA}(e(q); \ell). \qquad \text{Eqn (122)}$$

The RLSCMA implements recursion $$u \leftarrow (\hat{D}_{CSC}^T(\hat{\alpha}_{TR}(l))\hat{D}_{CSC}(\hat{\alpha}_{TR}(l)))^{-1}\hat{D}_{CSC}^T(\hat{\alpha}_{TR}(l))\text{sgn}$$
$$(\hat{D}_{CSC}(\hat{\alpha}_{TR}(l))u) = \hat{D}_{CSC}^T(\hat{\alpha}_{TR}(l))\text{sgn}(\hat{D}_{CSC}(\hat{\alpha}_{TR}(l))u), \qquad \text{Eqn (123)}$$

where sgn(•) is the element-wise real-sign operation. The RLSCMA output signal is then given by $N_{sym} \times 1$ vector $\hat{d}_{RLSCMA} = \hat{D}_{CSC}(\hat{\alpha}_{TR}(l))u$.

In an alternate embodiment, $M_{DoF} \times 1$ complex linear combiner weight vector w is initialized to $U_{CSC}(\alpha_{TR}(l))e_{Q_{CSC}}(q_{min}(l))$ and adjusted to minimize modulus variation $$F_{RCMA}(w; \ell) = \|\text{abs}(\text{Re}(\tilde{Q}_{DoF}(\hat{\alpha}_{TR}(\ell))w)) - 1_{N_{sym}}\|_2^2 \qquad \text{Eqn (124)}$$
$$= \|\text{abs}(\tilde{Q}_{DoF}(\hat{\alpha}_{TR}(\ell))\tilde{w}) - 1_{N_{sym}}\|_2^2,$$

$$\tilde{w} = \frac{1}{\sqrt{2}}\begin{pmatrix} w \\ w^* \end{pmatrix},$$

where $\tilde{Q}_{DoF}(\alpha)$ is given by Eqn (93). Using the SVD of $\tilde{Q}_{DoF}(\alpha)$ given Eqn (95)-Eqn (101), then Eqn (124) can be re-expressed without loss of generality as $$F_{RCMA}(j;l) = \|\text{abs}(\tilde{D}_{CSC}(\hat{\alpha}_{TR}(l))u) - 1_{N_{sym}}\|_2^2, \qquad \text{Eqn. (125)}$$

where u is a $2M_{DoF} \times 1$ real combiner weight vector, initialized to $e_{2M_{DoF}}(q_{min}(l))$ and optimized using real-LSCMA recursion $$u \leftarrow \tilde{D}_{CSC}^T(\hat{\alpha}_{TR}(l))\text{sgn}(\tilde{D}_{CSC}(\hat{\alpha}_{TR}(l))u). \qquad \text{Eqn (126)}$$

The RLSCMA output signal is then given by $N_{sym} \times 1$ vector $\hat{d}_{RLSCMA} = \hat{D}_{CSC}(\hat{\alpha}_{TR}(l))u$. Further noting that $\hat{D}_{CSC}(\alpha)$ is the first $Q_{sym}(l)$ columns of $\tilde{D}_{CSC}(\alpha)$, then Eqn (121) can be interpreted as Eqn (125) subject to the constraint $$(u)_{m > \hat{Q}_{sym}(\ell)} \equiv 0.$$

In presence of substantive channel blur, e.g., due to TOA or DOA drift over the reception interval, Eqn (121) and Eqn (125) can be extended to model effects of deterministic blur function a In one embodiment, an ML-like estimator is implemented to minimize cost function $g_{blur}(n_{sym}; l)$ on $\hat{D}_{CSC}(\hat{\alpha}_{TR}(l))$. In one embodiment, an ML-like estimator is implemented to minimize cost function $$F_{CSC}(D'_{CSC}(l)) = Tr[(D'_{CSC}(l) - \hat{D}'_{CSC}(\hat{\alpha}_{TR}(l)))^H (D'_{CSC}(l) - \hat{D}'_{CSC}(\hat{\alpha}_{TR}(l)))], \qquad \text{Eqn (127)}$$

where $$\hat{D}'_{CSC}(\hat{\alpha}_{TR}(\ell)) = \hat{D}_{CSC}(\hat{\alpha}_{TR}(\ell))\Gamma_{CSC}^{1/2}(\hat{\alpha}_{TR}(\ell)). \qquad \text{Eqn (128)}$$

$$\Gamma_{CSC}(\alpha) = \text{diag}\left\{\frac{1 + \lambda_{CSC}(q; \alpha)}{1 - \lambda_{CSC}(q; \alpha)}\right\}_{q=1}^{Q_{CSC}}. \qquad \text{Eqn (129)}$$

and where $\hat{D}_{CSC}(\hat{\alpha}_{TR}(l))$ is given by Eqn (103)-Eqn (104). $D'_{CSC}(l)$ is assumed to have structure $$D'_{CSC}(l) = \Delta'_{CSC}(l)G'_{blur}G'_{CSC}(l), \qquad \text{Eqn. (130)}$$

$$\Delta'_{CSC}(l) = [\text{diag}\{d_{CSC}(n_{sym}; l)\}_{n_{sym}=1}^{N_{sym}} \text{diag}\{d_{CSC}(n_{sym}-1; l)\}_{n_{sym}=1}^{N_{sym}}], \qquad \text{Eqn (131)}$$

$$G'_{blur} = I_2 \otimes G_{blur}, \qquad \text{Eqn (132)}$$

where $\{d_{CSC}(n_{sym}; l)\}_{n_{sym}=1}^{N_{sym}}$ is a real symbol sequence, $G_{blur}$ is a predetermined $N_{sym} \times (1+Q_{blur})$ real basis matrix, $G'_{CSC}(l)$ is an unknown complex $Q_{sym} \times Q_{sym}$ matrix, and $Q_{sym} \equiv 2(1+Q_{blur})$ for every link. Without loss of generality, the basis matrix is further assumed to be white, such that $G_{blur}^T G_{blur} = I_{1+Q_{blur}}$ and $G'_{blur}^T G'_{blur} = I_{Q_{sym}}$.

Criterion Eqn (127) leads to an optimization algorithm that alternately optimizes $G'_{CSC}(l)$ given $\{d_{CSC}(n_{sym}; l)\}_{n_{sym}=1}^{N_{sym}}$, yielding $$G'_{CSC}(l) = (G'_{blur}^T \Delta'_{CSC}^T(l)\Delta'_{CSC}(l)G'_{blur})^{-1}G'_{blur}^T \Delta'_{CSC}^T(l)\hat{D}'_{CSC}(\hat{\alpha}_{TR}(l)). \qquad \text{Eqn (133)}$$

and optimizes $\{d_{CSC}(n_{sym}; l)\}_{n_{sym}=1}^{N_{sym}}$ given $G'_{CSC}(l)$, under different assumptions about the structure of $d_{CSC}(n_{sym}; l)$. Defining $$G'_{blur}G'_{CSC}(\ell) = \begin{pmatrix} G_0(\ell) \\ G_1(\ell) \end{pmatrix}, \qquad \text{Eqn (134)}$$

$$G_q(\ell) = [g_q(0; \ell) \ldots g_q(N_{sym}-1; \ell)]^T,$$

then after removal of constant terms Eqn (127) can be expressed as $$F_{CSC}(D'_{CSC}(\ell)) \leftarrow \sum_{n_{sym}=0}^{N_{sym}-1} \|g_0(n_{sym}; \ell)\|_2^2 d_{CSC}^2(n_{sym}; \ell) + \qquad \text{Eqn (135)}$$
$$\|g_1(n_{sym}; \ell)\|_2^2 d_{CSC}^2(n_{sym}-1; \ell) +$$

-continued $$2 \sum_{n_{sym}=0}^{N_{sym}-1} (g_0^T(n_{sym};\ell)g_1(n_{sym};\ell))$$

$$d_{CSC}(n_{sym};\ell)d_{CSC}(n_{sym}-1;\ell) -$$

$$2 \sum_{n_{sym}=0}^{N_{sym}-1} (g_0^T(n_{sym};\ell)\hat{d}'_{CSC}(n_{sym};\ell))d_{CSC}(n_{sym};\ell) -$$

$$2 \sum_{n_{sym}=0}^{N_{sym}-1} (g_1^T(n_{sym};\ell)\hat{d}'_{CSC}(n_{sym};\ell))d_{CSC}(n_{sym}-1;\ell).$$

In one embodiment, $d_{CSC}(n_{sym};l)$ is assumed to be a BPSK sequence, and Eqn (135) is optimized using decision-feedback algorithm $$d_{CSC}(n_{sym};l)=\text{sgn}(g_0^T(n_{sym};l)(\hat{d}'_{CSC}(n_{sym};l)-g_1(n_{sym};l)$$
$$d_{CSC}(n_{sym}-1;l))). \quad \text{Eqn. (136)}$$

In another embodiments, the cross-term in Eqn (135) is ignored, and Eqn (135) is minimized over the data block by setting $$d_{CSC}(n_{sym};l)=\text{sgn}(y_{CSC}(n_{sym};l)), \quad \text{Eqn (137)}$$

$$y_{CSC}(n_{sym};l)=g_0^T(n_{sym};l)\hat{d}'_{CSC}(n_{sym};l)+g_1^T(n_{sym}+1;l)$$
$$\hat{d}'_{CSC}(n_{sym}+1;l) \quad \text{Eqn (138)}$$

where $\hat{d}'_{CSC}(n_{sym};l)$ is further assumed to be zero for $n_{sym} < 0$ and $n_{sym} \geq N_{sym}$. Other embodiments assume more robust structure for $d_{CSC}(n_{sym};l)$, suitable for extreme low-SINR environments where the sign operation is likely to induce significant errors.

Extensions of this approach that can also be used to improve performance of the symbol extraction algorithm described above include the following:
- Means for computing kurtosis and duty cycle metrics, in order to select appropriate conjugate-SCORE modes for subsequent NAV stream demodulation operations, and in order to further screen and remove tonal interferers captured by the algorithm.
- Implementing means for computing conjugate-SCORE channel signatures and interference statistics, for use in subsequent processing stages, and to assess quality of the blind despreading method.

The methods described above can also be extended to the navigation stream demodulator, described in the next section.

NAV Stream Demodulation Implementation

The navigation stream demodulator exploits the BPSK structure of the navigation (NAV) signal $b_T(n_{NAV};l)$, and the $1:M_{NAV}$ interpolation used to form $d_T(n_{sym};l)=b_T(\lfloor n_{sym}/M_{NAV}\rfloor;l)$, to identify the TOA symbol offset to modulo-$M_{NAV}$ ambiguity, i.e., $n_{lag}(l)=n_{TR}(l) \bmod M_{NAV}$, and to demodulate the NAV signal with factor-of-$M_{NAV}$ further despreading gain.

In one embodiment, demodulation is accomplished by minimizing cost function Eqn (127), subject to $d_{CSC}(n_{sym};l)$ having structure $$d_{CSC}(n_{sym};\ell) = \quad \text{Eqn (139)}$$

$$\sum_{n_{NAV}} b_T(n_{NAV};\ell)p_{NAV}(n_{sym} - n_{TR}(\ell)\bmod M_{NAV} - M_{NAV}n_{NAV}),$$

$$p_{NAV}(n_{sym}) = \begin{cases} 1, & 0 \leq n_{sym} < M_{NAV} \\ 0, & \text{otherwise.} \end{cases} \quad \text{Eqn (140)}$$

where $b_T(n_{NAV};l)$ is an unknown BPSK sequence, by alternately optimizing $G'_{CSC}(l)$ given $\{d_{CSC}(n_{sym};l)\}_{n_{sym}=1}^{N_{sym}}$ using Eqn (133), and then optimizing Eqn (127) given $G'_{CSC}(l)$, where $\{d_{CSC}(n_{sym};l)\}_{n_{sym}=1}^{N_{sym}}$ is given by Eqn (140) with modulo-$M_{NAV}$ trial delay $0 \leq n_{lag} > M_{NAV}$. Ignoring the cross-term in Eqn (135), the estimated navigation signal for trial lag $n_{lag}$ is given by $$b_{NAV}(n_{NAV};n_{lag},\ell) = \text{sgn}(y_{NAV}(n_{NAV};n_{lag},\ell)), \quad \text{Eqn (141)}$$

$$y_{NAV}(n_{NAV};n_{lag},\ell) = \quad \text{Eqn (142)}$$

$$\sum_{m_{NAV}=0}^{M_{NAV}-1} y_{CSC}(n_{NAV}M_{NAV} + m_{NAV} + n_{lag};\ell),$$

where $y_{CSC}(n_{sym};l)$ is given by Eqn (138). The estimated modulo-$M_{NAV}$ coarse TOA is then given by $$\hat{n}_{TR}(\ell) = \arg\max_{n_{lag}=0,\ldots,M_{NAV}-1} S_{NAV}(n_{lag}), \quad \text{Eqn (143)}$$

$$S_{NAV}(n_{lag}) = \sum_{n_{NAV}} |y_{NAV}(n_{NAV};n_{lag},\ell)|, \quad \text{Eqn (144)}$$

and the estimated navigation signal is given by $\hat{b}_T(n_{NAV};l)=b_{NAV}(n_{NAV};\hat{n}_{TR}(l),l)$.

Once the NAV signal has been demodulated, internals of the NAV stream can be used to remove final ambiguities in the signal. In particular, for the GPS C/A signal, detection of the TLM Preamble, transmitted within every 300-bit (6 second) Navigation Subframe, can be used to remove the modulo-$M_{NAV}$ ambiguity in the estimated delay $\hat{n}_{TR}(l)$, and to remove the $\pm 1$ sign ambiguity in the conjugate-SCORE output signal.

The demodulated NAV signal, FOA vector, and coarse TOA can also be used to refine the overall despreader, by remodulating the received GNSS symbols using the channel model developed here, e.g., using the formula $$\hat{d}_R(n_{sym};\ell) = \quad \text{Eqn (145)}$$

$$\sum_{n_{NAV}} \hat{b}_T(n_{NAV};\ell)p_{NAV}(n_{sym} - \hat{n}_{TR}(\ell)\bmod M_{NAV} - M_{NAV}n_{NAV}),$$

$$\hat{d}'_R(n_{sym};\ell) = \quad \text{Eqn (146)}$$

$$([\hat{d}_R(n_{sym} - q_{sym};\ell)] \otimes g_{blur}(n_{sym};\ell))\exp(j2\pi g_{FOA}^T\hat{\alpha}_{TR}(\ell)),$$

and then using $$\{\hat{d}'_R(n_{sym};\ell)\}_{\ell=1}^{L_T}$$

in single-target or multitarget ML estimation (MLE) or decision feedback procedures.

Exemplary refinement procedures include:

Single-target despreader refinement procedures in which the remodulated signals are used to refine the FOA vectors, TOAs, and navigation signals. In one embodiment, the single-target methods are developed from single-target ML estimators in which each individual GNSS signal matrix $\hat{D}'_R(l) = [\sqrt{\omega_{DoF}(n_{sym})}\hat{d}'_R(n_{sym};l)]_{n_{sym}=0}^{N_{sym}-1}$ is optimized under the assumption that remaining interference is complex-Gaussian, and multitarget methods that jointly optimize the full received symbol vector, can be used here.

Multitarget signature vector estimation procedures, in which the full remodulated network signal matrix $$\hat{D}'_R = [\hat{D}'_R(\ell)]_{\ell=1}^{L_T}$$

is used to estimate the full channel signature of the detected signals. In one embodiment, this is accomplished using the ML network signature estimator given by $$\hat{A}'_{DoF} = X_{DoF}^H \hat{D}'_R (\hat{D}'^H_R \hat{D}'_R)^{-1} = \begin{pmatrix} \hat{A}'_{DoF}(1) \\ \vdots \\ \hat{A}'_{DoF}(\hat{L}_T) \end{pmatrix}. \quad \text{Eqn (147)}$$

A particular advantage of this refinement is ability to remove "signature contamination" due to presence of strong received signals, e.g., ground beacons.

Adaptive cancellation methods, which remove the detected signals are cancelled from the received data, and the despreader is applied to the residual interference data. In one embodiment, the residual interference data is given by $$\hat{\mathcal{I}}_{DoF} = X_{DoF} - \hat{D}'_R \hat{A}'^H_{DoF}, \quad \text{Eqn (148)}$$

where $\hat{A}'_{DoF}$ is given by Eqn (147). A particular advantage of this refinement is ability to detect signals and demodulate signals subject to loosely aligned spoofing.

Multitarget despreader refinement procedures in which the full remodulated network signal matrix $\hat{D}'_R$ is used to jointly refine the despreader output signals, and to attempt to detect additional signals lying under those signals. A particular advantage of this refinement is ability to detect signals and demodulate signals subject to closely aligned spoofing In addition, methods that exploit the virtual cyclic prefix added by the interpolation can be used to greatly simplify processing in beacon environments, due to the sub-millisecond spacing in observed TOA between ground beacons that are likely to be within the receiver's field of view.

Copy-Aided Analysis Algorithms

Once the signals have been blindly detected and demodulated, in a further embodiment any of a set of mature (well-known to the prior art) copy-aided analysis algorithms can be used (as needed and desired) to alternatively determine or further refine TOA, FOA Nyquist zone, and DOA values for any received signal, to determine whether such is a candidate for further processing for its message content. Advantages of these methods include:

Adherence to lower Cramer-Rao bounds (thus higher efficiency) than correlative methods, and ability to estimate the gain (carrier phase tracking advantage) as well as search parameters.

Additional performance and complexity advantages specific to the PNT problem. This includes ability to search over channel signature estimates that have been extracted at high precision during the blind despreading operations, and reduced parameter set allowed by prior estimation procedure. Prior estimation of fine fractional FOA is particular helpful, as it allows FOA to be searched over discrete Nyquist zone, which should change very slowly over reception intervals and may be known ahead of the estimation procedure.

Both single-target and multitarget copy-aided fine TOA and FOA Nyquist zone estimators can be implemented for single-feed receivers, and joint TOA, FOA Nyquist-zone, and DOA estimators can be implemented for multi-feed receivers. As an advantage, once the SV's and receiver locations are known, the FOA estimates (which are a function of the emitter LOB's) and the DOA estimates (which are a function of the LOB's and the common receiver orientation) can be used to estimate the orientation of the receiver.

Particular extensions applicable to multi-feed receivers include:

Joint TOA, FOA, DOA, and channel phase estimators, which provide a precise estimate of all three geo-observables.

Focused TOA and FOA estimators, in which the spatial signature is assumed to be an unknown complex vector and optimized out, thereby greatly simplifying the TOA/FOA estimation procedure.

Focused DOA estimators, in which the underlying nonspatial channel signature is assumed to be unknown and optimized out, thereby simplifying the DOA estimation procedure.

The focused DOA estimator also provides a means for quickly detecting spoofers, based on elevation angle of the spoofer DOA, or commonality of DOA's for the spoofers, e.g., if they are all transmitted from the same platform. This can simplify subsequent TOA/FOA finalization steps, by eliminating the spoofers from further consideration by the system. In all three cases, however, inconsistency between the DOA and TOA/FOA solutions can be used to identify spoofers when they occur.

The simplest instantiation of the copy-aided analysis processor is implemented by passing the spatial signature estimates computed in the blind despreader stage to a conventional matched-filter correlator. The correlator uses a ranging code that has itself been channelized to emulate effects of the symbol-rate synchronous vector channelizer on the received spreading code, in order to provide a version of the ranging code that will correlate against the ranging code possessed by the detected emitters. In one dedicated reception embodiment, these channelized ranging codes are pre-computed and available in memory (232).

In one embodiment in which TOA blurring is present over the reception interval, the time-varying spatial signature is reconstituted from the extended spatial signature, and applied to early-late gates in the matched-filter correlator. This can maximizes utility of existing means for TOA estimation using prior art methods.

In more sophisticated methods based on ML-like copy-aided methods, the complex gain of the channel response is estimated as a side parameter of the method. If the transmitter and receiver phases are calibrated using other processing methods, this gain can be used to determine the CCP of the detected emissions, thereby allowing high-precision PNT operation.

In all of these instantiations, the analyzer can exploit the processing gain provided by integration over the reception interval, as well as interference excision inherent to the blind despreading algorithms, to substantively boost the precision of the geo-observable estimates.

Extension to Other Civil GNSS Signals

The signal structure developed here can be exploited to demodulate all of the civil GNSS signals listed in FIG. 3, as well as known beacons such as the Locata LocataLite signal, using the known symbol stream properties given in that Table for each of these signals. Methods include:

- Constant modulus algorithms (CMAs), which exploit the constant modulus of all of the GNSS symbol streams listed in FIG. 3.
- Frame-synchronous feature extraction (FSFE) algorithms, which exploit the repeated Q-rail on the GPS L5/QZSS, Galileo, and NAVIC signals.
- Partially-blind algorithms, which use navigation or baseband symbol data provided from external sources, e.g., web-sourced databases or primary navigation equipment, to implement otherwise blind detection and geo-observable estimation algorithms using that data.

The baseline approach can be implemented for all of these signals types with minimal changes to receiver and channelizer architecture. In most cases, features exploited by these methods can in fact be implemented at a substantive reduction in complexity.

While this invention is susceptible of embodiment in many different forms, there are shown in the drawings and described in detail in the text of "Interference Resistant Signal Reception Using Blind Linear Adaptive Processing" (a copy of which is attached to and specifically incorporated herein by reference) several specific embodiments, with the understanding that the present disclosure is to be considered as an exemplification of the principles of the invention and is not intended to limit the invention to the embodiments illustrated.

In an embodiment applicable to all of the approaches above, the invention obtains snapshots of baseband navigation data covering the time interval of data collected by the receiver, and symbol-synchronously channelized by the invention, and uses that baseband navigation data to implement non-fully-blind demodulation algorithms. The resultant embodiment can provide extreme high precision of FOA, TOA, and DFOA/DTOA drift estimates; assess integrity of data collected by the host platform; and provide other functions of interest to the user. When coupled with a communication channel allowing the receive data to be transported to a central processor, the invention can also allow implementation of all functions at off-line resources, thereby eliminating all DSP complexity associated with the algorithms. The embodiment can also be used to implement signal cancellation algorithms that detect signals under the known navigation signals, e.g., for purposes of spoofer and jammer detection.

Any reception operation used in the invention can be implemented using any of the set of one or more dedicated receivers and software defined radios (SDR) either separate from or integrated with antennas, amplifiers, mixers, filters, analog-to-digital converters (ADC's) and signal processing gear.

Operations Processing used in each of the inventions above can be implemented in any combination of hardware and software, from special-purpose hardware including any of application-specific integrated circuits (ASIC's) and field-programmable gate arrays (FPGA's); firmware instructions in a lesser-specialized set of hardware; embedded digital signal processors (e.g. Texas Instrument or Advanced Risc Machine DSP's); graphical processing units (CPU's); vector, polynomic, quantum, and other processors; and in any combination or sole use of serial or parallel processing; and on general-purpose computers using software instructions.

Operations Processing used in each of the inventions above can be further implemented using any set of resources that are on-board, locally accessible to, and remotely accessible by the receiver after transport of the data and instructions to be processed by any of a single computer, server, and set of servers, and then directed onwards, using any number of wired or wireless means for such transport.

Some of the above-described functions may be composed of instructions, or depend upon and use data, that are stored on storage media (e.g., computer-readable medium). Some of the above-described functions may be comprised in EEPROMs, ASICs, or other combinations of digital circuitry for digital signal processing, connecting and operating with the adaptive processor. The instructions and/or data may be retrieved and executed by the adaptive processor. Some examples of storage media are memory devices, tapes, disks, and the like. The instructions are operational when executed by the adaptive processor to direct the adaptive processor to operate in accord with the invention; and the data is used when it forms part of any instruction or result therefrom.

The terms "computer-readable storage medium" and "computer-readable storage media" as used herein refer to any medium or media that participate in providing instructions to a CPU for execution. Such media can take many forms, including, but not limited to, non-volatile (also known as 'static' or 'long-term') media, volatile media and transmission media. Non-volatile media include, for example, one or more optical or magnetic disks, such as a fixed disk, or a hard drive. Volatile media include dynamic memory, such as system RAM or transmission or bus 'buffers'. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes.

Memory, as used herein when referencing to computers, is the functional hardware that for the period of use retains a specific structure which can be and is used by the computer to represent the coding, whether data or instruction, which the computer uses to perform its function. Memory thus can be volatile or static, and be any of a RAM, a PROM, an EPROM, an EEPROM, a FLASH-EPROM, any other memory chip or cartridge, a carrier wave, or any other medium from which a computer can read data, instructions, or both.

I/O, or 'input/output', is any means whereby the computer can exchange information with the world external to the computer. This can include a wired, wireless, acoustic, infrared, or other communications link (including specifically voice or data telephony); a keyboard, tablet, camera, video input, audio input, pen, or other sensor; and a display (2D or 3D, plasma, LED, CRT, tactile, or audio). That which allows another device, or a human, to interact with and exchange data with, or control and command, a computer, is an I/O device, without which any computer (or human) is essentially in a solipsistic state.

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended this disclosure encompass any such modifications or embodiments.

The scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and are necessary to the overall function of that particular claim, and should be read as including, to the maximum extent permissible by law, known functional equivalents to the elements disclosed in the specification, even though those functional equivalents are not exhaustively detailed herein.

Although the present invention has been described chiefly in terms of the presently preferred embodiment, it is to be understood that the disclosure is not to be interpreted as limiting. Various alterations and modifications will no doubt become apparent to those skilled in the art after having read the above disclosure. Such modifications may involve other features which are already known in the design, manufacture and use of wireless electromagnetic communications networks, systems and MIMO networks and systems therefore, and which may be used instead of or in addition to features already described herein. The algorithms and equations herein are not limiting but instructive of the embodiment of the invention, and variations which are readily derived through programming or mathematical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. In a receiver that down-converts and channelizes a plurality of received navigation signals to generate a channelizer output signal, a method configured to:
    perform adaptive despreading of the channelizer output signal to blindly extract the plurality of received navigation signals and generate baseband symbol data therefrom;
    determine geo-observables from a spreading code that repeats every baseband symbol in at least one received navigation signal; and
    employ the geo-observables to differentiate between the at least one received navigation signal and at least one signal transmitted by at least one of a Global Navigation Satellite System (GNSS) satellite, a spoofer, a jammer, a beacon, a repeater, and a pseudolite.

2. The method recited in claim 1, wherein the geo-observables include at least one of time-of-arrival (TOA), received incident power (RIP), line-of-bearing (LOB), direction-of-arrival (DOA), frequency-of-arrival (FOA), and carrier phase.

3. The method recited in claim 1, further comprising performing copy-aided parameter estimation to refine estimation of the geo-observables.

4. The method recited in claim 1, further comprising performing positioning, navigation and timing computations on a set comprising at least one of demodulated satellite vehicle ID's, ephemeres, and the geo-observables for each detected signal.

5. The method recited in claim 1, further comprising sending a clock rate adjustment to a receiver front-end.

6. The method recited in claim 1, wherein the channelizer output signal is generated from a segment of a frequency band occupied by each of the plurality of received navigation signals.

7. The method recited in claim 1, wherein the channelizer output signal is produced by at least one of downconverting and digitizing a portion of a Global Navigation Satellite Systems (GNSS) band, retuning and resampling a digitized received signal to a portion of the GNSS band, and selecting a subset of frequency channels in a first channelizer output signal to produce a second channelizer output signal.

8. The method recited in claim 1, wherein the channelizer output signal has a symbol rate equal to a symbol rate of a navigation signal transmitted by the navigation satellite, less any offset due to Analog-to-Digital Converter clock error.

9. The method recited in claim 1, wherein the adaptive despreading determines a number of navigation signals in the channelizer output signal, using at least one of constant modulus of transmitted baseband symbols, Binary Phase-Shift Keying modulation of the transmitted baseband symbols, temporal self-coherence of the transmitted baseband symbols, repetition of the baseband symbols, unmodulated pilot components of the baseband symbols, and a repeated rail of the baseband symbols.

10. The method recited in claim 1, wherein the adaptive despreading provides estimates of at least one of transmitted baseband symbols, a repeated rail of the transmitted baseband symbols, transmitted navigation data used to form the baseband symbols, fractional fine frequency-of-arrival modulating the transmitted baseband symbols, differential FOA, and navigation stream timing phase.

11. The method recited in claim 1, wherein the channelizer output signal is generated by a bank of symbol-rate synchronous vector channelizers coupled to a multi-feed receiver, the multi-feed receiver coupled to at least one of an array of spatially diverse antennas and polarization diverse antennas.

12. The method recited in claim 1, wherein the channelizer output signal is generated by one of time-domain channelization, frequency-domain channelization, and mixed time-frequency channelization.

13. The method recited in claim 1, wherein the channelizer output signal is configured to have a reduced number of degrees-of-freedom that provides for at least one of:

reduced complexity of the adaptive despreading,
reduction in a time-bandwidth product of an algorithm employed in the adaptive despreading,
reduction in effect of link signature blur due to motion of at least one of the receiver and a navigation signal transmitter, and
a sufficient number of degrees of freedom for removing co-channel interference from the plurality of received navigation signals.

* * * * *